US012812162B2

(12) United States Patent
Ruiz Coll

(10) Patent No.: US 12,812,162 B2
(45) Date of Patent: Nov. 24, 2026

(54) TEMPLATE MATCH PREDICTION MERGE LIST CLUSTERING

(71) Applicant: Comcast Cable Communications, LLC, Philadelphia, PA (US)

(72) Inventor: Damian Ruiz Coll, Reston, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 19/175,446

(22) Filed: Apr. 10, 2025

(65) Prior Publication Data

US 2025/0324082 A1 Oct. 16, 2025

Related U.S. Application Data

(60) Provisional application No. 63/632,065, filed on Apr. 10, 2024.

(51) Int. Cl.

*H04N 19/513* (2014.01)
*H04N 19/105* (2014.01)
*H04N 19/176* (2014.01)
*H04N 19/196* (2014.01)
*H04N 19/56* (2014.01)

(52) U.S. Cl.

CPC ......... *H04N 19/521* (2014.11); *H04N 19/105* (2014.11); *H04N 19/176* (2014.11); *H04N 19/196* (2014.11); *H04N 19/56* (2014.11)

(58) Field of Classification Search

CPC .... H04N 19/521; H04N 19/196; H04N 19/56; H04N 19/139; H04N 19/513; H04N 19/52

See application file for complete search history.

(56) References Cited

U.S. PATENT DOCUMENTS

| | | | | |
|---|---|---|---|---|
| 2022/0329822 | A1* | 10/2022 | Chang | H04N 19/46 |
| 2023/0075788 | A1* | 3/2023 | Li | H04N 19/105 |
| 2024/0031557 | A1 | 1/2024 | Ruiz Coll et al. | |
| 2024/0357131 | A1* | 10/2024 | Zhang | H04N 19/503 |
| 2025/0184476 | A1* | 6/2025 | Jang | H04N 19/88 |
| 2025/0274604 | A1* | 8/2025 | Chen | H04N 19/105 |

FOREIGN PATENT DOCUMENTS

WO 2023202569 A1 10/2023

OTHER PUBLICATIONS

Naser et al. (Joint Video Experts Team (JVET) of ITU-T SG 16 WP 3 and ISO/IEC JTC 1/SC 29 33rd Meeting, by teleconference, 17â26 January (Year: 2024).*

(Continued)

*Primary Examiner* — Fabio S Lima

(74) *Attorney, Agent, or Firm* — Banner & Witcoff, Ltd.

(57) ABSTRACT

Block vector predictor (BVP) candidates may comprise overlapping refinement selection windows. The overlapping windows may be avoided, for example, by being replaced with an enlarged window or one of the overlapping windows. Corresponding BVP candidates may be replaced accordingly. Duplicate calculations caused by overlapping windows may be prevented, and diversity of BVP candidates may be improved.

20 Claims, 44 Drawing Sheets

(56) References Cited

OTHER PUBLICATIONS

JVET-AD0072-v2, Joint Video Experts Team (JVET) of ITU-T SG 16 WP 3 and ISO/IEC JTC 1/SC 29 30th Meeting, Antalya, TR, Apr. 21-28, 2023, Source: OPPO, Title: EE2-1.11: Intra template matching prediction fusion.
JVET-AD0073-v2, Joint Video Experts Team (JVET) of ITU-T SG 16 WP 3 and ISO/IEC JTC 1/SC 29 30th Meeting, Antalya, TR, Apr. 21-28, 2023, Source: OPPO, Title: EE2-1.10 Multi-candidate IntraTMP.
JVET-AD0074-v1, Joint Video Experts Team (JVET) of ITU-T SG 16 WP 3 and ISO/IEC JTC 1/SC 29 30th Meeting, Antalya, TR, Apr. 21-28, 2023, Source: OPPO, Title: EEE2-1.14b Enlarge search range for small blocks in IntraTMP.
JVET-AD0084-v1, Joint Video Experts Team (JVET) of ITU-T SG 16 WP 3 and ISO/IEC JTC 1/SC 29 30th Meeting, Antalya, TR, Apr. 21-28, 2023, Source: OPPO, Title: EE2-related: on search range of intraTMP.
JVET-AD0086-v1, Joint Video Experts Team (JVET) of ITU-T SG 16 WP 3 and ISO/IEC JTC 1/SC 29 30th Meeting, Antalya, TR, Apr. 21-28, 2023, Source: OPPO, Xidian Univ., Qualcomm Incorporated, Alibaba group, Title: EE2-1.20i/j: Combination of IntraTMP tests.
JVET-AD0112-v3, Joint Video Experts Team (JVET) of ITU-T SG 16 WP 3 and ISO/IEC JTC 1/SC 29 30th Meeting, Antalya, TR, Apr. 21-28, 2023, Source: Xidian University., Title: EE2-1.15a: Intra template matching (Intra TMP) based on linear filter model.
JVET-AD0115-v1, Joint Video Experts Team (JVET) of ITU-T SG 16 WP 3 and ISO/IEC Jtc 1/SC 29 30th Meeting, Antalya, TR, Apr. 21-28, 2023, Source: Xidian University, Title: EE2-1.14a: Extend search area in Intra Template Matching Prediction(IntraTMP).
JVET-AD0116-v2, Joint Video Experts Team (JVET) of ITU-T SG 16 WP 3 and ISO/IEC JTC 1/SC 29 30th Meeting, Antalya, TR, Apr. 21-28, 2023, Source: Xidian University, Title: EE2-1.16: A Fusion method of Intra Template Matching Prediction(Intra TMP).
JVET-AD0117-v2, Joint Video Experts Team (JVET) of ITU-T SG 16 WP 3 and ISO/IEC JTC 1/SC 29 30th Meeting, Antalya, TR, Apr. 21-28, 2023, Source: Xidian University, Title: EE2-related: Search area extension of bottom-left and top-right regions for IntraTMP mode.
JVET-AD0125-v1, Joint Video Experts Team (JVET) of ITU-T SG 16 WP 3 and ISO/IEC JTC 1/SC 29 30th Meeting, Antalya, TR, Apr. 21-28, 2023, Source: Alibaba group, Title: EE2-1.12: Intra TMP with sub-pel precision.
JVET-AD0194-v2, Joint Video Experts Team (JVET) of ITU-T SG 16 WP 3 and ISO/IEC JTC 1/SC 29 30th Meeting, Antalya, TR, Apr. 21-28, 2023, Source: Qualcomm Incorporated, Title: EE2-1.19: IntraTMP with multiple modes.
JVET-AE0077-v1, Joint Video Experts Team (JVET) of ITU-T SG 16 WP 3 and ISO/IEC JTC 1/SC 29 31st Meeting, Geneva, CH, Jul. 11-19, 2023, Source: OPPO, Xidian, Kwai, Title: EE2-2.9: Extended search areas for IntraTMP mode.
Tung Nguyen, et al. Overview of the Screen Content Support in VVC: Applications, Coding Tools, and Performance. Journal of Latex Class Files, vol. 14, No. 8, Aug. 2015.
Naser, K., et al: "EE2-1.2: IntraTMP with Merge Candidates", 145. MPEG Meeting; Jan. 22, 2024-Jan. 26, 2024; Online; (Motion Picture Expert Group or ISO/IEC JTC1/SC29/WG11), No. m66047 Jan. 10, 2024.
Ruiz Coll, D., et al, "EE2-related: Intra TMP merge candidates clustering based on refinement window", 146. MPEG.Meeting; Apr. 22, 2024-Apr. 26, 2024; Rennes; (Motion Picture Expert Group or ISO/IEC JTC1/SC29/WG11), No. m67225 Apr. 10, 2024.
Jul. 28, 2025—International Search Report—PCT App. PCT/US2025/024001.

* cited by examiner

TEMPLATE MATCH PREDICTION MERGE LIST CLUSTERING

CROSS-REFERENCE TO RELATED APPLICATIONS

This application claims the benefit of U.S. Provisional Application No. 63/632,065 filed on Apr. 10, 2024. The above referenced application is hereby incorporated by reference in its entirety.

BACKGROUND

A computing device processes video for storage, transmission, reception, and/or display.

Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames or pictures displayed consecutively. Blocks of samples within a picture may be encoded and/or decoded. A current block may be coded using a reference block and a displacement from the reference block to the current block. The displacement (e.g., block vector (BV), or block vector predictor (BVP)) may be selected from a plurality of candidates (e.g., from neighboring blocks), for example, based on lower computation cost. The selection may include a sparse search and a refined search. The refined search may search for best candidates within a selection window. If two candidates have overlapping selection windows, a third selection window may be determined to replace the overlapping selection windows, and the two candidates may be replaced by a third candidate corresponding to the third window. The third window may overlap (e.g., encompass) the overlapping windows. Alternatively, one of the overlapping windows may be selected as the third window, and the other of the overlapping windows (along with the corresponding candidate) may be removed. This may avoid duplicate calculations for candidates having overlapping selection windows, and/or may increase diversity of candidates as the quantity of candidates that are close together may be reduced. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
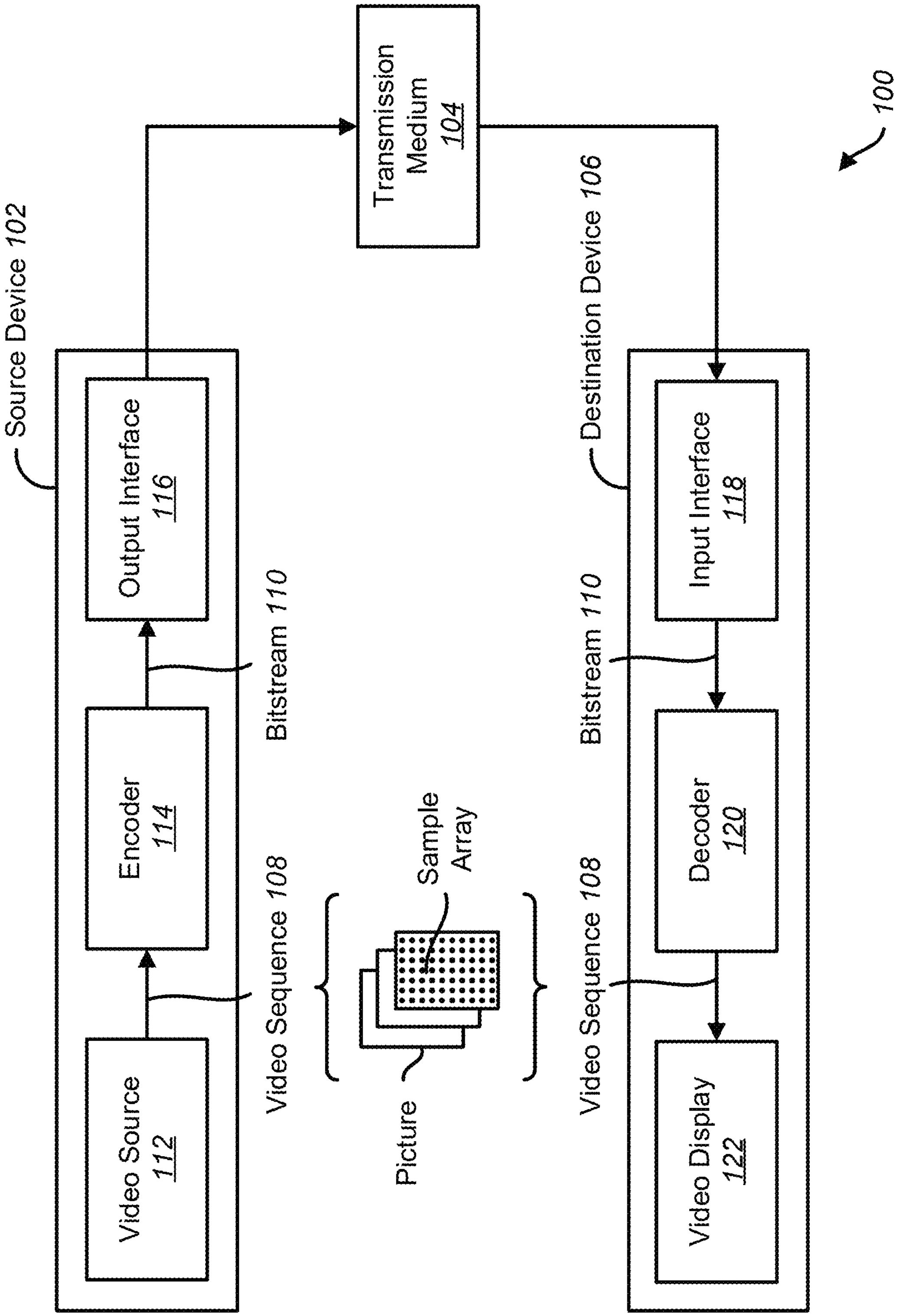
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/ reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. For example, three sample arrays may be used for one luma component and two chroma components, respectively. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and/or prediction modes. The encoder 114 may perform one or more of quantization and entropy coding of the transform coefficients and/or the other information used to determine the prediction blocks, for example, prior to or before forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. Also or alternatively, the output interface 116 may be configured to send/transmit, upload, and/or stream the bitstream 110 to the destination device 106 via the transmission medium 104.

The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. Also or alternatively, the transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. Also or alternatively, the input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Is Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
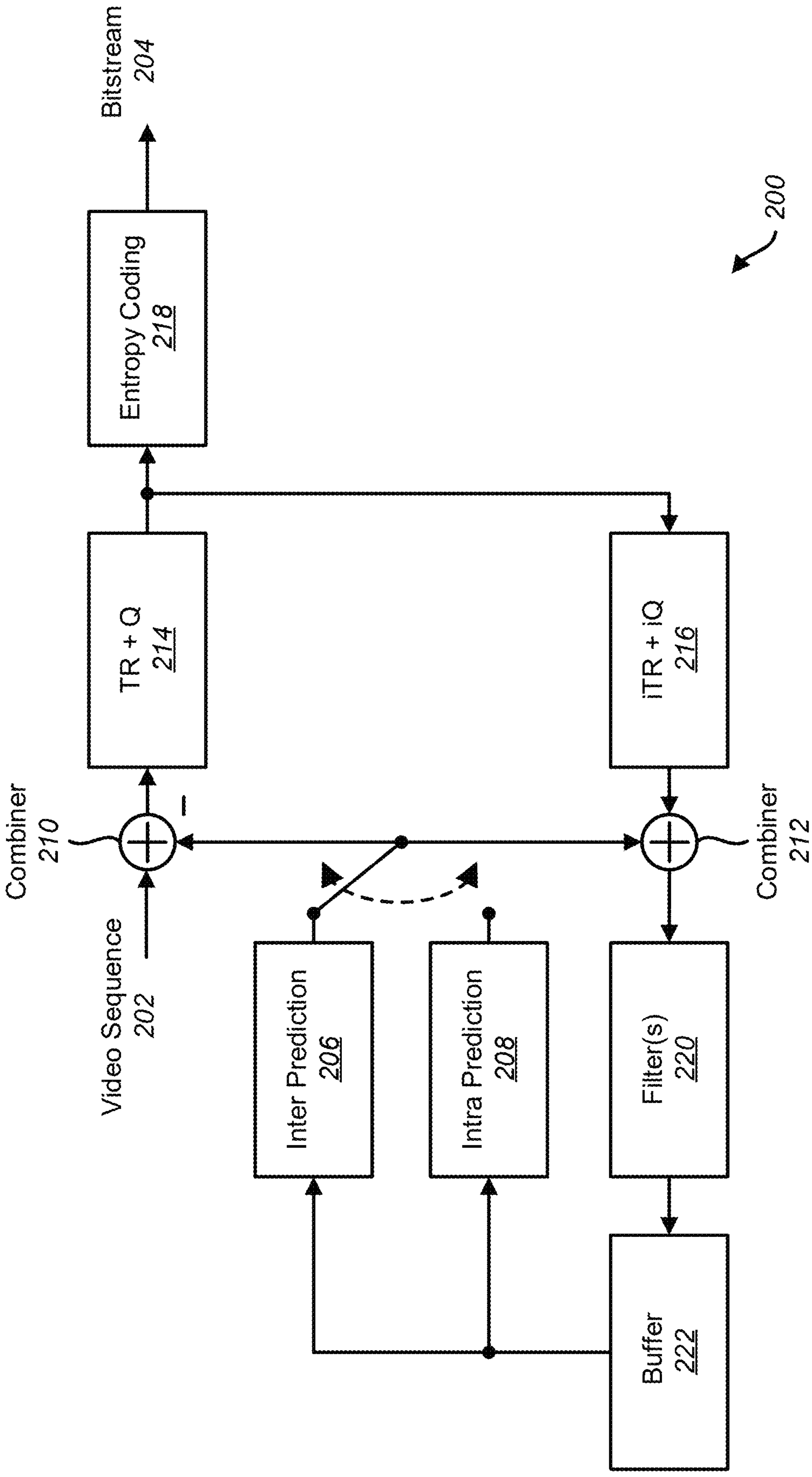
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be or refer to a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be or refer to a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may be configured to attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may be configured to attempt to minimize or reduce the bitrate of bitstream 204 such that the reconstructed video quality does not fall below a certain level/threshold, and/or to maximize or increase the reconstructed video quality such that the bit rate (or bitrate) of bitstream 204 does not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). For example, the entropy coding unit 218 may use/apply context adaptive variable length coding (CAVLC), context adaptive binary arithmetic coding (CABAC), and/or syntax-based context-based binary arithmetic coding (SBAC) to achieve further compression. The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
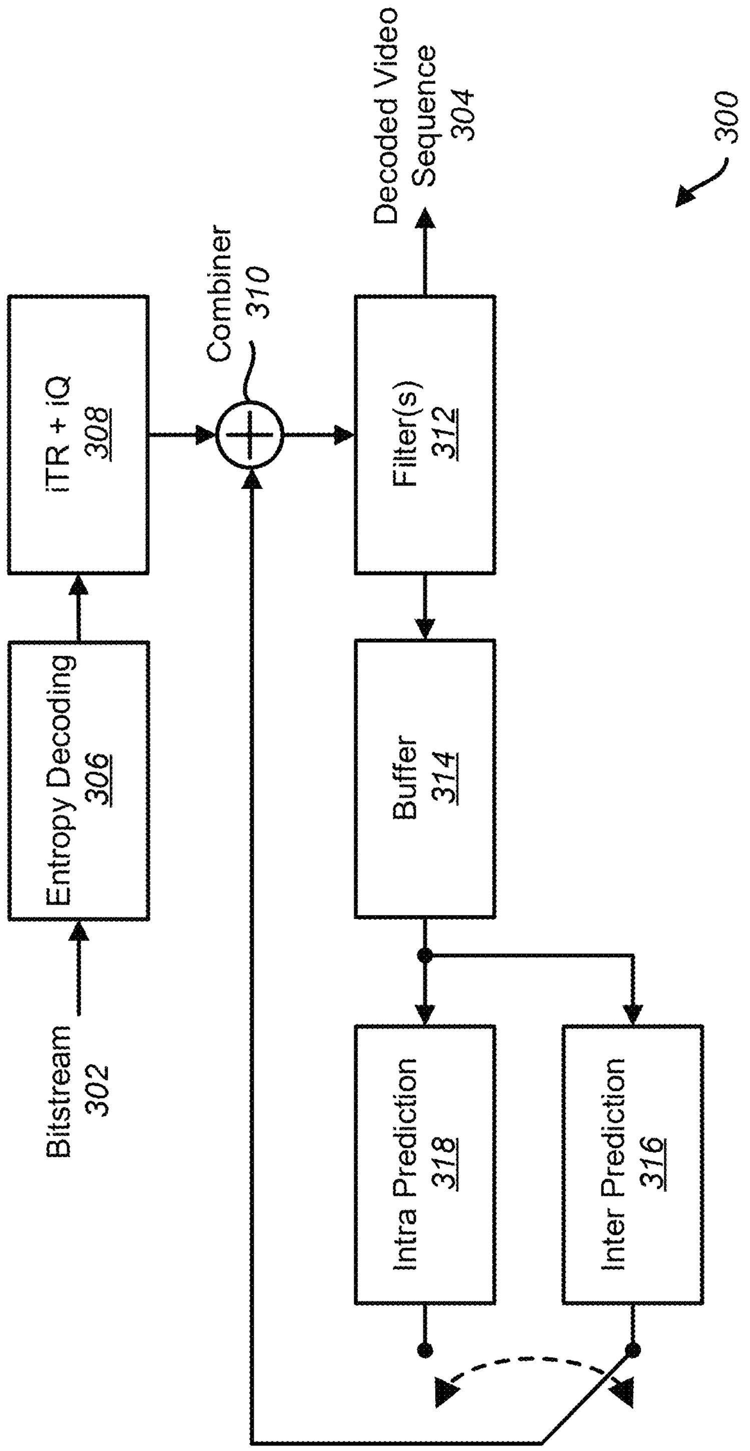
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. For example, the entropy decoding unit 306 may use/apply CAVLC, CABAC, and SBAC to decompress the prediction type used to encode a block (intra or inter prediction), prediction information of the block (intra prediction mode if intra predicted, motion vector, etc.), and transform and quantization parameters. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements.

One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. A CB may be further partitioned into intra sub-partitions (ISP) where the reconstructed samples of each sub-partition may be available to generate the prediction of the next sub-partition. For example, a CB may be split into 2 to 4 sub-partitions. For transformations, a CB may be partitioned into one or more transform blocks (TBs). A TB may be a rectangular block of samples that may determine/indicate an applied transform size.

Figure 4:
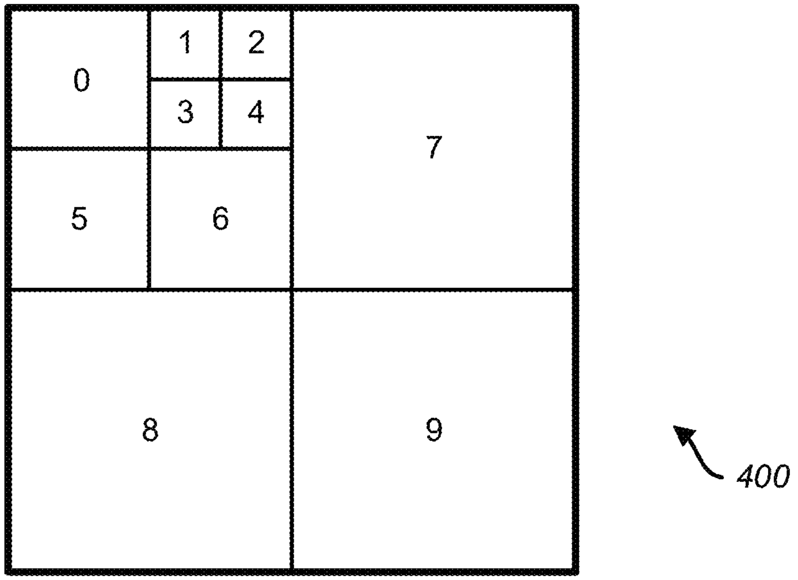
FIG. 4 shows an example quadtree partitioning of a coding tree block (CTB).
Figure 5:
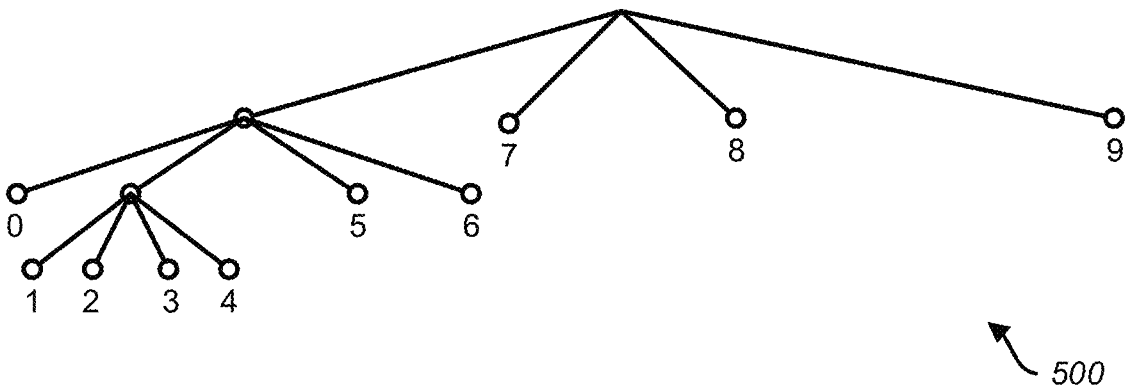
FIG. 5 shows an example quadtree corresponding to the example quadtree partitioning of the CTB in FIG. 4.

FIG. 4 shows an example quadtree partitioning of a CTB. FIG. 5 shows an example quadtree corresponding to the example quadtree partitioning of the CTB 400 in FIG. 4. As shown in the examples of FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
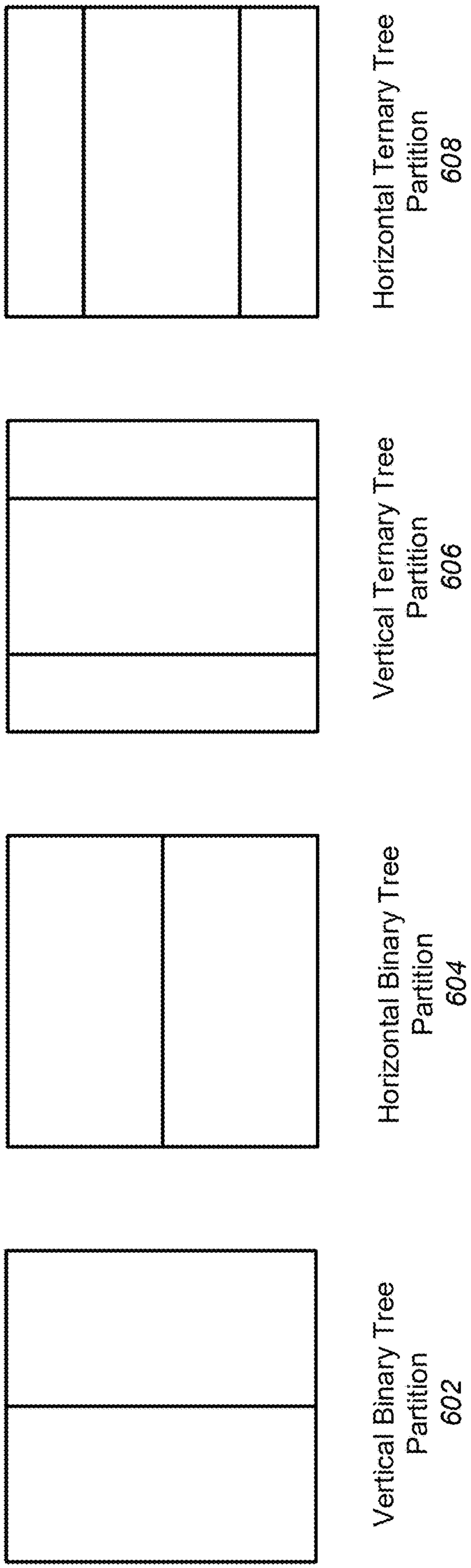
FIG. 6 shows example binary tree and ternary tree partitions.

FIG. 6 shows example binary tree and ternary tree partitions. A binary tree partition may divide a parent block in half in either a vertical direction 602 or a horizontal direction

604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtrec partitioning.

Figure 7:
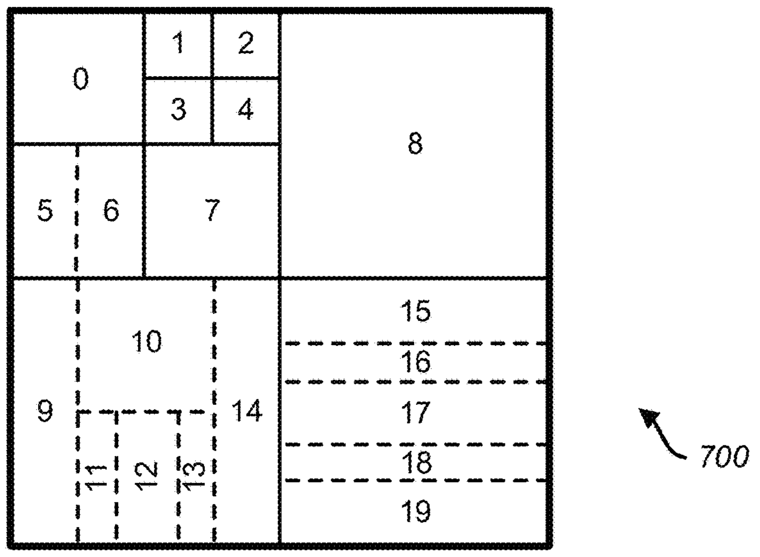
FIG. 7 shows an example of combined quadtree and multi-type tree partitioning of a CTB.
Figure 8:
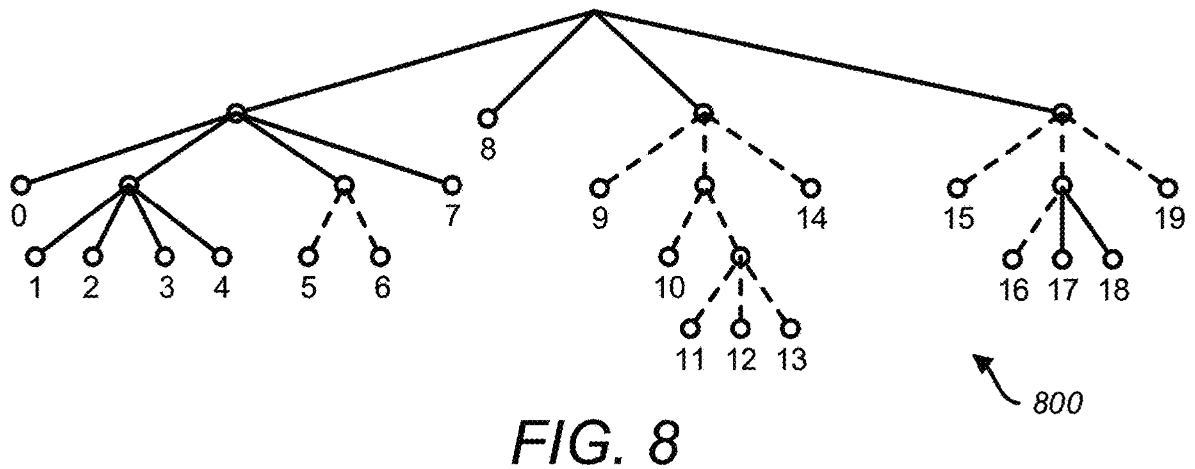
FIG. 8 shows an example tree corresponding to the combined quadtree and multi-type tree partitioning of the CTB shown in FIG. 7.

FIG. 7 shows an example of combined quadtree and multi-type tree partitioning of a CTB. FIG. 8 shows an example tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. For case of explanation, the CTB 700 is shown with the same quadtree partitioning as the CTB 400 described in FIG. 4, and a description of the quadtree partitioning of the CTB 700 (similar to that for CTB 400) is omitted. The quadtree partitioning of the CTB 700 is merely an example and a CTB may be quadtree partitioned in a manner different from the CTB 700. Additional multi-type tree partitions of the CTB 700 may be made relative to three leaf CBS shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream (or bitstream). A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples in a line of samples immediately adjacent to the current block, for example, in intra prediction. For example, the line of samples may include samples of the column immediately adjacent to the left-most column of the current block and samples of the row immediately adjacent to the top-most row of the current block. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
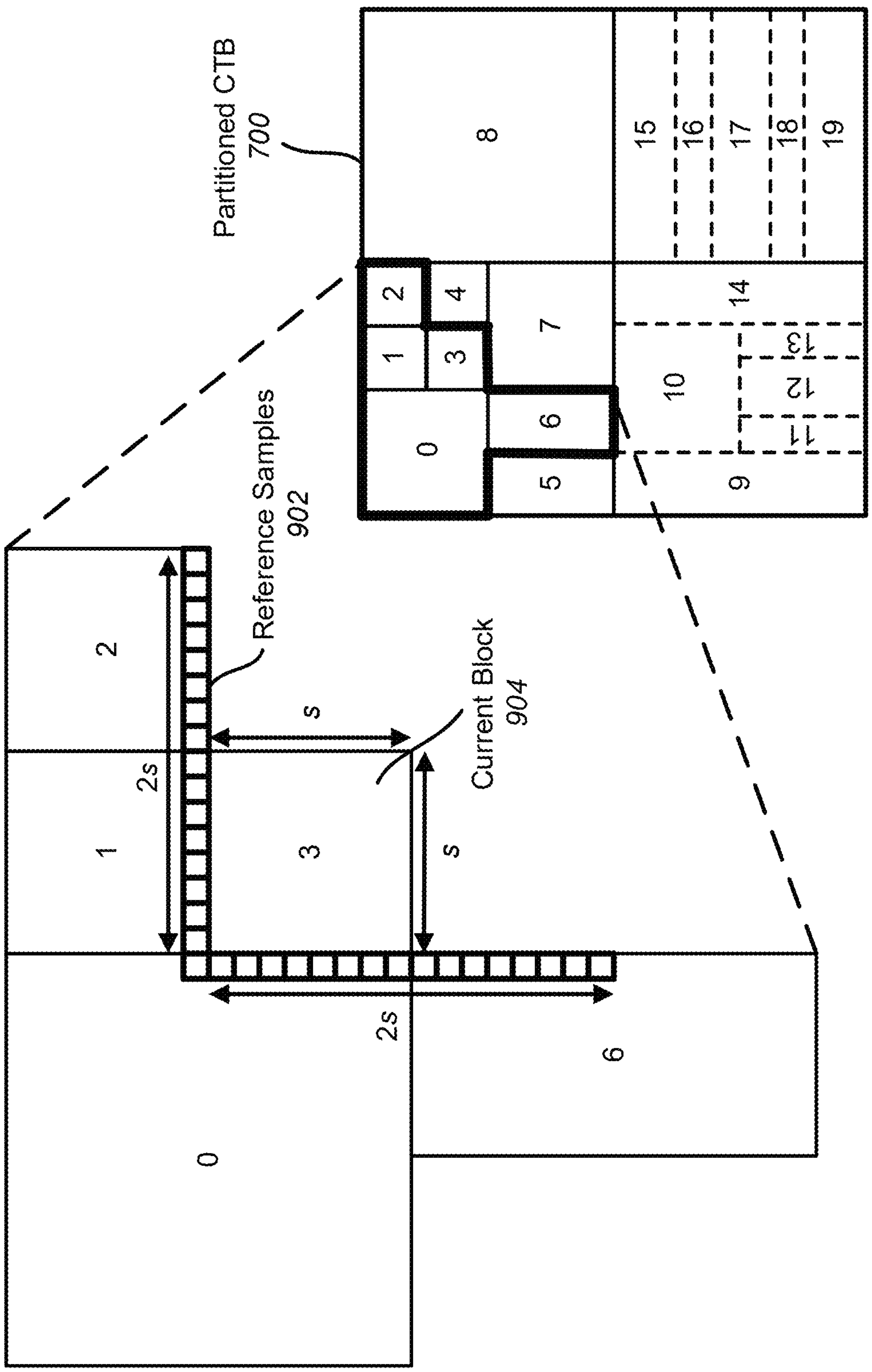
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

Reference samples 902 may include a line of samples immediately adjacent to current block 904. The reference samples 902 may include samples from a column and a row immediately adjacent to current block 904. For example, the line of samples may include reference samples to the left and/or above the current block 904. Reference samples 902 may be obtained (or selected) from a reference line of multiple reference lines (MRL). The MRL may include a line of samples adjacent to current block 904 and a line of samples not adjacent to the current block 904. The MRL may include reference lines identified by corresponding reference line indices that may indicate an i-th line of samples adjacent to current block 904 such that the 0-th line indicates the reference line immediately adjacent (or closest) to the current block 904 and a higher numbered i-th line indicates a line of samples further away from the current block 904. An encoder may select a reference line from a set of MRL and/or may signal an MRL index in the bitstream to indicate the selected reference line. For example, the encoder may signal a codeword encoding the MRL index. The decoder may decode the codeword to determine the MRL index that identifies a specific reference line used in intra prediction of the current block 904.

The current block 904 may be w×h samples in size. The reference samples 902 may comprise: 2w samples (or any other quantity of samples) of an i-th row (e.g., indicated by an MRL index) adjacent to the top-most row of current block 904, 2h samples (or any other quantity of samples) of the i-th column adjacent to the left-most column of current block 904, and the top left neighboring corner sample(s) extending from the i-th column and i-th row with respect to current block 904, for example, for the current block 904 that is w×h samples in size. The current block 904 may be square, such that w=h=s. In other examples, a current block need not be square, such that w/h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, 2, and 6 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

Samples of the current block 904 may be intra predicted based on reference samples 902, for example, based on (e.g., after) determination and (optionally) filtering of the reference samples 902. A filtering scheme (e.g., a filtering algorithm) may be used/applied for/to the reference samples 902, for example, to improve prediction accuracy. The filtering scheme may be one of a plurality of filter types including at least a smoothing filter (or reference sample smoothing filter) or an interpolation filter. Only one of the plurality of filter types may be selected (e.g., activated) to be used/applied for/to reference samples of a given block, for example, if the reference samples are to be filtered. For example, the interpolation filter may not be selected (e.g., may be disabled), for example, if the smoothing filter is selected (e.g., activated), or vice versa.

A plurality of (e.g., many) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
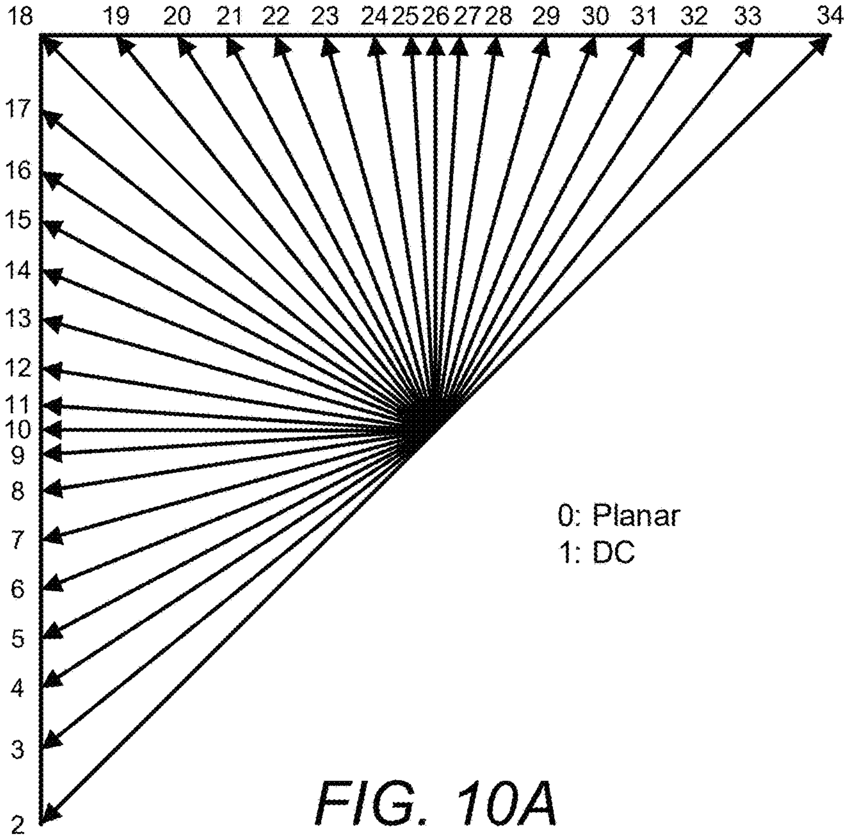
FIG. 10A and FIG. 10B show example intra prediction modes.
Figure 10B:
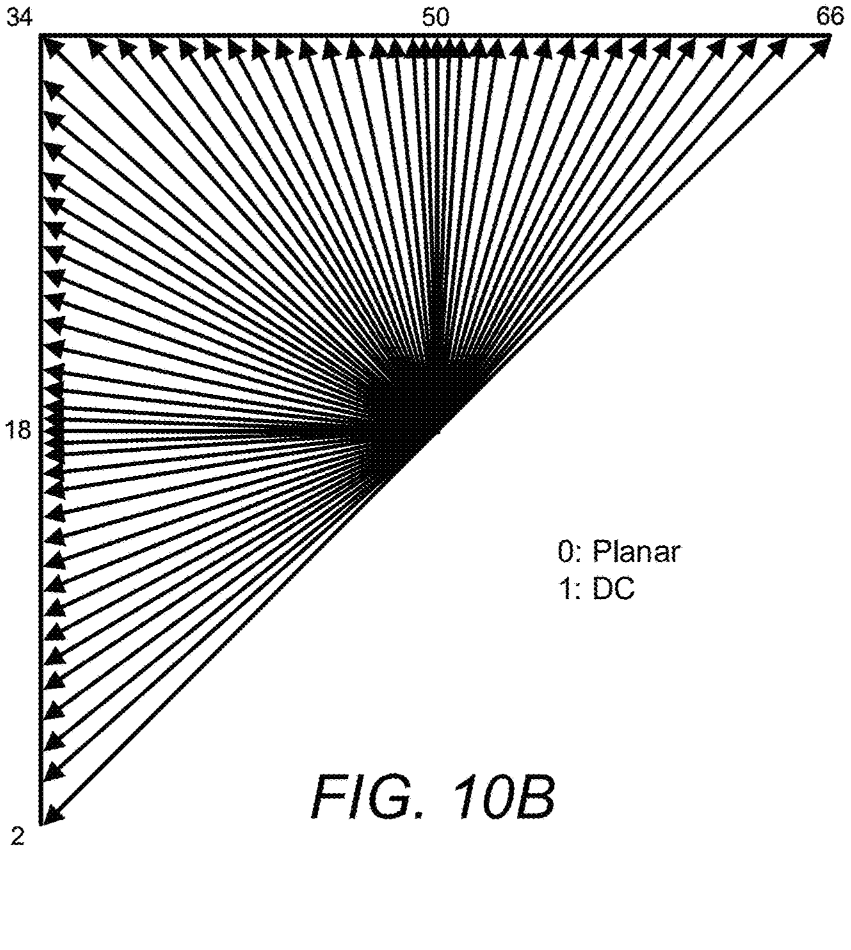

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
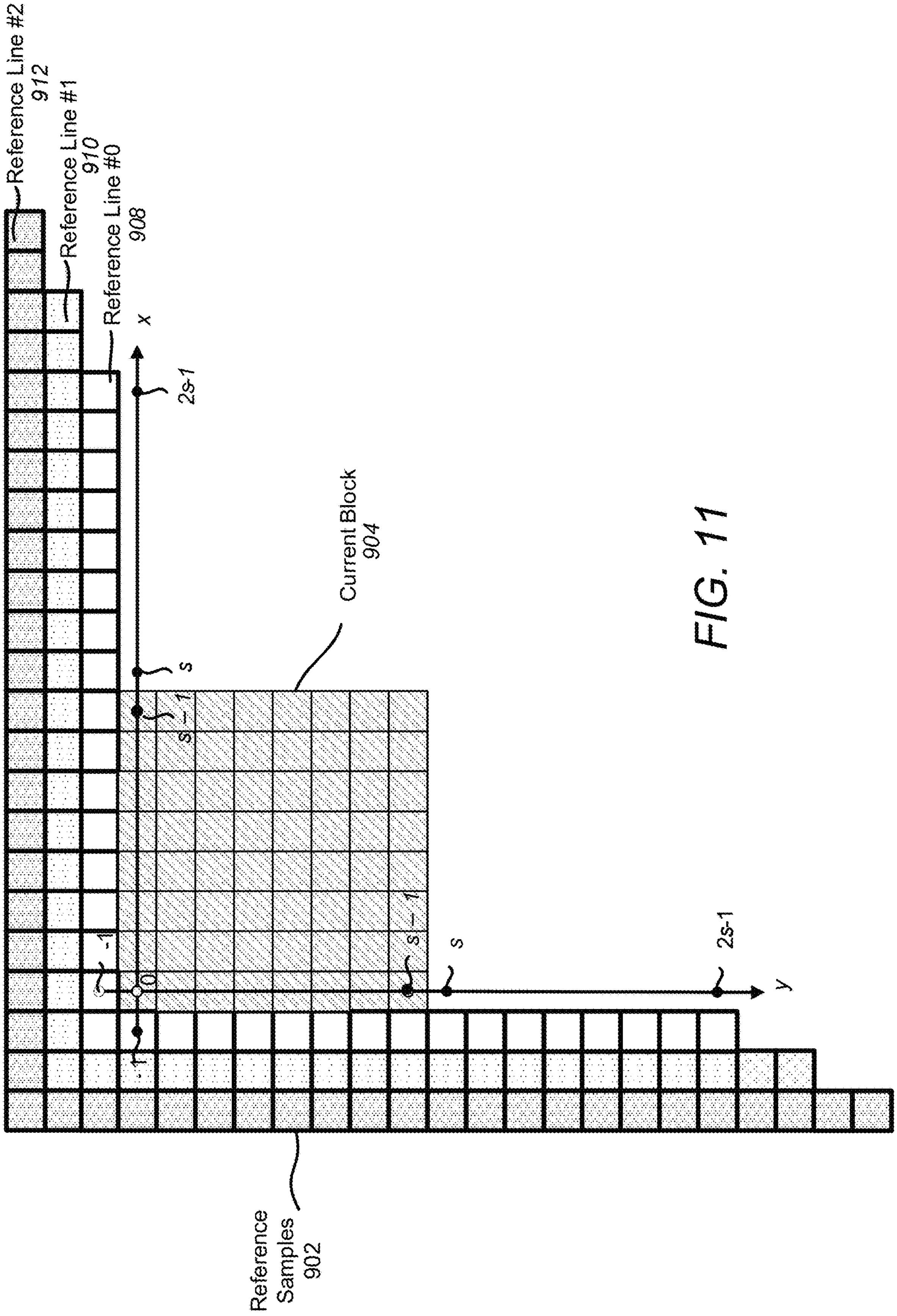
FIG. 11 shows an example current block and corresponding reference samples.

FIG. 11 shows an example current block 904 and corresponding reference samples 902 from FIG. 9. FIG. 11 shows current block 904 and reference samples 902 in a two-dimensional x, y plane, where a sample may be referenced as p[x][y], for example, to further describe how intra prediction modes are used/applied for/to determine a prediction (e.g., a prediction block) of current block 904. The reference samples 902 may be from a reference line among a set of multiple reference lines (MRL) 908-910. To simplify the prediction process, reference samples 902 may be placed in two, one-dimensional arrays. The reference samples 902 belonging to a reference line l from the set of MRL 908-912, above the current block 904, may be placed in the one-dimensional array $ref_1[x]$:

$$ref_1[x] = p[-l+x][-l], (x \geq 0). \tag{1}$$

The reference samples 902 belonging to reference line I, to the left of current block 904, may be placed in the one-dimensional array $ref_2[y]$:

$$ref_2[y] = p[-l][-l+y], (y \geq 0). \tag{2}$$

The variable l represents how many lines away the selected reference line is from current block. For example, if reference line #0 908 is selected, then l is set to 1 to indicate the reference line adjacent to current block 904. For example, if reference line #1 910 is selected, then l is set to 2. For example, if reference line #2 912 is selected, then l is set to 3.

Reference samples 902 may be from reference line 908 that is immediately adjacent to current block 904, for example, if MRL is not activated or selected. In this example, the variable/in Equations (1) and (2) is set to 1.

The prediction process may comprise determination of a predicted sample p[x][y] (e.g., a predicted value) at a location [x][y] in current block 904. For planar mode, a sample at the location [x][y] in current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \tag{3}$$

where $$h[x][y] = (s-x-1) \cdot ref_2[y] + (x+1) \cdot ref_1[s] \tag{4}$$

may be the horizonal linear interpolation at the location [x][y] in current block 904 and $$v[x][y] = (s-y-1) \cdot ref_1[x] + (y+1) \cdot ref_2[s] \tag{5}$$

may be the vertical linear interpolation at the location [x][y] in current block 904. s may be equal to a length of a side (e.g., a number of samples on a side) of the current block 904.

A sample at a location [x][y] in current block 904 may be predicted by the mean of the reference samples 902, for example, for a DC mode. The predicted sample p[x][y] in current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \tag{6}$$

A sample at a location [x][y] in current block 904 may be predicted by projecting the location [x][y] in a direction specified by a given angular mode to a point on the horizontal or vertical line of samples comprising reference samples 902, for example, for an angular mode. The sample at the location [x][y] may be predicted by interpolating between the two closest reference samples of the projection point, for example, if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
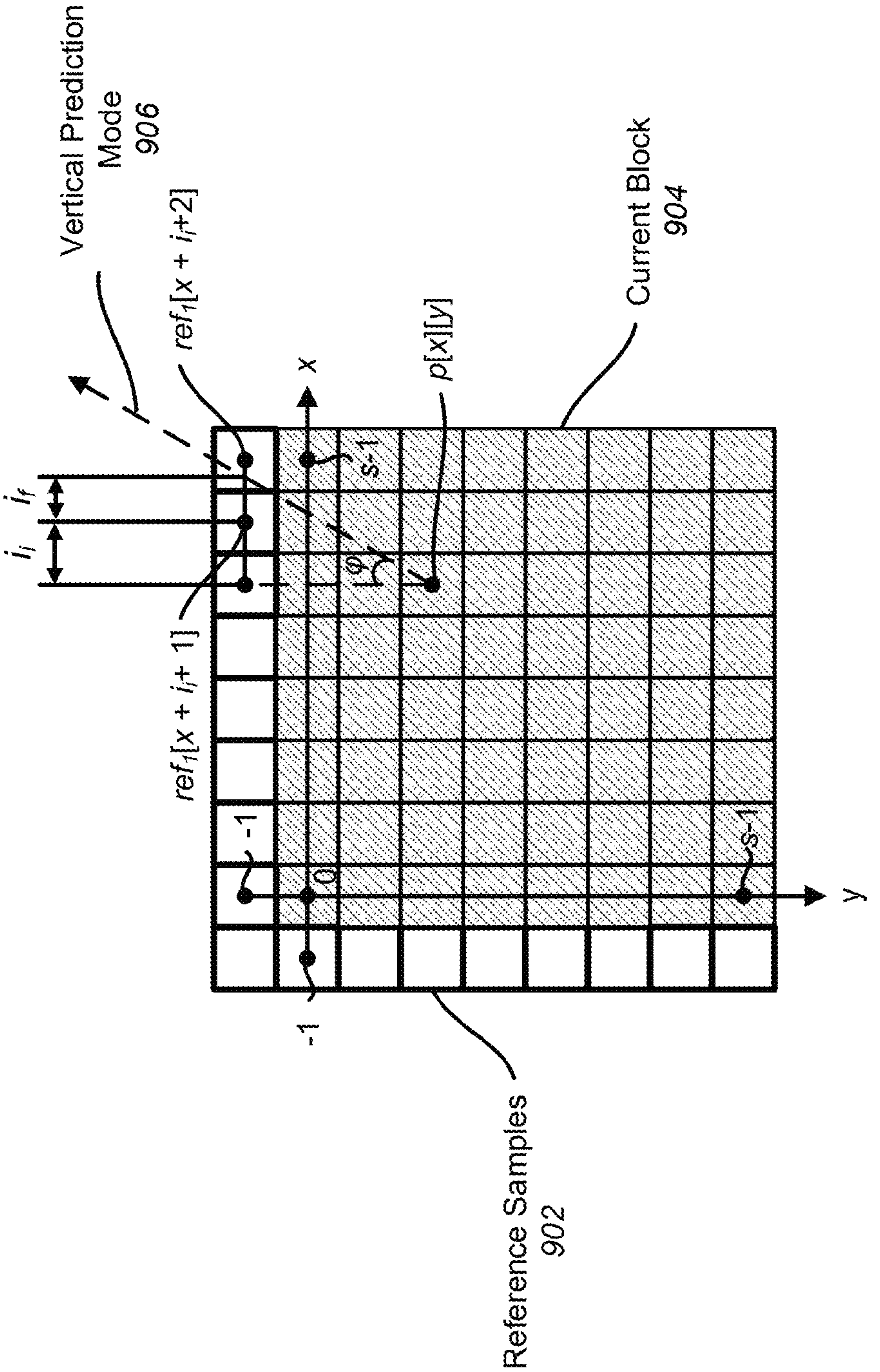
FIG. 12 shows an example application of an intra prediction mode for prediction of a current block.

FIG. 12 shows an example application of an intra prediction mode (e.g., an angular mode such as vertical prediction mode 906) for prediction of a current block 904. FIG. 12 specifically shows prediction of a sample at a location [x][y] in current block 904 for a vertical prediction mode 906. Vertical prediction mode 906 may be given by an angle φ with respect to the vertical axis. The location [x][y] in current block 904, in vertical prediction modes, may be projected to a point (e.g., referred to as a projection point) on the horizontal line of reference samples $ref_1[x]$. The reference samples 902 are only partially shown in FIG. 12 and shown as being from a reference line with reference line index of 0 for ease of illustration. Reference samples 902 may be from another reference line of the set of MRL, as explained in FIG. 9. As shown in FIG. 12, the projection point on the horizontal line of reference samples $ref_1[x]$ may not be exactly on a reference sample. A predicted sample p[x][y] in current block 904 may be determined/calculated by linearly interpolating between the two reference samples, for example, if the projection point falls at a fractional sample position between two reference samples. The predicted sample p[x][y] may be determined/calculated as:

$$p[x][y] = (1 - i_f) \cdot ref_1[x + i_i + 1] + i_f \cdot ref_1[x + i_i + 2]. \tag{7}$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y+1) \cdot \tan\varphi \rfloor. \tag{8}$$

$i_f$ may be the fractional part of the horizontal displacement of the projection point relative to the location [x][y] and may be determined/calculated as:

$$i_f = ((y+1) \cdot \tan\varphi) - \lfloor (y+1) \cdot \tan\varphi \rfloor, \tag{9}$$

where $\lfloor \cdot \rfloor$ is the integer floor function.

A location [x][y] of a sample in current block 904 may be projected onto the vertical line of reference samples $ref_2$ [y], for example, for horizontal prediction modes. A predicted sample p[x][y] for horizontal prediction modes may be determined/calculated as:

$$p[x][y]=(1-i_f)\cdot ref_2[y+i_i+1]+i_f\cdot ref_2[y+i_i+2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i=\lfloor(x+1)\cdot\tan\varphi\rfloor. \quad (11)$$

$i_f$ may be the fractional part of the vertical displacement of the projection point relative to the location [x][y]. $i_f$ may be determined/calculated as:

$$i_f=((x+1)\cdot\tan\varphi)-\lfloor(x+1)\cdot\tan\varphi\rfloor, \quad (12)$$

where $\lfloor\cdot\rfloor$ is the integer floor function.

The interpolation functions given by Equations (7) and (10) may be implemented by an encoder and/or a decoder (e.g., encoder 200 in FIG. 2 and/or decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters-one for each of the 32 possible values of the fractional part of the projected displacement if. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on if (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y]=\sum_{i=0}^{3} fT[i]\cdot ref_1[x+iIdx+i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y]=\sum_{i=0}^{3} FT[i]\cdot ref_2[y+iIdx+i]. \quad (14)$$

Supplementary reference samples may be determined/constructed if the location [x][y] of a sample in current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2$ [y] in the vertical line of reference samples 902 to the horizontal line of reference samples 902 using the negative vertical prediction angle φ. Supplementary reference samples may be similarly determined/constructed, for example, if the location [x][y] of a sample in current block 904 to be predicted is projected to a negative y coordinate. The location [x][y] of a sample may be projected to a negative y coordinate, for example, if negative horizontal prediction angles q are used. The supplementary reference samples may be determined/constructed by projecting the reference samples in $ref_1$[x] on the horizontal line of reference samples 902 to the vertical line of reference samples 902 using the negative horizontal prediction angle φ.

An encoder may determine/predict samples of a current block being encoded (e.g., current block 904) for a plurality of intra prediction modes (e.g., using one or more of the functions described herein). For example, an encoder may determine/predict samples of a current block for each of 35 intra prediction modes in HEVC and/or 67 intra prediction modes in VVC and/or including extended intra prediction modes from WAIP for rectangular blocks. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples, generated from reference samples 902 of a reference line (e.g., from a set of MRL), determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode and the associated reference line to encode the current block based on a rate-distortion measure (e.g., Lagrangian rate-distortion cost) determined using the prediction errors. The encoder may signal an indication of the determined/selected intra prediction mode and an indication of the associated MRL index (which may indicate a reference line index). The encoder may signal an indication of the determined/selected intra prediction mode and an indication of the associated MRL index (which may indicate a reference line index), for example, in the bitstream to a decoder for decoding of the current block. The encoder may also signal in the bitstream to the decoder a corresponding prediction error (e.g., residual) of the intra prediction mode.

A decoder may determine/predict samples of a current block being decoded (e.g., current block 904) for an intra prediction mode. For example, a decoder may receive an indication of a reference line (e.g., a reference line index or an MRL index associated with the reference line index) and an intra prediction mode (e.g., an angular intra prediction mode) from an encoder for a current block. The decoder may retrieve a set of reference samples and perform intra prediction, for example, based on the MRL index and the intra prediction mode indicated by the encoder for the current block in a similar manner (e.g., as described above for the encoder). The decoder may obtain the reference samples from a reference line indicated/identified by the decoded MRL index. The reference line may have reference line index 0 and may be immediately adjacent to the current block, for example, if/when MRL is not enabled/activated/selected. In these examples, no indication of MRL index is signaled.

The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, through other decoder-side means (e.g., by applying template-based intra mode derivation (TIMD) tool/technique). While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block (e.g., similar to intra prediction). An encoder may determine a difference, for example, based on/after determining/generating a prediction for a current block (e.g., using inter prediction). The difference may be a prediction error (e.g., a residual). The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
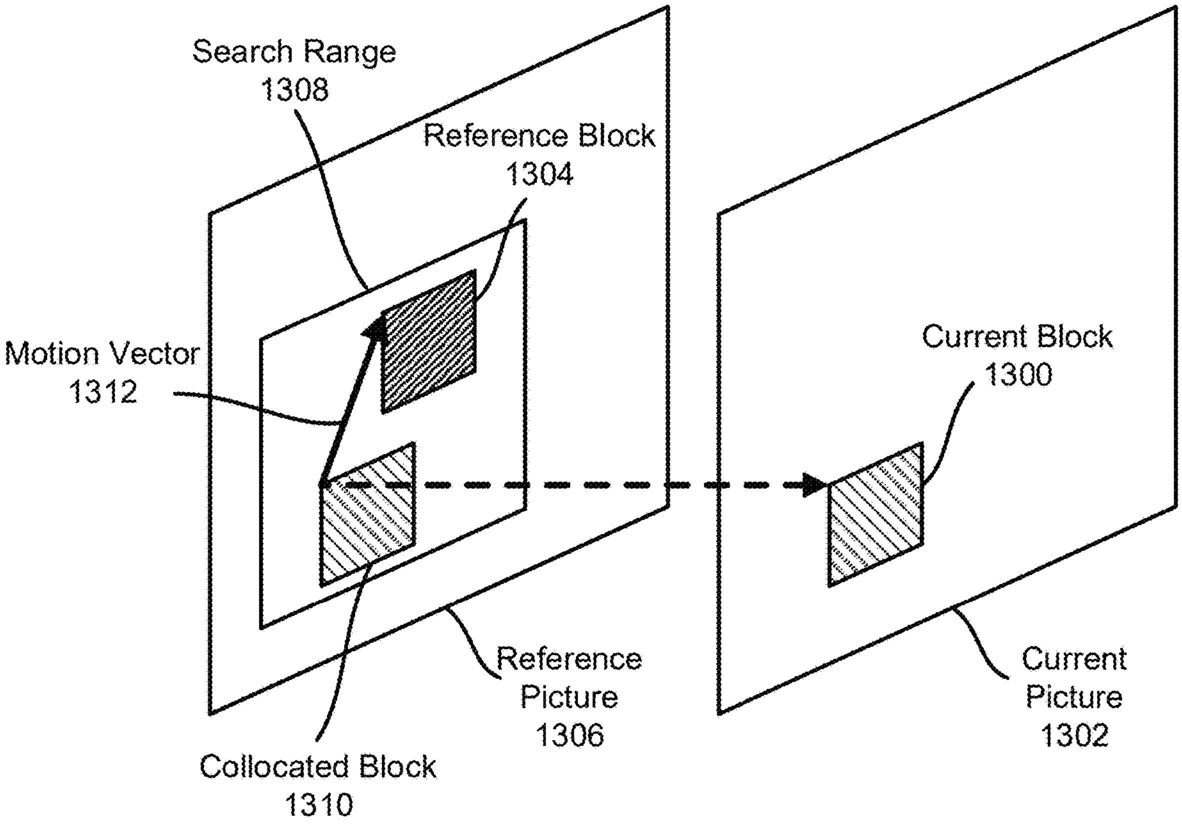
FIG. 13A shows an example of inter prediction.

FIG. 13A shows an example of inter prediction. The inter prediction may be performed for a current block 1300 in a current picture 1302 being encoded. An encoder (e.g., encoder 200 as shown in FIG. 2) may perform inter prediction to determine and/or generate a reference block 1304 in a reference picture 1306. Reference block 1304 may be used to predict the current block 1300. Reference pictures (e.g., reference picture 1306) may be prior decoded pictures available at the encoder and/or a decoder. Availability of a prior decoded picture may depend/be based on whether the prior decoded picture is available in a decoded picture buffer, at the time, current block 1300 is being encoded and/or decoded. The encoder may search the one or more reference pictures 1306 for a block (e.g., a candidate reference block) that is similar (or substantially similar) to current block 1300. The encoder may determine the best matching block from the blocks (e.g., candidate reference blocks) tested during the searching process. The best matching block may be a reference block 1304. The encoder may determine that reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of reference block 1304 and original samples of current block 1300.

The encoder may search for reference block 1304 within a reference region (e.g., a search range 1308). The reference region (e.g., a search range 1308) may be positioned around a collocated block (or position) 1310, of current block 1300, in reference picture 1306. Collocated block 1310 may have a same position in the reference picture 1306 as the current block 1300 in the current picture 1302. The reference region (e.g., search range 1308) may at least partially extend outside of reference picture 1306. Constant boundary extension may be used, for example, if the reference region (e.g., search range 1308) extends outside of reference picture 1306. The constant boundary extension may be used such that values of the samples in a row or a column of reference picture 1306, immediately adjacent to a portion of the reference region (e.g., search range 1308) extending outside of reference picture 1306, may be used for sample locations outside of reference picture 1306. A subset of potential positions, or all potential positions, within the reference region (e.g., search range 1308) may be searched for reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of reference block 1304 may be indicated by a reference index pointing into a reference picture list comprising reference picture 1306.

Figure 13B:
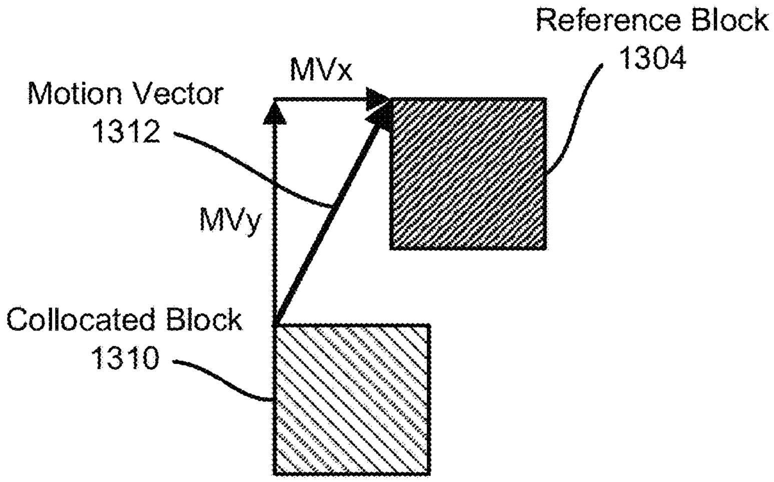
FIG. 13B shows an example motion vector.

FIG. 13B shows an example motion vector. A displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component (MVx) and a vertical component (MVy) relative to the position of current block 1300. A motion vector (e.g., motion vector 1312) may have fractional or integer resolution. A motion vector with fractional resolution may point between two samples in a reference picture to provide a better estimation of the motion of current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between reference block 1304 and current block 1300. The encoder may determine the difference between reference block 1304 and current block 1300, for example, based on/after reference block 1304 is determined and/or generated, using inter prediction, for current block 1300. The difference may be a prediction error (e.g., a residual). The encoder may store and/or send (e.g., signal), in/via a bitstream, the prediction error and/or related motion information. The prediction error and/or the related motion information may be used for decoding (e.g., decoding current block 1300) and/or other forms of consumption. The motion information may comprise the motion vector 1312 and a reference indicator/index. The reference indicator may indicate the reference picture 1306 in a reference picture list. The motion information may comprise an indication of motion vector 1312 and/or an indication of the reference indicator/index. The reference indicator may indicate reference picture 1306 in the reference picture list comprising reference picture 1306. A decoder may decode current block 1300 by determining and/or generating the reference block 1304. The reference block 1304 may correspond to/form (e.g., be considered as) a prediction of the current block 1300. The decoder may determine and/or generate the reference block 1304, for example, based on the related motion information. The decoder may decode current block 1300 based on combining the prediction (e.g., a reference block) with the prediction error (e.g., a residual block).

Inter prediction, as shown in FIG. 13A, may be performed using one reference picture 1306 as a source of a prediction for current block 1300. Inter prediction based on a prediction of a current block using a single picture may be referred to as uni-prediction.

Inter prediction of a current block, using bi-prediction, may be based on two pictures (e.g., the source of prediction may be from the two pictures). Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
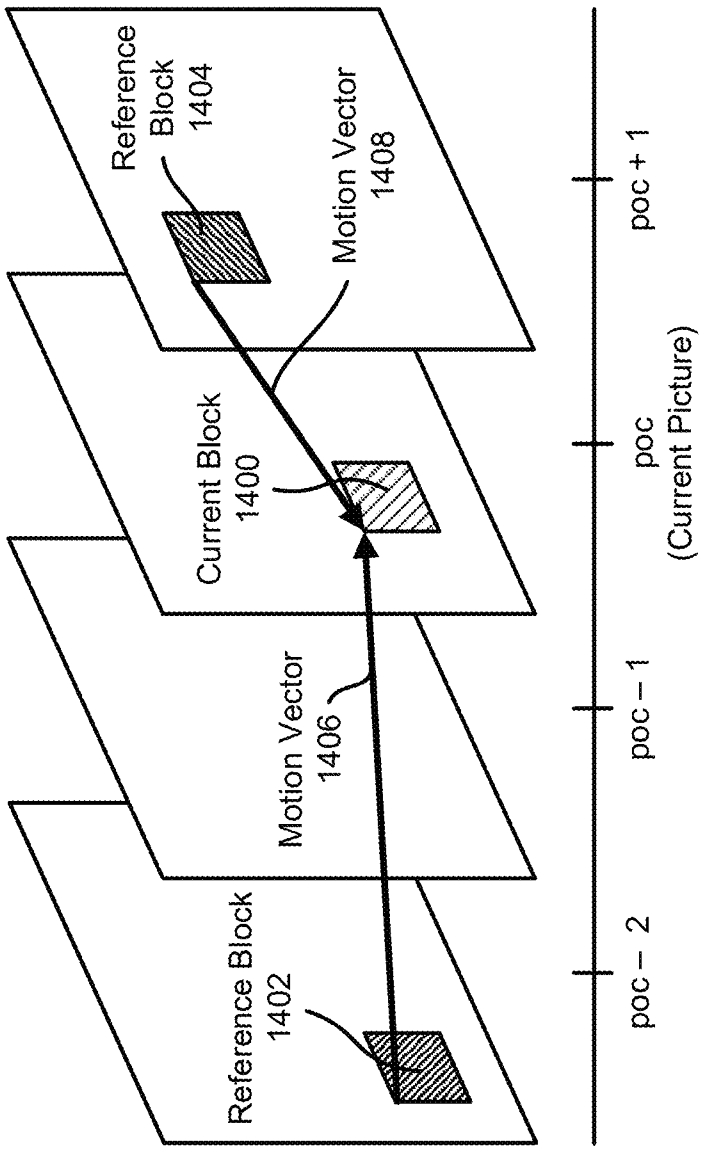
FIG. 14 shows an example of bi-prediction.

FIG. 14 shows an example of bi-prediction. More specifically, FIG. 14 shows an example of bi-prediction performed for a current block. Two reference blocks 1402 and 1404 may be used to predict a current block 1400. Reference block 1402 may be in a reference picture of one of reference picture list 0 or reference picture list 1. Reference block 1404 may be in a reference picture of another one of reference picture list 0 or reference picture list 1. As shown in FIG. 14, reference block 1402 may be in a first picture that precedes (e.g., in time) a current picture of current block 1400, and the reference block 1404 may be in a second picture that succeeds (e.g., in time) the current picture of current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between current block 1400 and each of reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption.

The motion information for reference block 1402 may comprise a motion vector 1406 and/or a reference indicator/index. The reference indicator may indicate a reference picture, of the reference block 1402, in a reference picture list. The motion information for reference block 1402 may comprise an indication of motion vector 1406 and/or an indication of the reference index. The reference index may indicate the reference picture, of reference block 1402, in the reference picture list.

The motion information for reference block 1404 may comprise a motion vector 1408 and/or a reference index/indicator. The reference indicator may indicate a reference picture, of the reference block 1404, in a reference picture list. The motion information for reference block 1404 may comprise an indication of motion vector 1408 and/or an indication of the reference index. The reference index may indicate the reference picture, of the reference block 1404, in the reference picture list.

A decoder may decode current block 1400 by determining and/or generating the reference blocks 1402 and 1404. The decoder may determine and/or generate the reference blocks 1402 and 1404, for example, based on the respective related motion information for the reference blocks 1402 and 1404. The reference blocks 1402 and 1404 may correspond to/form (e.g., be considered as) the prediction (e.g., used to generate a prediction block) of the current block 1400. The decoder may decode the current block 1400 based on combining the prediction with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques (such as those in HEVC and VVC) may comprise advanced motion vector prediction (AMVP) and/or inter prediction block merging (e.g., merge mode).

An encoder (e.g., encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may reciprocally generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector (e.g., comprising a horizontal component (MVx) and a vertical component (MVy)) that indicates a position relative to a position of the current block being coded, the MVD may be represented by two components $MVD_x$ and $MVD_y$. $MVD_x$ and $MVD_y$ may be determined/calculated as:

$$MVD_x = MV_x - MVP_x, \quad (15)$$

$$MVD_y = MV_y - MVP_y. \quad (16)$$

$MVD_x$ and $MVD_y$ may respectively represent horizontal and vertical components of the MVD. $MVP_x$ and $MVP_y$ may respectively represent horizontal and vertical components of the MVP.

A decoder (e.g., decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block (e.g., a prediction block). The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
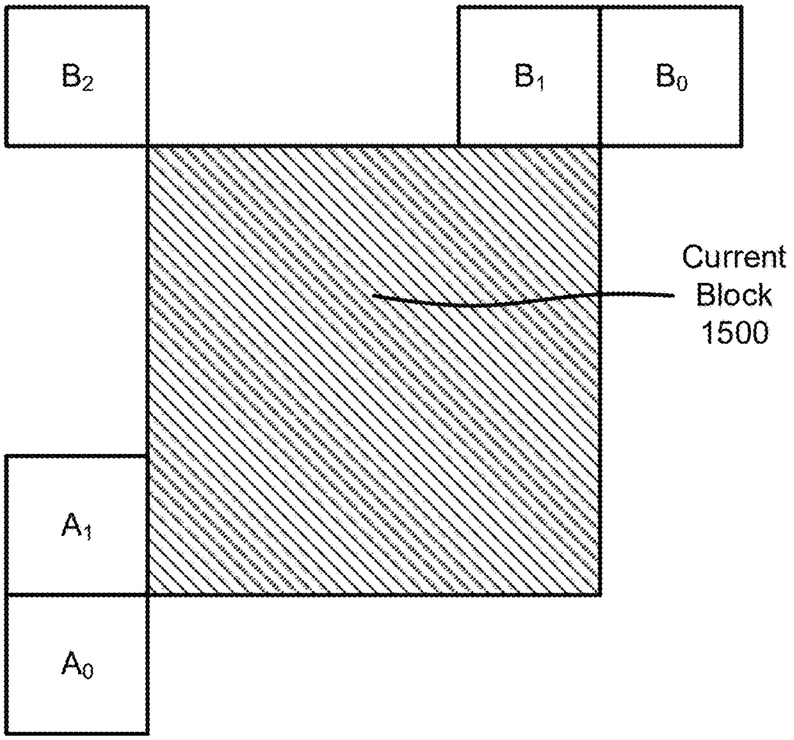
FIG. 15A shows example spatial candidate neighboring blocks for a current block.
Figure 15B:
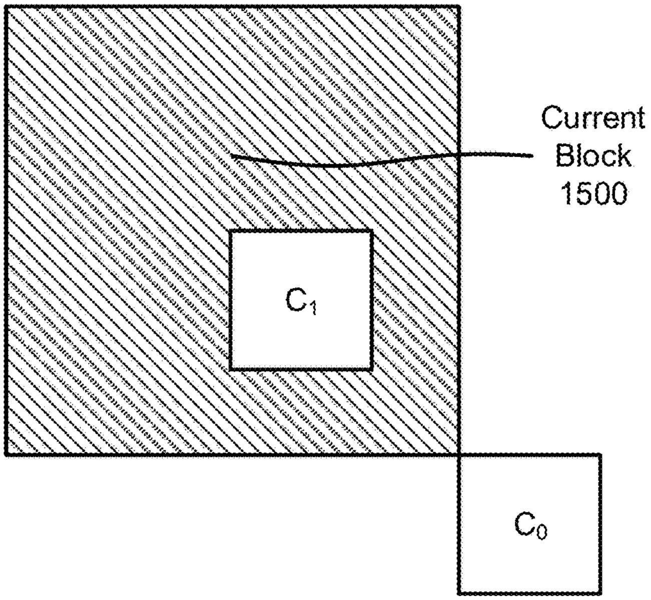
FIG. 15B shows example temporal, co-located blocks for a current block.

FIG. 15A shows example spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to current block 1500 being coded. The two temporal, co-located blocks may be C0 and C1. The two temporal, co-located blocks may be in one or more reference pictures that may be different from the current picture of current block 1500.

An encoder (e.g., encoder 200 as shown in FIG. 2) may code a motion vector using inter prediction block merging (e.g., a merge mode). For example, the encoder (e.g., using merge mode) may reuse the same motion information of a neighboring block (e.g., one of neighboring blocks A0, A1, B0, B1, and B2) for inter prediction of a current block. For example, the encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may reciprocally generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bitstream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History-based motion vector prediction (HMVP), combined intra/inter prediction mode (CIIP), and/or merge mode with motion vector difference (MMVD) (e.g., as described in VVC) may be performed/used and are within the scope of the present disclosure.

A block matching operation (or technique) may be applied/used (e.g., in inter prediction) to determine a reference block in a different picture than that of a current block being coded (e.g., encoded and/or decoded). A block matching operation also may be applied/used to determine a reference block in a same picture as that of a current block being coded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture.

Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples (e.g., reconstructed samples) of the current picture. The reference block may comprise decoded blocks of samples of the current picture prior to being processed by in-loop filtering operations (e.g., deblocking and/or SAO filtering).

Figure 16:
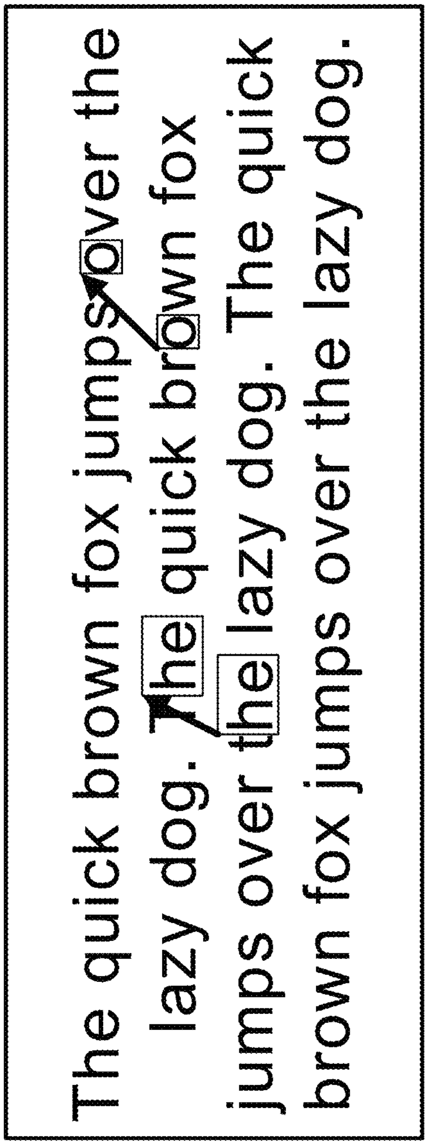
FIG. 16 shows an example of intra block copy (IBC).

FIG. 16 shows an example of IBC (e.g., an IBC mode). The example shown in FIG. 16 may correspond to screen content. The rectangular portions/sections with arrows beginning at their boundaries may be the current blocks being encoded. The rectangular portions/sections that the arrows point to may be the reference blocks for predicting the respective current blocks.

A reference block may be determined and/or generated, for a current block, using IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction (e.g., a prediction block) of the current block. The decoder may decode the current block by combining the prediction (e.g., a prediction block) with the prediction error (e.g., residual or residual block).

A BV may be predictively coded (e.g., in HEVC, VVC, and/or any other coding standards/formats/protocols) before being stored and/or sent/signaled in/via a bitstream. For example, the BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may reciprocally generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate (e.g., point to) the selected BVP in the list of candidate BVPs. The BVD may be determined/calculated based on a difference between a BV of the current block and the selected BVP. For example, for a BV (e.g., represented by a horizontal component (BVx) and a vertical component (BVy)) that indicates a position relative to a position of the current block being coded, the BVD may be represented by two components $BVD_x$ and $BVD_y$. $BVD_x$ and $BVD_y$ may be determined/calculated as:

$$BVD_x = BV_x - BVP_x, \tag{17}$$

$$BVD_y = BV_y - BVP_y. \tag{18}$$

BVDx and BVDy may respectively represent horizontal and vertical components of the BVD. BVPx and BVPy may respectively represent horizontal and vertical components of the BVP. A decoder (e.g., decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction (e.g., a prediction block) of the current block. The decoder may decode the current block by combining the prediction (e.g., the prediction block) with the prediction error (e.g., residual or residual block).

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks of a current block being coded using IBC may be respectively denoted A0, A1, B0, B1, and B2 as shown in FIG. 15A.

The most probable mode (MPM) may refer to a best mode for a current block being coded (e.g., encoded and/or decoded). For example, the MPM may refer to the intra prediction mode (IPM) that is (e.g., most likely to be) the best mode for the current block being encoded or decoded. The MPM may be determined by analyzing the intra prediction modes of the neighboring CUs (e.g., blocks) of a current block (or CU) to be coded (e.g., encoded or decoded), for example, in at least some intra prediction techniques. Video coding may use an MPM list for luma intra prediction. For example, VVC uses an MPM list (e.g., a list of 6 MPMs) for luma intra prediction. The MPM list may be derived from the intra prediction modes of the neighboring CUs, and/or may be updated as the encoder progresses through the video frame. When/If encoding a block, the encoder may determine if the current block is a candidate for any of the MPMs in the MPM list. The encoder may compare prediction errors of respective MPMs to determine which MPM from the MPM list is the best mode for the current block, for example, if the current block is a candidate for any of the MPMs in the MPM list. The encoder may evaluate all intra prediction modes (e.g., 67 in VVC) to determine the best mode for the current block, for example, if the current block is not a candidate for any of the MPMs in the MPM list.

The use of MPMs may improve (e.g., significantly improve) the coding efficiency. The use of MPMs may improve (e.g., significantly improve) the coding efficiency because the encoder does not need to signal the intra prediction mode for the current block if such mode is one of the MPMs (e.g., in the MPM list). The encoder does not need to signal the mode number which may require a significant number/quantity of bits. Instead, for example, the encoder may signal an index to the MPM list. The decoder may infer the intra prediction mode for the current block from the corresponding MPM list generated (e.g., reciprocally and identically generated) at the decoder. Advantages such as reduced signaling overhead in the bitstream and increased efficiency may be achieved.

Various types of intra modes may be considered to construct the MPM list. For example, three types of intra modes may be considered to construct the MPM list: default intra modes; neighboring intra modes; and derived intra modes. A unified MPM (e.g., 6-MPM) list may be used for intra blocks, for example, irrespective of whether Multiple Reference Lines (MRL) and Intra Sub-Partitions (ISP) coding tools are applied/used. The MPM list for the current block may be constructed, for example, based on intra modes of neighbor (or neighboring) blocks of the current block. The MPM list for the current block may be constructed, for example, based on intra modes of a left neighbor block (e.g., block corresponding to A1 in FIG. 15A) and an above neighbor block (e.g., block corresponding to B1 in FIG. 15A) of the current block. The intra mode of the left neighbor block may be denoted as Left. The intra mode of the above neighbor block may be denoted as Above. The unified MPM list may be constructed as follows: when/if a neighboring block is not available, its intra mode may be set to planar mode by default; if both modes Left and Above are non-angular modes, then the MPM list may be set to include {planar, DC, V, H, V−4, V+4}, where "V" and "H" may refer to vertical mode and horizontal mode, respectively; if one of modes Left and Above is an angular mode, and the other is non-angular, set a mode Max as the larger mode in Left and Above, and set the MPM list to include {planar, Max, Max−1, Max+1, Max−2, Max+2}; if Left and Above are both angular and are different, set a mode Max as the larger mode in Left and Above and a mode Min as the smaller mode in Left and Above, and if Max-Min is equal to 1, then set the MPM list to include {planar, Left, Above, Min−1, Max+1, Min−2}, if Max−Min is greater than or equal to 62, then set the MPM list to include {planar, Left, Above, Min+1, Max−1, Min+2}, if Max-Min is equal to 2, set the MPM list to include {planar, Left, Above, Min+1, Min−1, Max+1}, or otherwise, set the MPM list to include {planar, Left, Above, Min−1, −Min+1, Max−1}; and if Left and Above are both angular and are the same, set the MPM list to include {planar, Left, Left−1, Left+1, Left−2, Left+2}.

An encoder may encode an MPM index in a bitstream to indicate the position of a selected intra prediction mode in a MPM list to a decoder. The encoder may represent the MPM index as a codeword and may encode (e.g., entropy encode) the codeword into the bitstream. The decoder may derive the MPM list (e.g., in a manner identical to the encoder), and use the MPM index obtained from the codeword decoded from bitstream to obtain the intra prediction mode from the MPM list derived at the decoder. The first bin of codeword, representing the MPM index, may be context coded using an arithmetic coder (e.g., CABAC) so as to achieve additional coding efficiencies. For example, three contexts may be used, corresponding to whether the current intra block is MRL enabled, ISP enabled, or a normal intra block.

Pruning may be used to remove duplicated intra modes. Pruning may be used to remove duplicated intra modes so that the MPM list includes only unique intra modes, for example, during the 6 MPM list generation process. For entropy coding of the 61 non-MPM modes (that is, the 67 modes in VVC minus the 6 MPM), a truncated binary code (TBC) may be used.

The MPM list may be extended to include additional candidates (e.g., 16 additional candidates), and may be divided into two parts: the primary MPM (PMPM) (e.g., including 6 entries) and the secondary MPM (SMPM) (e.g., including 16 entries). The first entry in a general MPM list may be a planar mode. The remaining entries may include the intra modes of the adjacent neighboring blocks corresponding to positions left (L), above (A), below-left (BL), above-right (AR), and above-left (AL) (e.g., shown in FIG. 15A as A1, B1, A0, B0, and B2), and decoder-side intra mode derivation (DIMD) modes which may be sorted in ascending order of a cost such as, for example, SAD, SSD, SATD, etc. Up to a preconfigured/predetermined number/quantity of modes (e.g., 5) with the smallest costs may be added to the MPM list. The cost for a respective MPM (e.g., an IPM corresponding to an entry in the MPM list) may be determined (e.g., computed) between the prediction of the reconstructed samples of the template of the current block and the reconstructed samples. For example, the prediction may be generated by applying/using the respective MPM for the template. Sorted directional modes may be added into the general MPM list, and then into the default modes, until a general MPM list with a predetermined quantity (e.g., 22) entries is constructed. The order of neighboring blocks may correspond to A, L, BL, AR, AL, for example, if a CU block is vertically oriented. The order of neighboring blocks may correspond to L, A, AL, AR, BL, for example, if a CU block is not vertically oriented.

Figure 17:
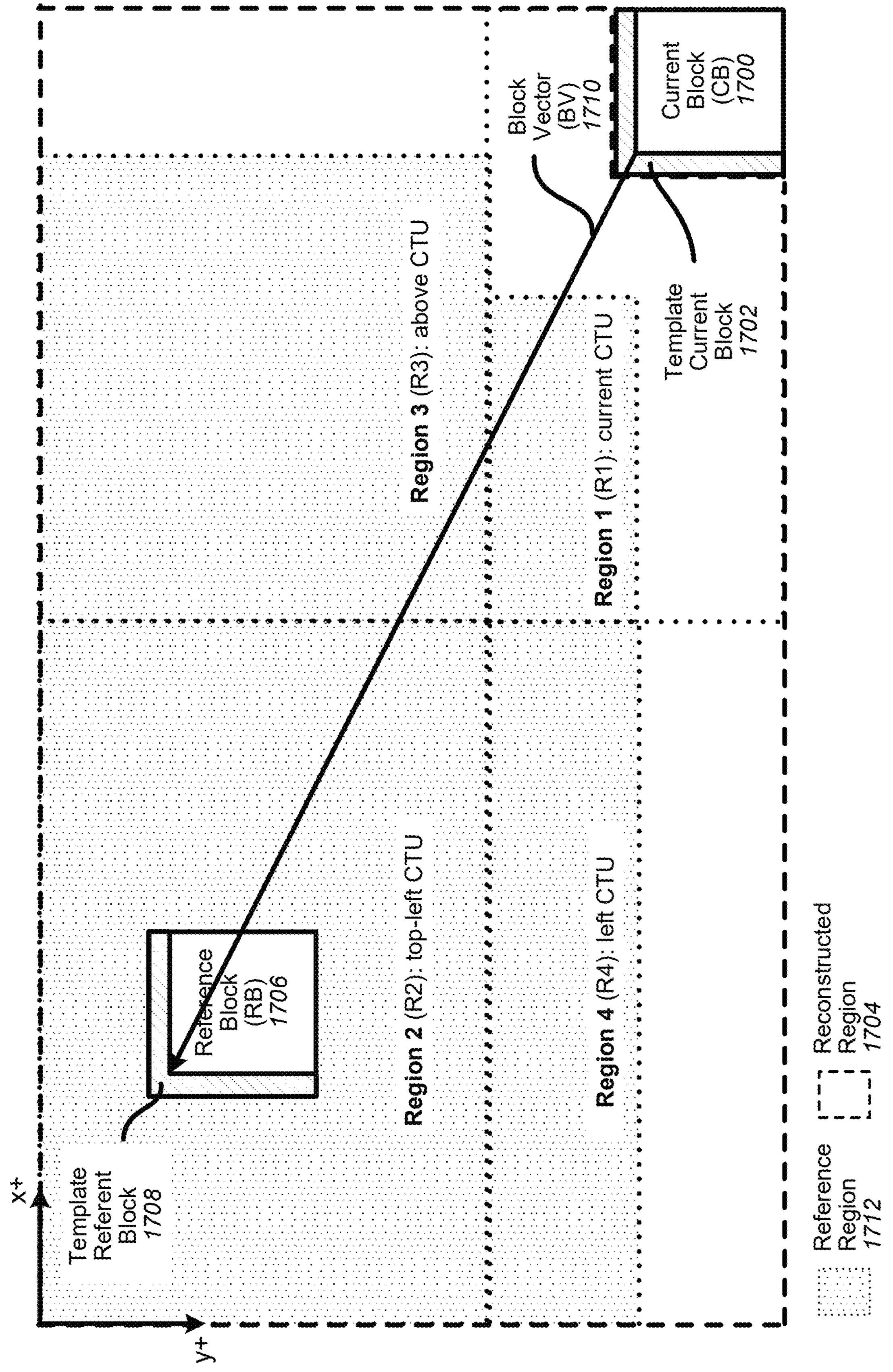
FIG. 17 shows an example of intra-template matching prediction (IntraTMP).

Intra-template matching prediction (IntraTMP) may be a special intra-prediction mode that may select a prediction block within a predetermined reference region (RR) or search area from the reconstructed samples within the current frame. IntraTMP may use a predefined template of the current block to search for a candidate reference block of which the template best matches the template of the current block. FIG. 17 shows an example of intra-template matching prediction (IntraTMP). More specifically, FIG. 17 shows, for an example current block 1700, a reference region 1712 or search area from the reconstructed samples (or reconstructed region) 1704 within which a search is performed for a candidate reference block 1706. The template 1708 ("candidate reference block template") of the candidate reference block 1706 best matches the template 1702 ("current block template") of the current block 1700. The reference region may be divided in four rectangular reference regions (e.g., R1, R2, R3, and R4).

A number/quantity of (e.g., N) candidates with lower template costs may be stored in an intraTMP list and ranked by lower cost value (e.g., ascending cost). A number/quantity of (e.g., N) candidates with lower template costs may be stored in an intraTMP list and ranked by lower cost value (e.g., ascending cost), for example, based on determining (e.g., computing) a cost function (e.g., SAD, SATD) between the template 1702 of the current block and the templates of several candidate reference blocks. Each of the candidates with lower template costs may be indicated by a corresponding block vector predictor (BVP) candidate 1710 (BVP candidate may also be referred to herein as block vector (BV) candidate). This process may be performed by both encoder and decoder.

The residual blocks obtained as the difference between the samples of the current block 1700 and the candidate reference blocks 1706 in the list may be determined (e.g., computed), and the reference block with the better rate-distortion performance may be selected as the best intraTMP reference block. An index indicating the position of the best BVP or BV candidate within the intraTMP list may be signaled to the decoder, for example, to facilitate the block decoding using the IntraTMP prediction mode.

Template matching in the reference region 1712 may be performed in a plurality of sub-regions. Template matching in the reference region 1712 may be performed in a plurality of sub-regions (e.g., a set of rectangular sub-regions, e.g., R1 to R4 in the example of FIG. 17), for example, due to the reference region having an irregular (e.g., non-rectangular) shape and to facilitate hardware implementation. The dimensions of the sub-regions may be determined, for example, based on the current block's size and relative position inside the current CTU.

The dimensions of the reference region 1712 comprising all sub-regions (e.g., global reference region) may be determined by the parameters such as SearchRange_w and SearchRange_h. These parameters may be set proportional to the dimensions of the current block 1700 (e.g., CbWidth, CbHeight), for example, by using a multifactor parameter denoted as 'a'. The multifactor parameter 'a' may control the gain/complexity trade-off. The multifactor parameter 'a' may be uniform and equal to 5, or may be determined by the current block dimensions based on the following equations:

$$\text{SearchRange\_w} = a * CbWidth$$

$$\text{SearchRange\_h} = a * CbHeight$$

The global reference region for block dimensions 4 and 8 may be extended to 64 pixels, based on the following equations:

$$SearchRange\_w = \max(64, 5 * CbWidth)$$

$$SearchRange\_h = \max(64, 5 * CbHeight)$$

This may have the effect of using a variable multifactor parameter 'a' based on the block dimensions, as shown in the following table:

| Block size | 64 | 32 | 16 | 8 | 4 |
|---|---|---|---|---|---|
| Multifactor'a' | 5 | 5 | 5 | 8 | 16 |
| SearchRange_w | 320 | 160 | 80 | 64 | 64 |
| SearchRange_h | 320 | 160 | 80 | 64 | 64 |

Figure 18:
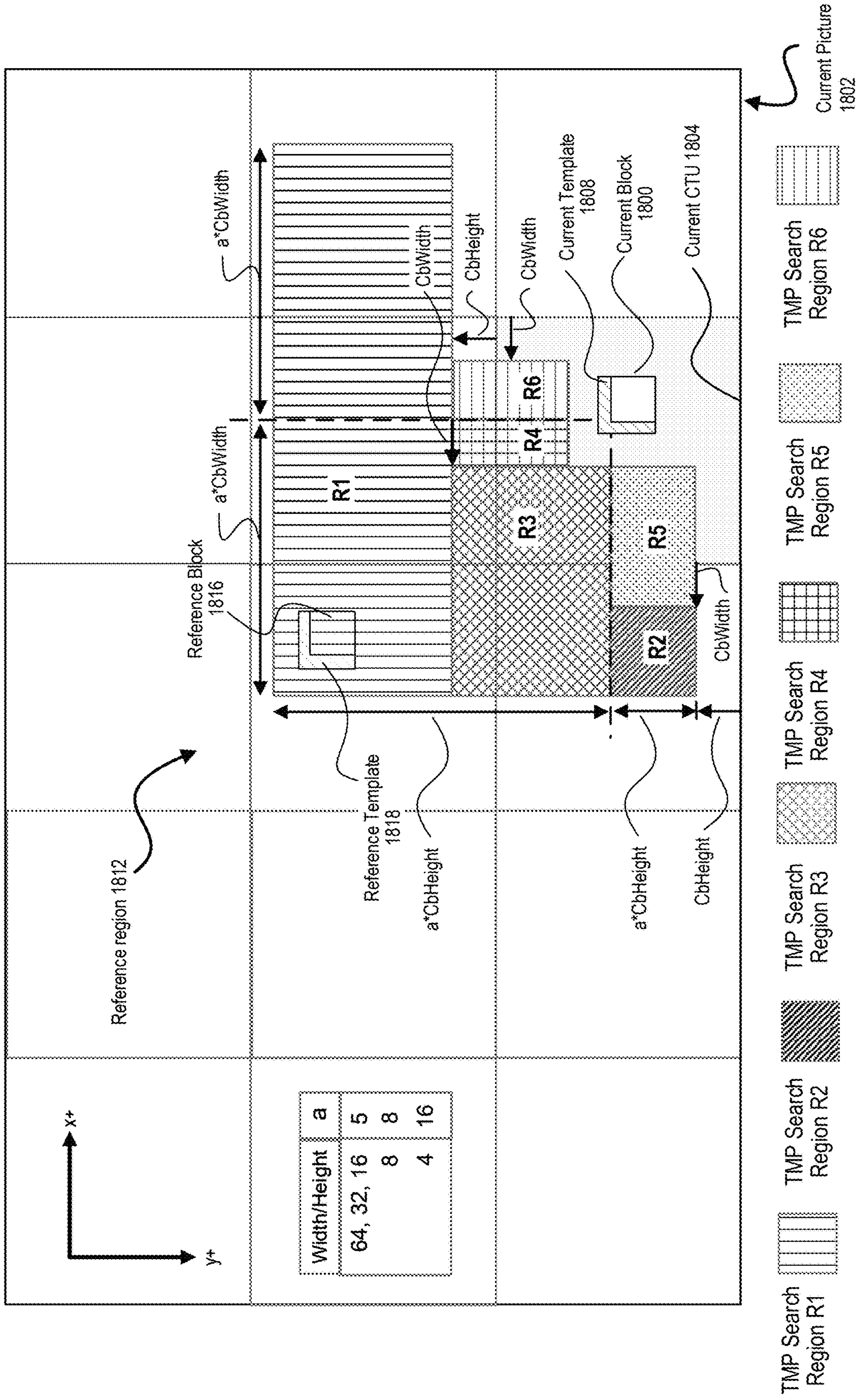
FIG. 18 shows an example of a current block and a reference region.

FIG. 18 shows an example of a current block and a reference region. More specifically, FIG. 18 shows a current block 1800 in a current CTU 1804 of a current picture 1802, and a reference region 1812 with examples of identified corresponding TMP search regions R1-R6. Additionally, examples of a reference block 1816, a reference block template 1818, and a current block template 1808 may be shown.

Figure 19A:
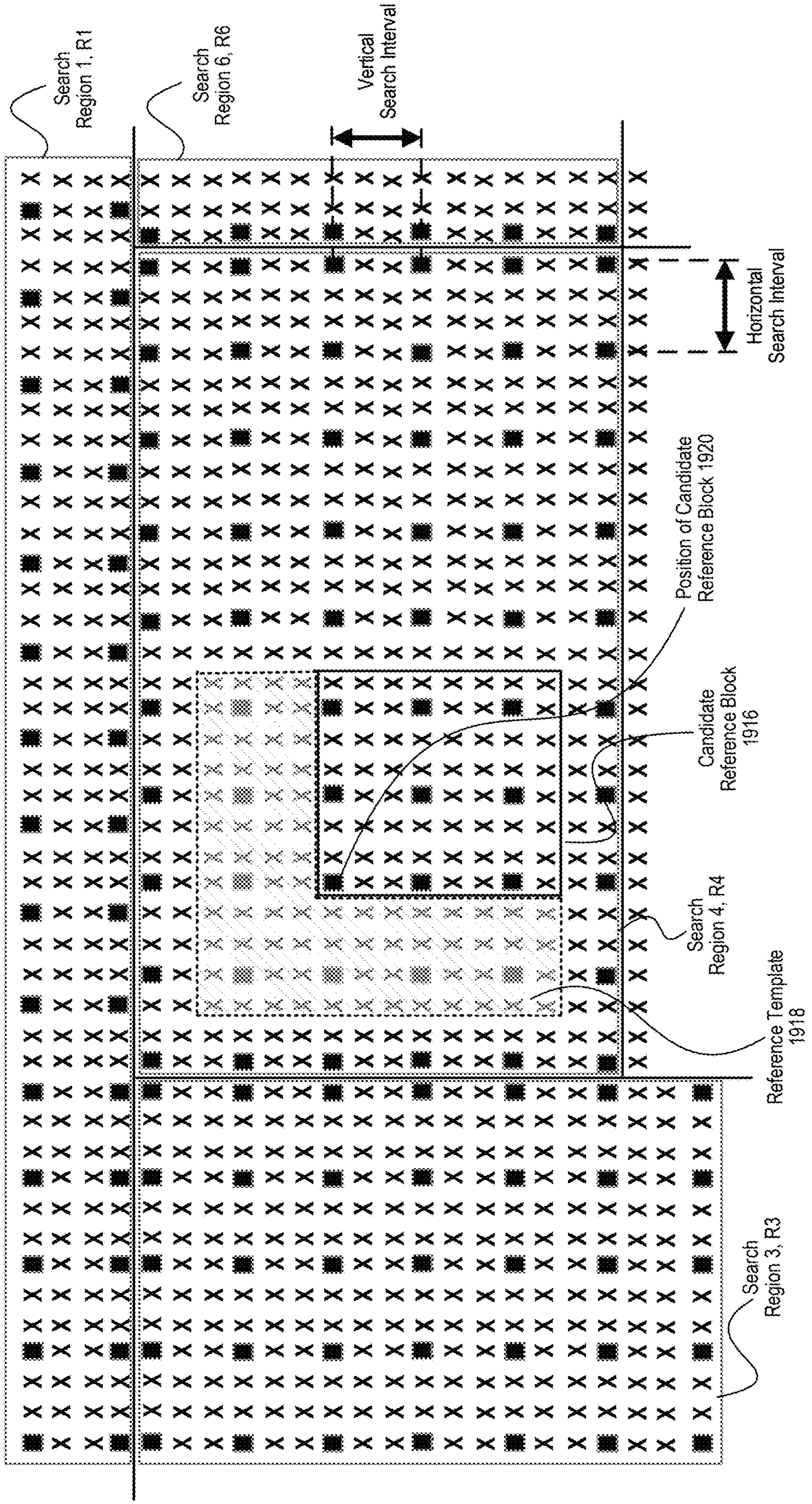
FIG. 19A shows an example of a sparse search.

A search process may be performed in two steps: a sparse search step, and a refinement search step. A search process may be performed in two steps: a sparse search step, and a refinement search step, for example, to reduce the high computational burden of an exhaustive template matching search in the whole reference region. FIG. 19A shows an example of a sparse search (e.g., of IntraTMP). The sparse search may be performed in a regular grid using a subsampling interval (e.g., of 3) in the horizontal and vertical directions. FIG. 19A shows an example candidate reference block 1916 in a search region 4 (R4) and a corresponding reference template 1918. The template cost may be determined (e.g., computed) for each reference block position (or position of candidate reference block) within a search region (e.g., reference block position 1920 of reference block 1916). BVP candidates associated with the best (e.g., least cost) reference blocks may be recorded in a list (e.g., Sparse List) and sorted in an (e.g., ascending) order of cost. Subsample positions may be shown in the form of dark squares in/within the reference region. Subsample positions may be separately determined for each search region. The size of the list (e.g., Sparse List) may be set/determined, for example, to 30.

Figure 19B:
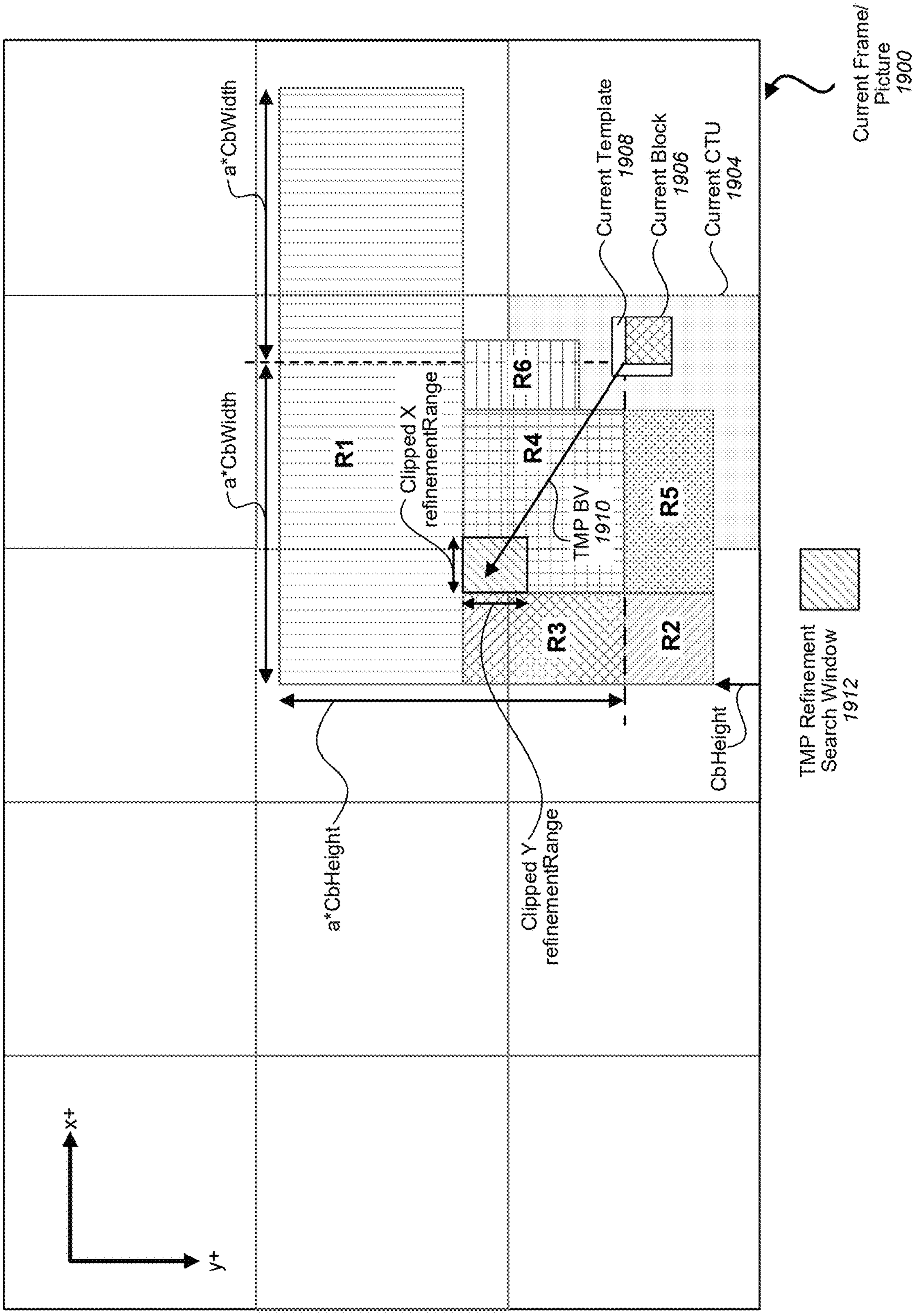
FIG. 19B shows an example block vector.

The refinement search (which is the second step of the search) may be a refinement of the reference block candidates (e.g., BVP candidates) in the list (e.g., Sparse List). Refinement may be made in a refinement window (or refinement search window, search window, refine window) around the reference block candidates from the sparse search, using a sampling interval. For example, refinement may be made in a window of 3×3 pixels around the sparse BVP candidates using a sampling interval of 1. If the refinement window crosses into another search region, the refinement window may be clipped to the region boundary to which the candidate(s) may belong. FIG. 19B shows an example block vector. More specifically, FIG. 19B shows a block vector according to IntraTMP where the block vector's refinement window is clipped at the boundary of a search region. FIG. 19B shows a current block 1906 and a current template 1908 located in a current CTU 1904 of a current frame 1900 (or current picture), a corresponding reference region with respective search regions R1-R6, and an example BVP 1910. A refinement search window 1912 of the example BVP 1910 may be clipped where R4 (a search region in which the BVP 1910 is located) borders RI and R3. Refined candidates (e.g., 19 refined candidates) with the lowest template cost (e.g., SAD cost) may be selected, for example, for a Refined IntraTMP list.

The encoder/decoder may select among different intraTMP sub-modes by checking the rate-distortion performance of each sub-mode. The encoder/decoder may select among different intraTMP sub-modes by checking the rate-distortion performance of each sub-mode, for example, based on that the encoder/decoder has constructed the Refined IntraTMP List. An IntraTMP sub-mode may be signaled to the decoder in combination with an index to the best candidate in the Refined IntraTMP List or a cluster of candidates (e.g. the Fusion mode). The IntraTMP sub-mode may be a single predictor sub-mode, a fusion sub-mode, a sub-pel precision sub-mode, and/or a linear filter model sub-mode. In the single predictor sub-mode, a single BVP candidate may be selected from the Refined IntraTMP List and signaled to the decoder. In the fusion sub-mode, multiple BVP candidates may be blended to derive the final BV prediction block. The blending weights may be determined (e.g., computed) cither from the template matching cost of each predictor or with a Wiener-filter-based weight derivation method. In the sub-pel precision sub-mode, when a single predictor is used, sub-pel precision may be used with ½-pel precision, ¼-pel precision, and ¾-pel precision, each with 8 possible directions. In the linear filter model sub-mode, a linear filter may be learned between the reference and current templates and applied to (e.g., used for) the reference block. This mode may be used for a single predictor, for example, if/when sub-pel precision is not used and a single predictor may be used.

Several types of template shapes may be used. Several types of template shapes may be used, for example, for at least some examples of IntraTMP. Five types of templates have been proposed according to the current block location in the frame: a top template type, a left template type, an L-shaped template type, an only-top template type, and an only-left template type.

The top template type may be used, for example, if/when only the top samples of a current block are available (e.g., if/when the current block is located at/on the left boundary of a picture). TMP cost may be determined (e.g., computed) using the top samples of both the current block and a reference block. A top template may be, for example, four samples in height.

The left template type may be used, for example, if/when only the left samples of a current block are available (e.g., if/when the current block is located at/on the top boundary of a picture). TMP cost may be determined (e.g., computed) using the left samples of both the current block and a reference block. A left template may be, for example, four samples in width.

The L-shaped template type may be used in the other cases (e.g., a current block is not located at the top or left boundary of a picture) where samples surrounding the current block included in an L-Shape are available. TMP cost may be determined (e.g., computed) using an L-shaped template of both the current block and a reference block. The L-shaped template may be, for example, four samples in width and height.

The L-shaped template may introduce two more template types: the Only-Top (Only-T) and Only-Left (Only-L) templates. In addition to the TMP cost of the L-shaped template, the TMP cost for the Only-T and Only-L templates may be determined (e.g., computed), and the best BV candidates (e.g., N candidates, N referring to number or quantity) may be stored in different Only-T and Only-L lists.

Figure 20:
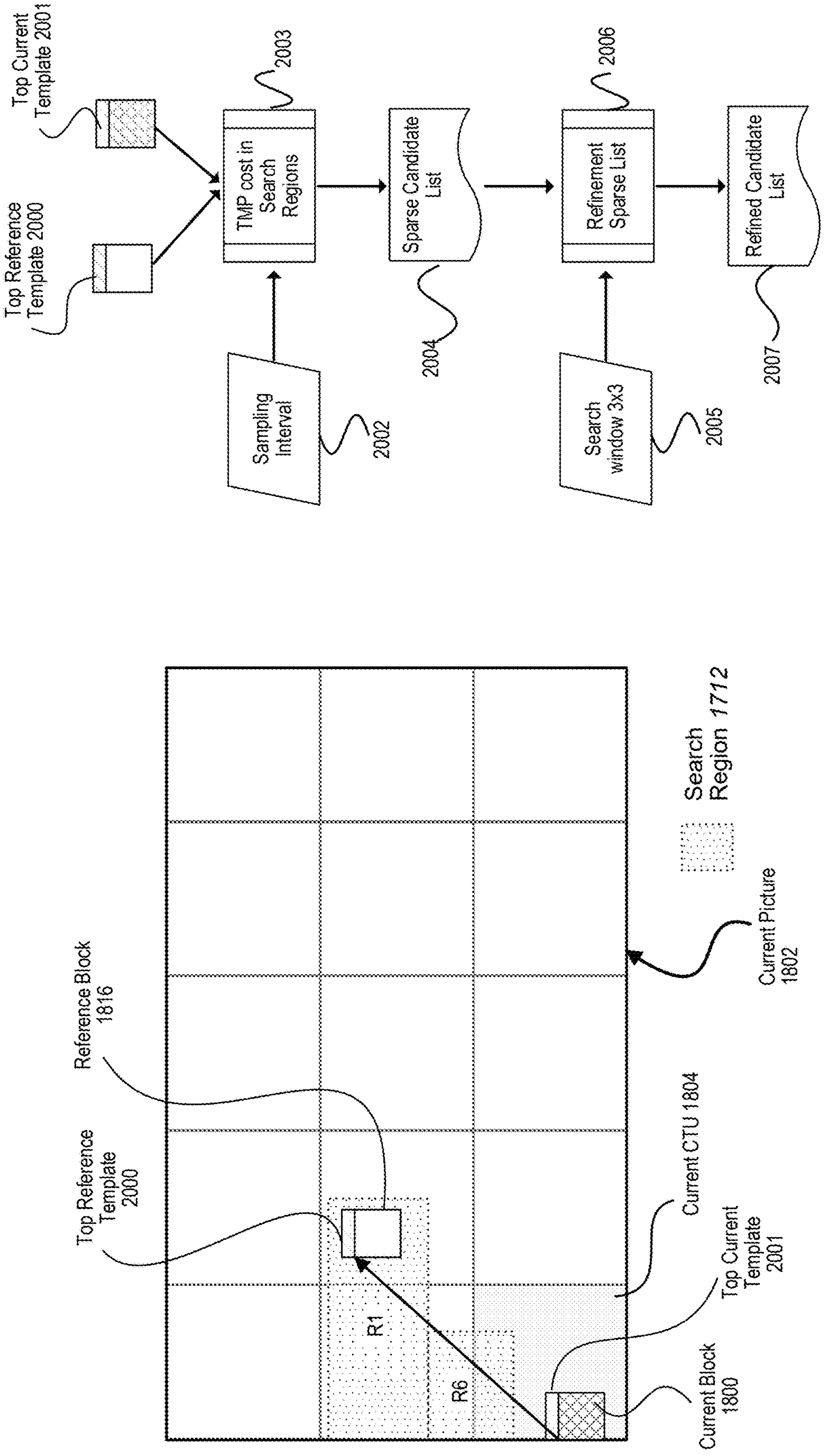
FIG. 20 shows an example of a top-template type.

FIG. 20 shows an example of the top template type (e.g., as used in IntraTMP). Only the top templates (e.g., a template 2001 of a current block 1800 and a template 2000 of a reference block 1816) may be used for the TMP cost determination (e.g., computation) in a sparse search 2003. The sparse search 2003 may be determined (e.g., computed) using a sampling interval (SI) 2002 (e.g., of three), and a sparse candidate list (e.g., Sparse List) 2004 may be generated (e.g., built) using the best (lowest cost) BV candidates (e.g., 30 BV candidates). Those candidates may be refined in a refinement search 2006 using a window (e.g., 3×3 window) 2005 with an SI (e.g., of 1), and a refined candidate list 2007 may be generated (e.g., built).

Figure 21:
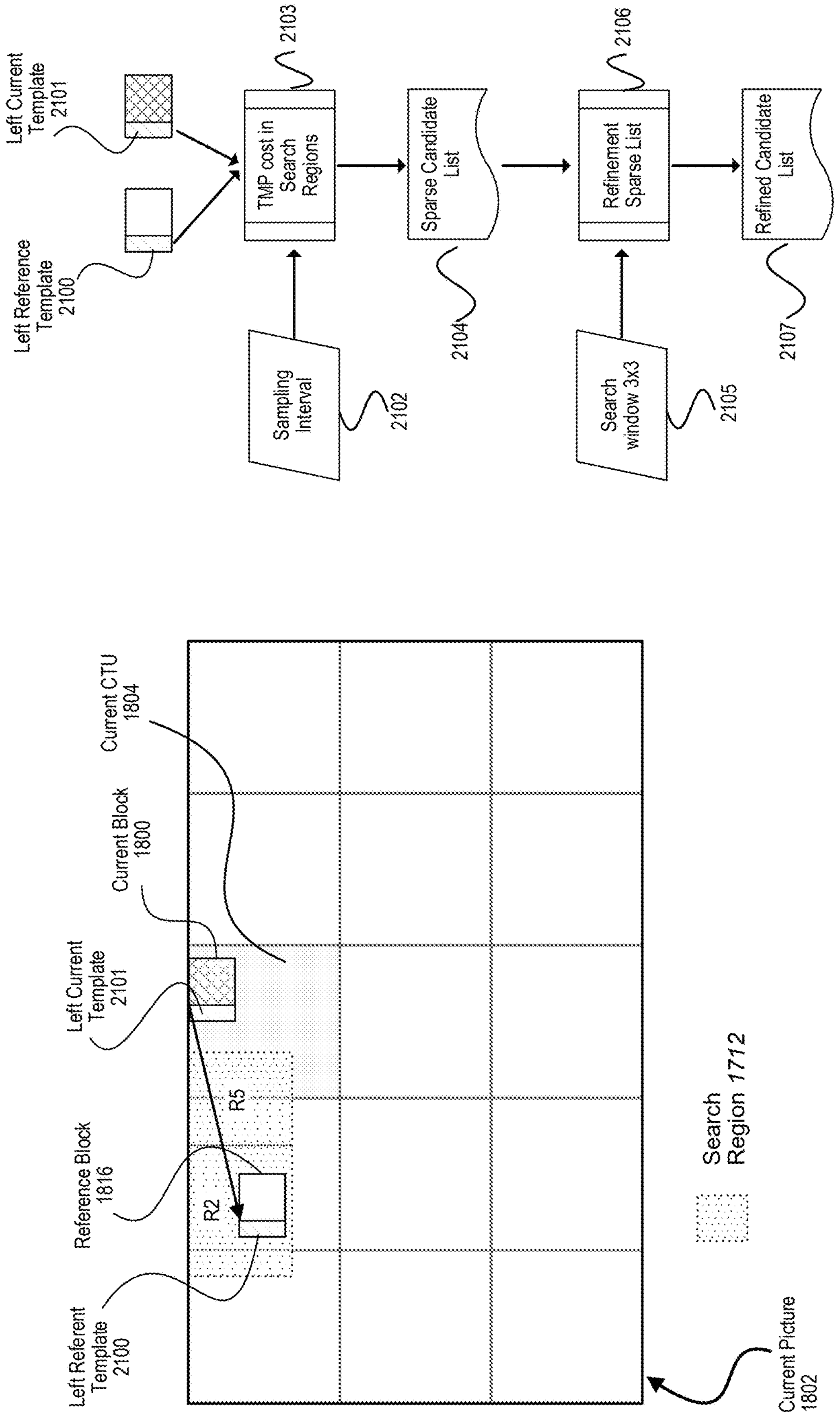
FIG. 21 shows an example of a left-template type.

FIG. 21 shows an example of the left template type (e.g., as used in IntraTMP). The same top template type logic may be applied/used for the left template type. A left template 2100 of a reference block 1816 and a left template 2101 of a current block 1800 may be used, for example, instead of top templates (e.g., as shown in FIG. 20). The TMP cost determination (e.g., calculation) in a sparse search 2103, a sampling interval 2102 for the sparse search, sparse candidate list 2104, a refinement search 2106 (e.g., refinement of the sparse list), a refinement search window 2105, and a refined candidate list 2107 of the left template process shown in FIG. 21 may be identical (except for the use of a left template instead of a top template) to those described with respect to FIG. 20 (e.g., 2003, 2002, 2004, 2006, 2005, and 2007 in FIG. 20).

Figure 22:
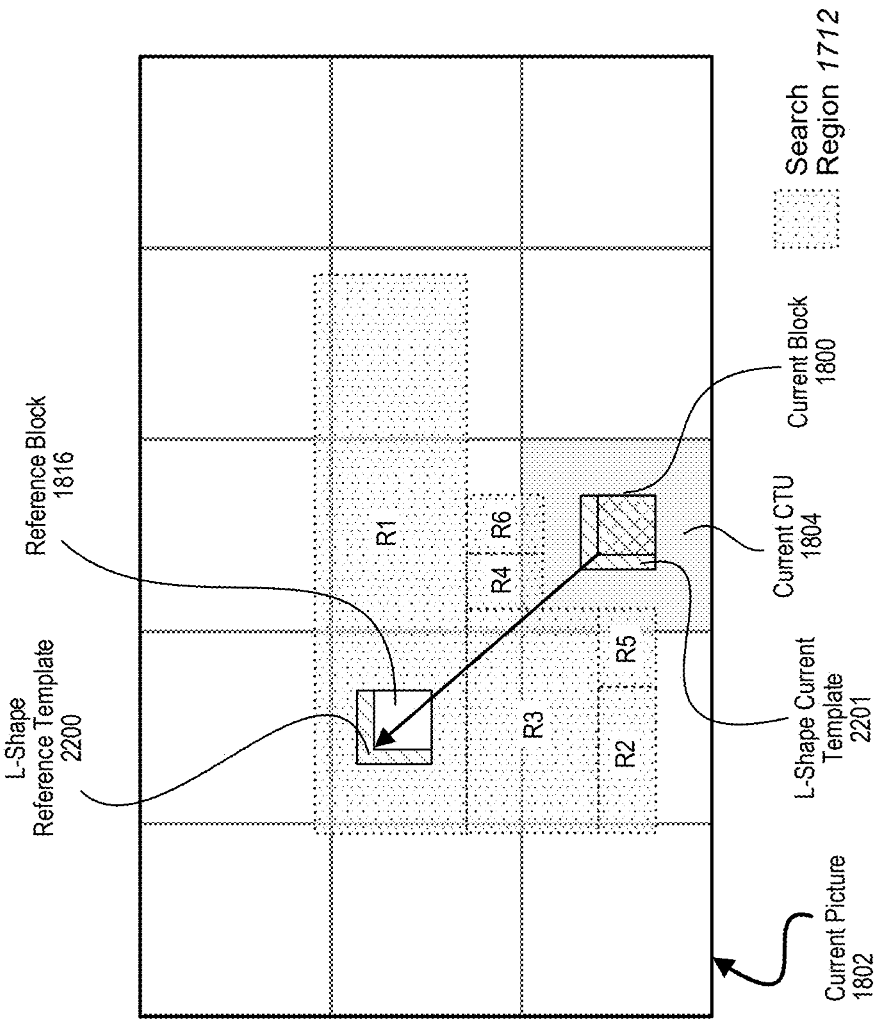
FIG. 22 shows an example of an L-shaped template type.

FIG. 22 shows an example of the L-shaped template type (e.g., as used in IntraTMP). A current block 1800 may have an L-shaped template 2201. For example, reconstructed samples may be available for the L-shaped template 2201. An L-shaped template 2200 of a reference block 1816 may be used to determine (e.g., compute) the L-shape TMP cost in all search regions, as described herein for the top template type and the left template type.

In addition to the L-shape TMP cost, the Only-Top TMP cost and Only-Left TMP cost may be determined (e.g., computed). A sparse search may generate (e.g., build) three sparse candidate lists (e.g., Sparse Lists). The three sparse candidate lists may comprise one Sparse L-Shape List (e.g., with a size of 30 BV candidates), and two additional lists: a Sparse Only-T List and a Sparse Only-L List (e.g., both with a length of 6 BV candidates).

These three sparse candidate lists may be refined by determining (e.g., computing) the cost of respective template type using a refinement search window (e.g., of 3×3). The best BV candidates (e.g., N candidates) may be candidates that have obtained the lower (e.g., lowest) TMP costs. The best BV candidates may be stored in three refined lists: a Refined L-Shape List (e.g., with a size of 19 BV candidates), a Refined Only-T List (e.g., with a length of 3 BV candidates), and a Refined Only-L List (e.g., with a length of 3 BV candidates). The final IntraTMP list may have 19 candidates as the L-Shape List. The final IntraTMP list may be a combination of the BV candidates in the Refined L-Shape List, the Refined Only-T List, and the Refined Only-L List.

IntraTMP is generally described in: F. Wang et al, "EE2-1.20i/j: Combination of IntraTMP tests", JVET-AD0086, April 2023; L. Zhang et al, "EE2-1.11: Intra template matching prediction fusion", JVET-AD0072, April 2023; J.-Y. Huo et al, "EE2-1.16: A Fusion method of Intra Template Matching Prediction (Intra TMP)", JVET-AD0116, April 2023; and P. Lin et al, "EE2-1.19: IntraTMP with multiple modes", JVET-AD0194, April 2023, etc. The content of the listed references are herein incorporated by reference.

Figure 23A:
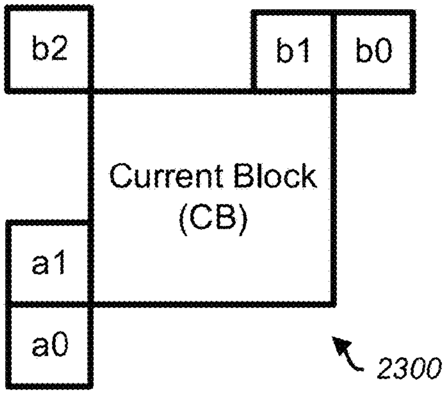
FIG. 23A and FIG. 23B show examples of adjacent blocks and non-adjacent blocks for determining block vector candidates.
Figure 23B:
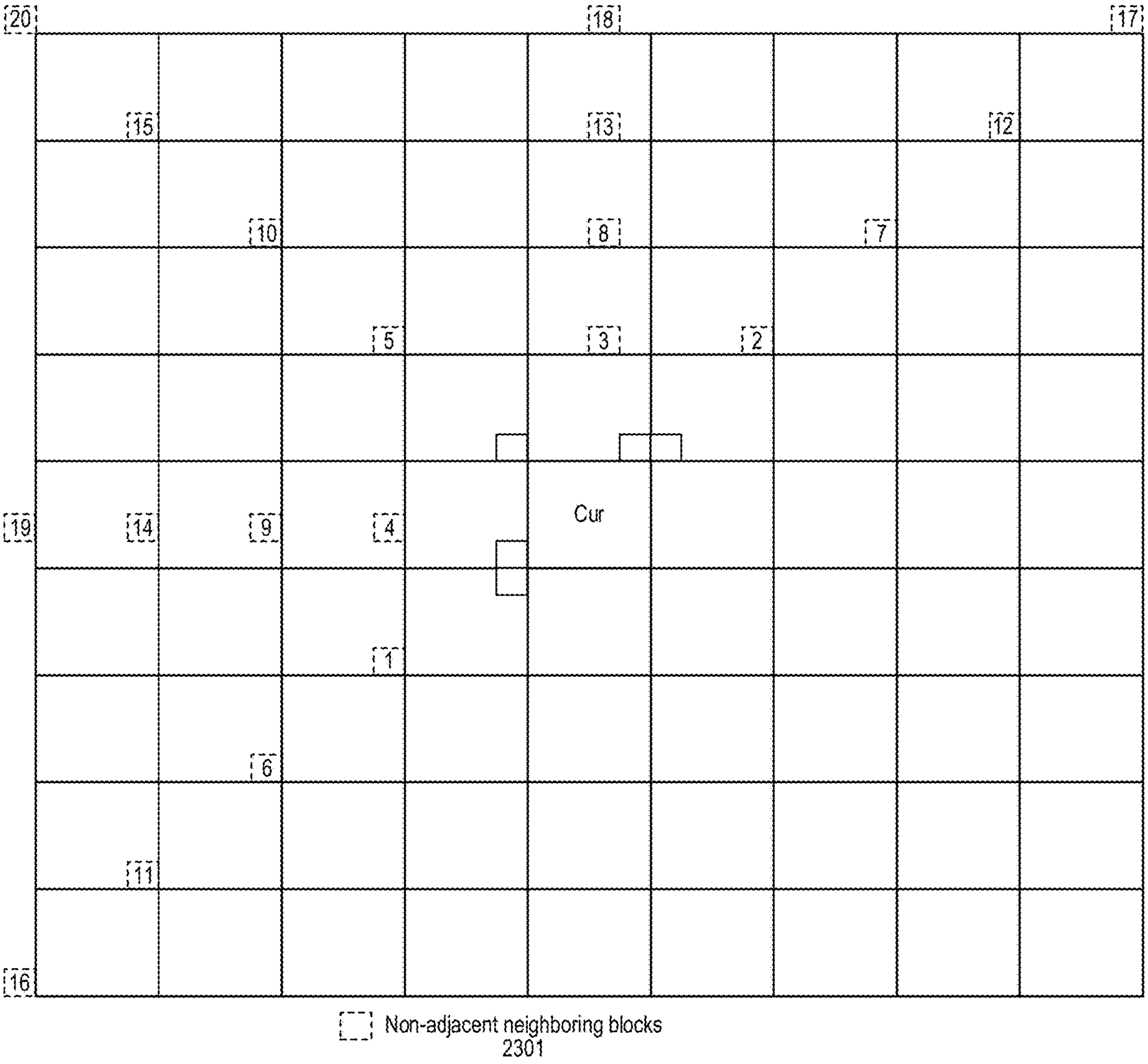

In addition to the sparse BVP candidates obtained by TMP searching within the reference region in IntraTMP, a set of Merge BVP candidates may be proposed in another technique "Intra TMP with Merge Candidates". Merge BVP candidates may be a subset of IBC merge candidates, comprising only the spatial candidates of the current block. FIG. 23A and FIG. 23B show examples of adjacent blocks and non-adjacent blocks for determining block vector candidates (e.g., according to IntraTMP with Merge Candidates). The TMP Merge BVP candidates may use adjacent BV candidates from the adjacent blocks and non-adjacent BV candidates from the non-adjacent neighboring blocks encoded using an IBC or TMP mode. For example, the TMP Merge BVP candidates may use the 5 adjacent BV from the adjacent blocks (e.g., 2300 in FIG. 23A) and the 20 non-adjacent BV candidates (e.g., 2301 in FIG. 23B) from the non-adjacent neighboring blocks encoded using an IBC or TMP mode.

Figure 24:
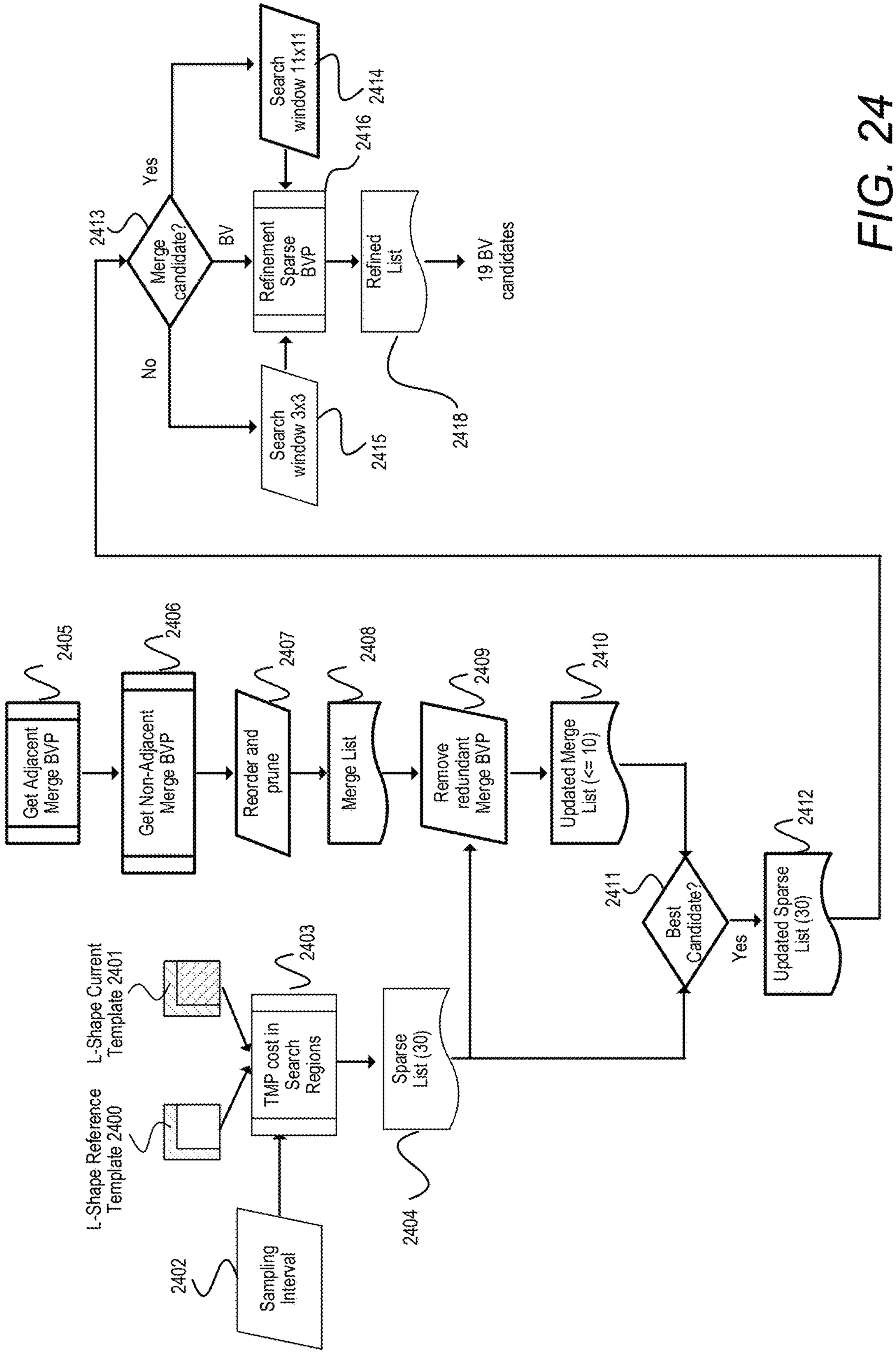
FIG. 24 shows an example method of IntraTMP with merge candidates.

FIG. 24 shows an example method of IntraTMP with merge candidates. Adjacent Merge BVP candidates (e.g., a maximum of 50 BVP candidates) 2405 from adjacent blocks may be obtained. Non-adjacent Merge BVP candidates 2406 from non-adjacent blocks may be obtained. At step 2407, the BVP candidates 2405 and 2406 may be reordered (e.g., ranked in an ascending order of TMP cost). The best candidates (e.g., candidates with lower TMP costs, e.g., 10 best candidates) may be selected and may form a merge list (e.g., TMP Merge List) 2408. The best candidates in the merge list may be ordered in an ascending order of TMP cost. A sparse candidate list or sparse list (e.g., Sparse List) 2404 may be generated at step 2403 for the current block, as described herein in relation to IntraTMP. The sparse list 2404 may be generated, for example, by determining (e.g., calculating) TMP costs for reference templates (e.g., L-shaped reference templates) 2400 and the current block's template (e.g., L-shaped current template) 2401 in search regions using a predetermined sampling interval 2402. At step 2409, BVP candidates in the merge list (e.g., up to 10 Merge BVP candidates) may be checked in the sparse list 2404 for duplicates, and the redundant BVPs in the merge list (e.g., TMP Merge List) may be removed to generate an updated merge list 2410. At step 2411, the BVP candidates (e.g., Merge BVPs) from the updated merge list (e.g., updated TMP Merge List) 2410 may compete (e.g., be compared) with the BVP candidates in the sparse list 2404. The best candidates (e.g., 30 candidates) from the sparse list 2404 and the updated merge list 2410, determined based on the TMP cost, may be selected for a final or updated sparse list (e.g., updated Sparse List) 2412.

The updated sparse list 2412 may comprise a set of BVs that may be sparse candidates from 2404 or merge candidates from 2410. At step 2413, these candidates (e.g., sparse candidates from 2404 or merge candidates from 2410) may be checked. The BVs may proceed to (e.g., always go to) a refinement sparse process 2416. A (e.g., different) refinement window size may be determined based on (e.g., according to) the BV type (Sparse or Merge). At step 2416, BVP candidates in the updated sparse list 2412 may be refined using a refinement search window. The size of the refinement search window may depend on the BVP type for generating a refined candidate list 2418. BVPs from sparse searching in a regular TMP reference region may use a 3×3 window 2415 (sampling interval of 1 sample). BVPs included in the updated sparse list 2412 from the updated merge list 2410, whether inside or outside the regular reference region, may use a window 2414 with a size of 11×11 samples (sampling interval of 1 sample).

Figure 25:
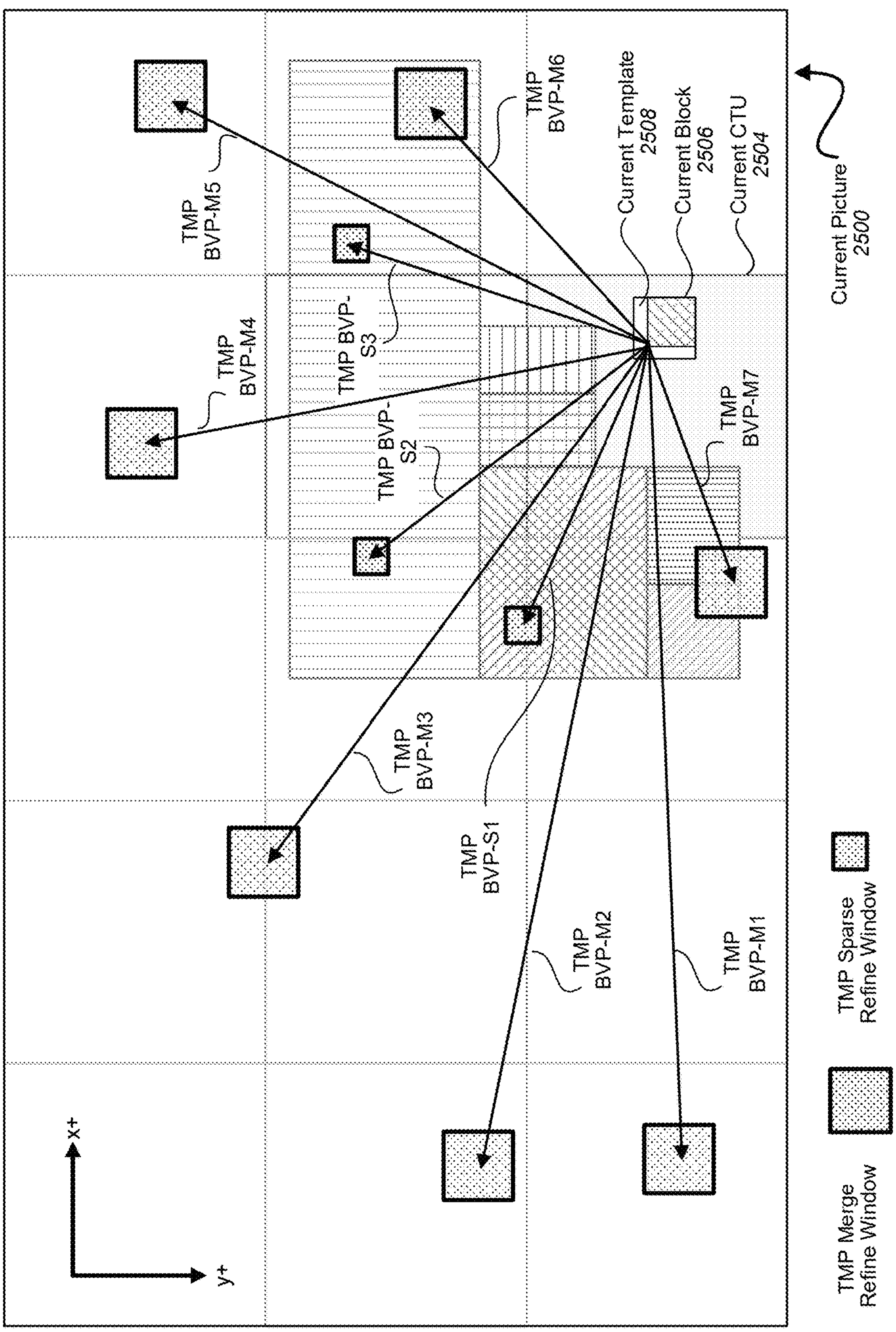
FIG. 25 shows example refinement windows for sparse block vector candidates and merge block vector candidates.

FIG. 25 shows example refinement windows for sparse block vector candidates and merge block vector candidates. More specifically, FIG. 25 shows a current block 2506 in a current CTU 2504 of a current picture 2500, and a current block template 2508, with example refinement windows. FIG. 25 shows an example of refinement windows of 5 Merge BVP candidates (BVP-M1 to BVP-M5) located outside of the regular TMP reference region, one Merge BVP candidate (BVP-M6) located inside of the regular TMP reference region, and one Merge BVP candidate (BVP-M7) which is partially overlapping the regular TMP reference region. FIG. 25 also shows an example of refine windows of three sparse BVP candidates (BVP-S1 to BVP-S3) positioned within the regular TMP reference region.

IntraTMP with Merge Candidates is described in K. Naser et al, "EE2-1.2: IntraTMP with Merge Candidates," JVET-AG0151, January 2024, the content of which is herein incorporated by reference. Because the sparse BVP candidates in IntraTMP may be obtained by applying/using a sampling interval of 3, and the refinement window is +1 sample around the BVP candidate, the refinement windows of any two sparse BPVs do not overlap. The refinement windows of two sparse BVP candidates may overlap only at the boundaries of two search subregions because the sampling interval is applied/used individually to/for each subregion (e.g., BVP-S4 and BVP-S5 in FIG. 26). To avoid such overlap, in at least some technologies, refinement widows of the sparse BVPs may be constrained to the subregion to which the BVP candidate belongs.

Figure 26:
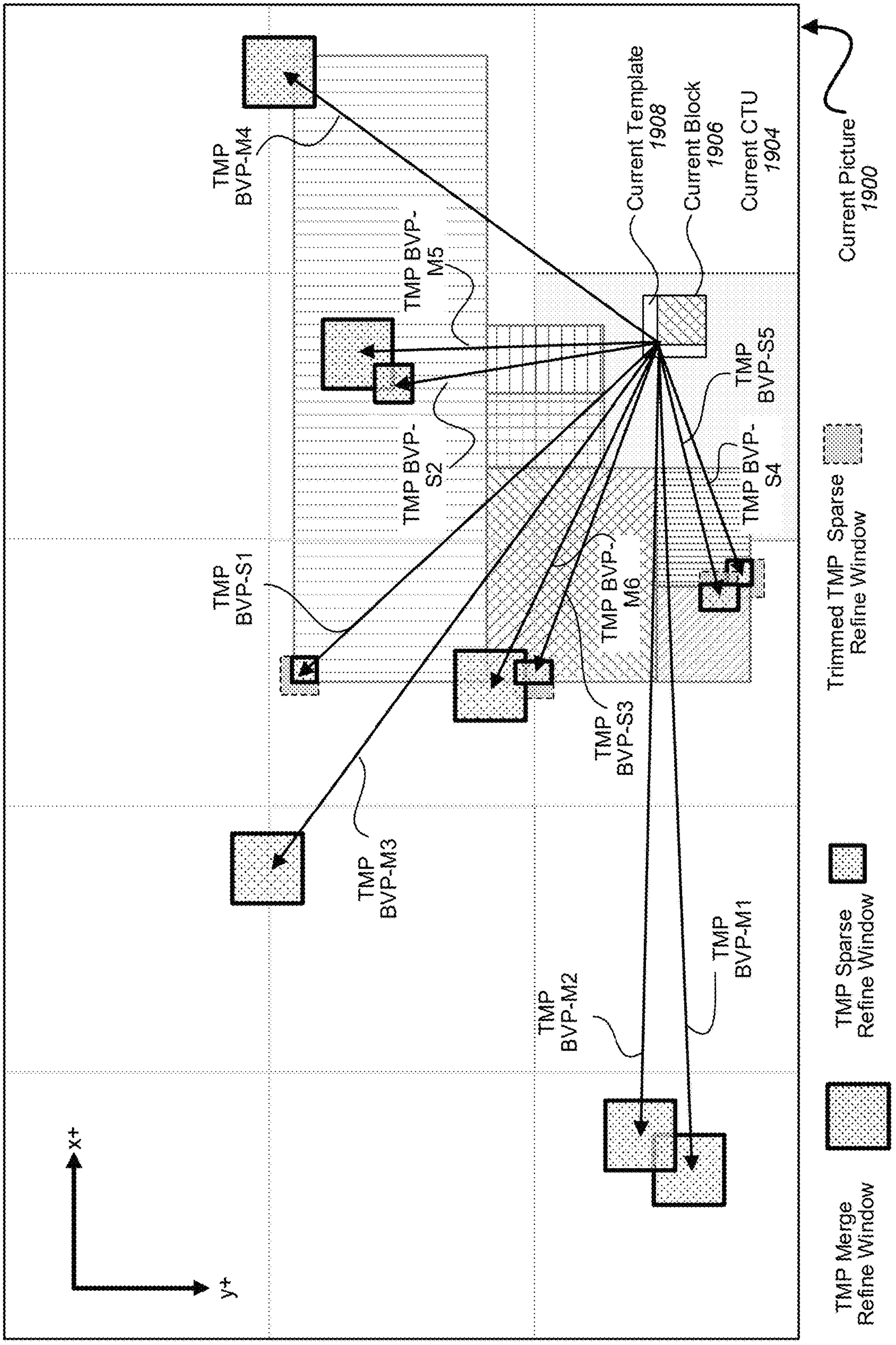
FIG. 26 shows examples of refinement windows of overlapping merge candidates.

BVP Merge candidates may come from spatial neighbor blocks without any constraint related to their positions. The refinement windows of the Merge candidates may overlap with one another. FIG. 26 shows examples of refinement windows of overlapping merge candidates. FIG. 26 shows that:

- BVP-M1 and BVP-M2 are two Merge BVP candidates outside the TMP reference region, of which the refinement windows overlap with each other;
- BVP-M5 and BVP-S2 show the overlapping of the refinement windows of a Merge BVP candidate and a Sparse BVP candidate inside the regular TMP reference region; and
- BVP-M6 and BVP-S3 show the overlapping of the refinement windows of a Merge BVP candidate (BVP-M6) and a Sparse BVP candidate (BVP-S3) inside the regular TMP reference region, where the refinement window of the Sparse BVP may be constrained to the boundaries of the subregion.

The overlap of refinement windows may present at least two issues that may affect the performance of encoders and/or decoders:

- The TMP cost may be determined (e.g., computed) twice at the overlapping locations, which may increase the complexity inefficiently; and
- Two BVP candidates whose refinement windows overlap may reduce the diversity of the candidates in the merge list.

In relation to the first of the two issues, since at least some technology (e.g., in IntraTMP with Merge Candidates) may determine (e.g., calculate) template costs for each reference block candidate (e.g., with a sampling interval of 1 within the refinement window), duplicate calculations in the overlapped regions may significantly increase the computation load. In relation to the second issue, since the size of the refined list (e.g., 2418 in FIG. 24) may be limited, including two BVP candidates that have significant overlap would often necessitate excluding another candidate that may be further from the overlapping candidates. One way to address the above identified issues would be to simply remove each BVP candidate whose refinement window overlaps another refinement window from the TMP Merge List. Such an approach may result in the removal of efficient BVP candidates from consideration for the final refined list.

Examples described herein may improve encoder/decoder performance by avoiding the above identified issues. Specifically, examples described herein may reduce the computational burden of generating the refined list, and/or may improve the diversity of BVP candidates in the refined list. Instead of removing the duplicated BVP candidates in the TMP Merge List, examples described herein are configured to use a clustering algorithm to merge the BVP candidates whose refinement windows overlap. The BVP candidates whose refinement windows overlap may be merged, for example, by using a third refinement window. The third refinement window may be extended (enlarged) to cover the refinement windows of both BVP candidates. A third BVP candidate may be determined, for example, based on the third refinement window. The third BVP candidate may replace the overlapping BVP candidates whose refinement windows are encompassed in the third refinement window. Alternatively, one of the BVP candidates whose refinement windows overlap may be used as the third BVP candidate. Having a single refinement window may avoid the issue of duplicated computation as described herein. Having a single BVP candidate in the merge list for each group of overlapping refinement windows may avoid the issue of reduced diversity of candidates in the merge list as described herein.

Figure 27A:
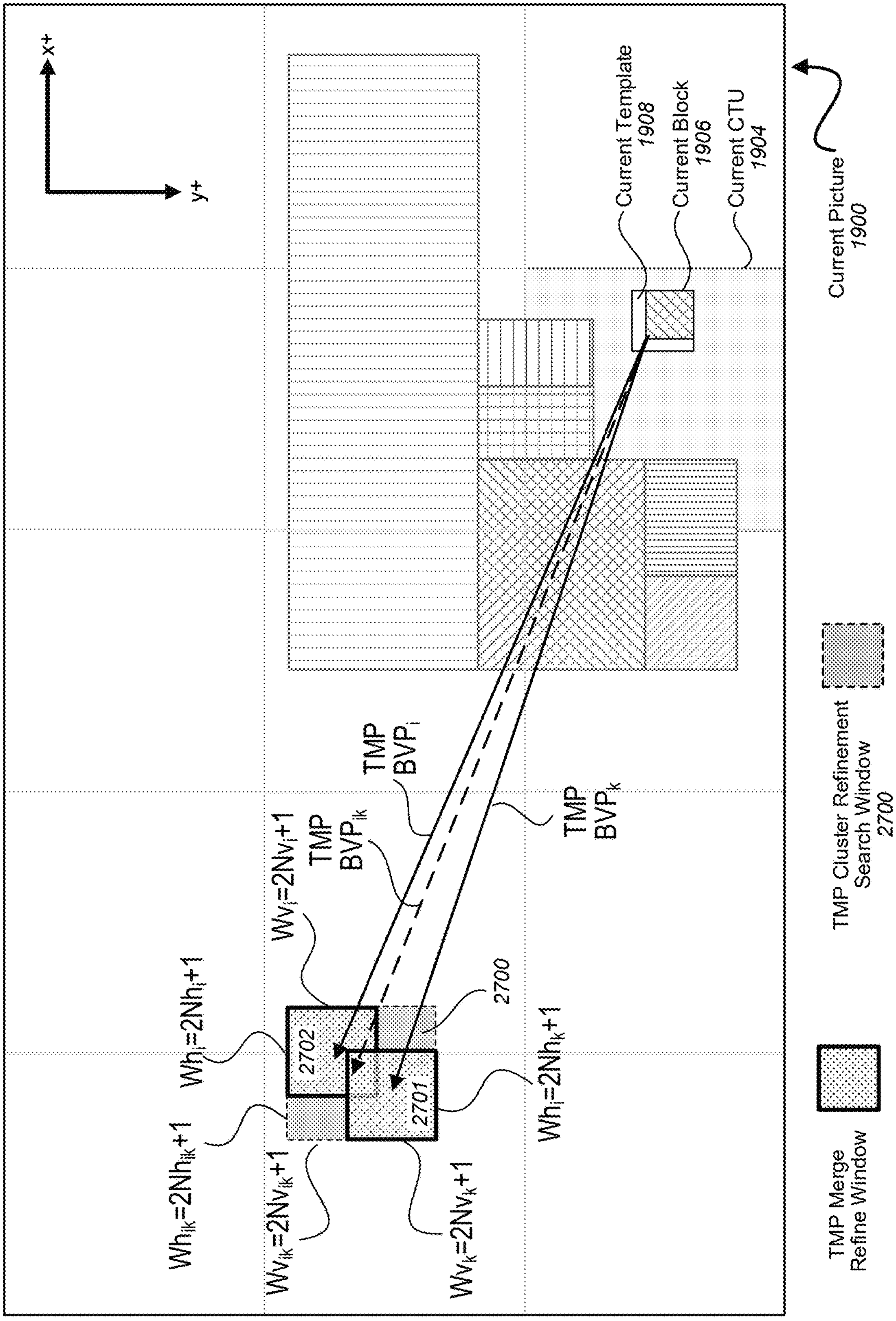
FIG. 27A and FIG. 27B show examples of enlarged refinement windows and corresponding block vector predictor candidates.
Figure 27B:
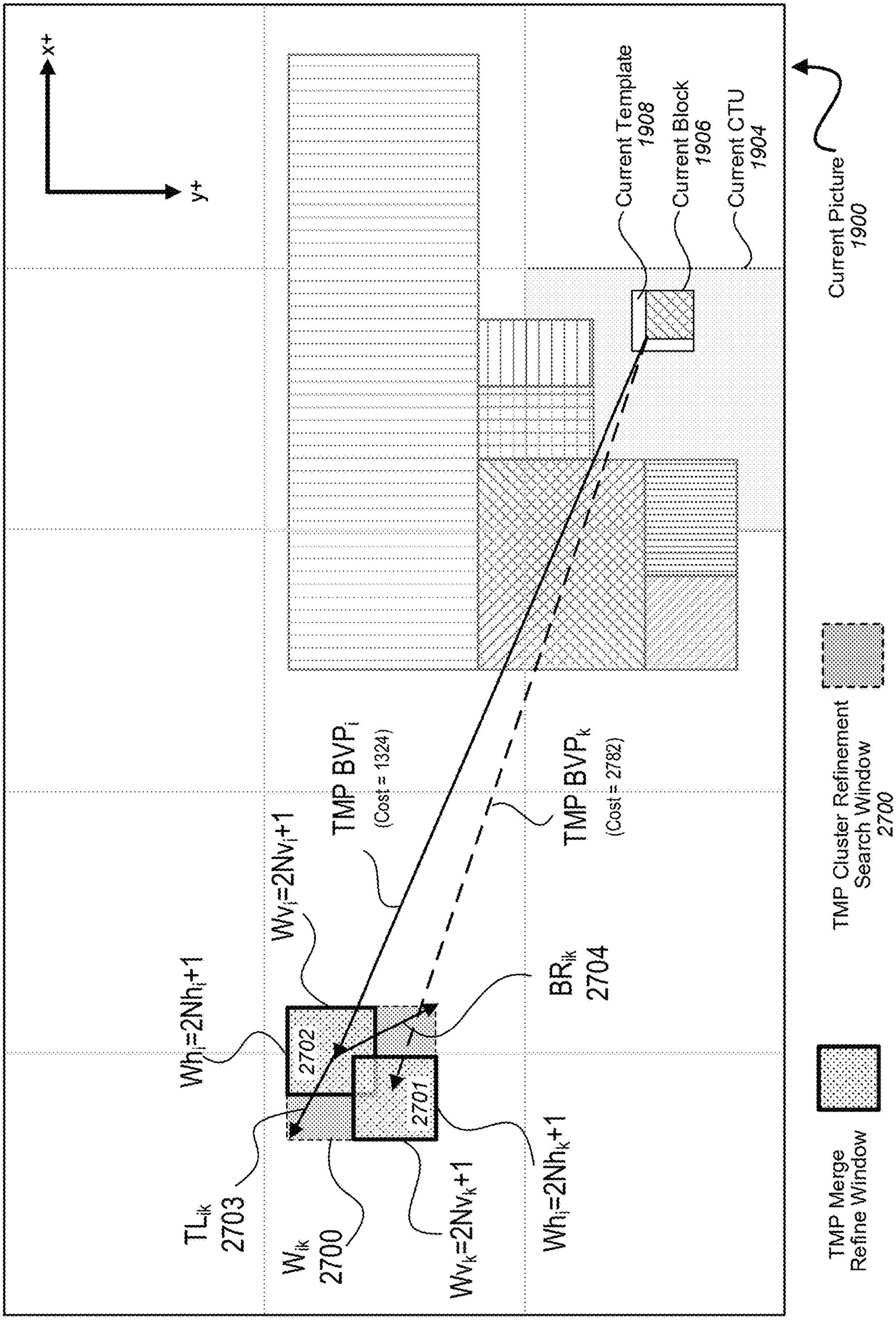

FIG. 27A and FIG. 27B show examples of enlarged refinement windows and corresponding BVP candidates. FIG. 27A shows an example of two BVP candidates with overlapping refinement windows. More specifically, FIG. 27A shows an example of two Merge BVP candidates $BVP_i$ and $BVP_k$, whose refinement windows 2702 and 2701 partially overlap. The clustering algorithm may determine a third refinement window 2700 with dimensions ($Wh_{ik}$, $Wv_{ik}$) covering both original refinement windows 2701 and 2702. A third BVP candidate (e.g., Merge BVP candidate) $BVP_{ik}$ may be determined (e.g., computed) as the centroid of the third refinement window 2700.

FIG. 27B shows an example of two BVP candidates with overlapping refinement windows. The clustering algorithm may determine a third refinement window $W_{ik}$ 2700 with dimensions ($Wh_{ik}$, $Wv_{ik}$) covering both original refinement windows 2701 and 2702. Instead of determining a third BVP candidate (e.g., Merge BVP candidate) $BVP_{ik}$ as the centroid of the third refinement window $W_{ik}$ 2700, the clustering algorithm may select one of the Merge BVP candidates $BVP_i$ and $BVP_k$ as the third BVP candidate. The clustering algorithm may select one of the Merge BVP candidates $BVP_i$ and $BVP_k$ as the third BVP candidate, for example, based on one specific criterion (e.g. the candidate with lower TMP cost). For example, the Merge BVP candidate $BVP_i$ may have a cost of 1324 and the Merge BVP candidate $BVP_k$ may have a cost of 2782. The candidate $BVP_i$ may be selected to represent the third (e.g., enlarged) refinement window $W_{ik}$ 2700.

The dimensions of the third (e.g., enlarged) refinement window ($W_{ik}$) 2700 may be indicated by its top-left and bottom-right corners. As shown in FIG. 27B, the dimensions of the third (e.g., enlarged) refinement window ($W_{ik}$) 2700 may be determined by the top-left displacement vector 2703 and bottom-right displacement vector 2704.

Figure 28:
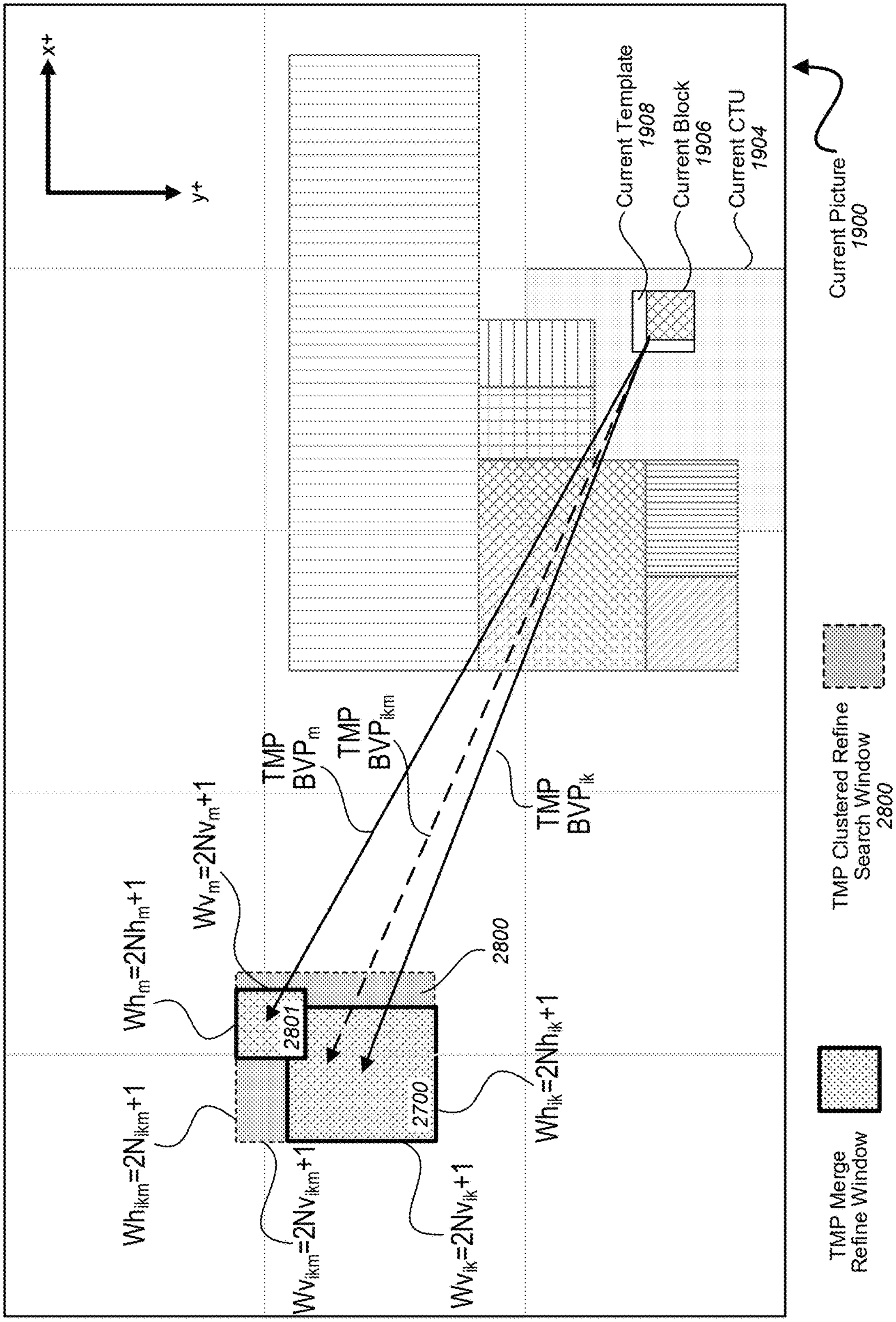
FIG. 28 shows an example of clustering the enlarged refinement window generated in FIG. 27A and FIG. 27B and another refinement window.

The clustering may be iteratively applied through the BVP candidates in the merge list (e.g., TMP Merge list). FIG. 28 shows an example of clustering the enlarged refinement window generated in FIG. 27A and FIG. 27B and another refinement window. For example, a merged BVP candidate (e.g., $BVP_{ik}$ in FIG. 27A or $BVP_i$ in FIG. 27B) having a third refinement window 2700 may be clustered with another BVP candidate in the list (e.g., $BVP_m$ having a refinement window 2801), resulting in a fourth BVP candidate (e.g., $BVP_{ikm}$) and a fourth refinement window (e.g., 2800), as shown in FIG. 28.

Figure 29A:
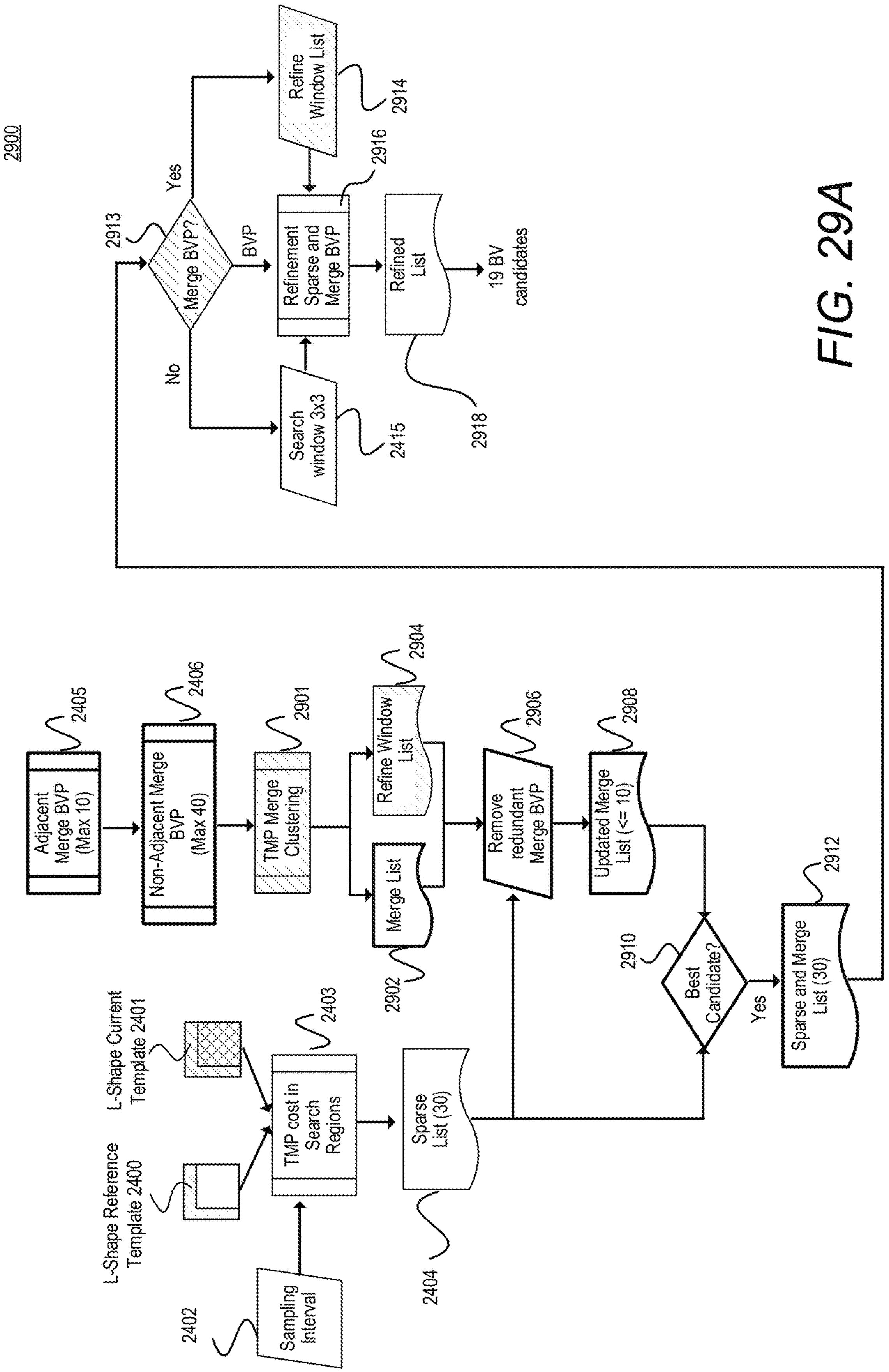
FIG. 29A shows an example method associated with a clustering algorithm.

FIG. 29A shows an example method associated with a clustering algorithm. FIG. 29A shows an example of the clustering algorithm described with respect to FIG. 27A, FIG. 27B, and FIG. 28 being applied to (e.g., used for) adjacent Merge BVP candidates 2405 and non-adjacent Merge BVP candidates 2406. The adjacent Merge BVP candidates 2405 and non-adjacent Merge BVP candidates 2406 may be determined as described herein in relation to the IntraTMP with Merge Candidates technique. In an example process 2900, at step 2901, the clustering algorithm as described with respect to FIG. 27A, FIG. 27B, and FIG. 28 may be applied to (e.g., used for) output (or outputting) a TMP merge list 2902 of BVP candidates and an additional refinement window list 2904. The merge list 2902 may have no BVP candidates with overlapped refinement windows. For example, any overlapped refinement windows may be encompassed in enlarged windows determined based on the clustering algorithm as described with respect to FIG. 27A, FIG. 27B, and FIG. 28. An additional refinement window list 2904 may comprise dimensions of the refinement windows for each BVP candidate in the merge list 2902. The merge list 2902 may comprise additional (e.g., new) BVP candidates corresponding to enlarged refinement windows based on the clustering algorithm, and BVP candidates from lists 2405 and 2406 that have non-overlapping refinement windows. The refinement window list 2904 may comprise the height and width of a corresponding refinement window, for example, for each BVP candidate in the merge list 2902. The corresponding refinement window may be either an enlarged refinement window (e.g., determined based on the clustering algorithm as described with respect to FIG. 27A, FIG. 27B, and FIG. 28), or a non-enlarged refinement window.

As described with respect to FIG. 27A, a BVP candidate stored in the merge list 2902 for an enlarged refinement window may be the centroid of the enlarged refinement window. As described with respect to FIG. 27B, an enlarged refinement windows may be stored in the form of the top-left and bottom-right coordinates of the enlarged refinement window, and a BVP candidate stored in the merge list 2902 for the enlarged refinement window may be the BVP candidate of one of the overlapping refinement windows that may be encompassed by the enlarged refinement window. For a particular enlarged refinement window that encompasses two refinement windows $W_i$ and $W_k$, the BVP candidate $BVP_i$ of $W_i$ may be selected as the corresponding BVP candidate. The BVP candidate $BVP_i$ of $W_i$ may be selected as the corresponding BVP candidate, for example, based on a selection criterion such as TMP cost. For a particular enlarged refinement window that encompasses two refinement windows $W_i$ and $W_k$, the BVP candidate $BVP_i$ of $W_i$ may be selected as the corresponding BVP candidate and the top-left and bottom-right of the enlarged refinement window may be specified as displacement vectors from $BVP_i$.

Figure 29B:
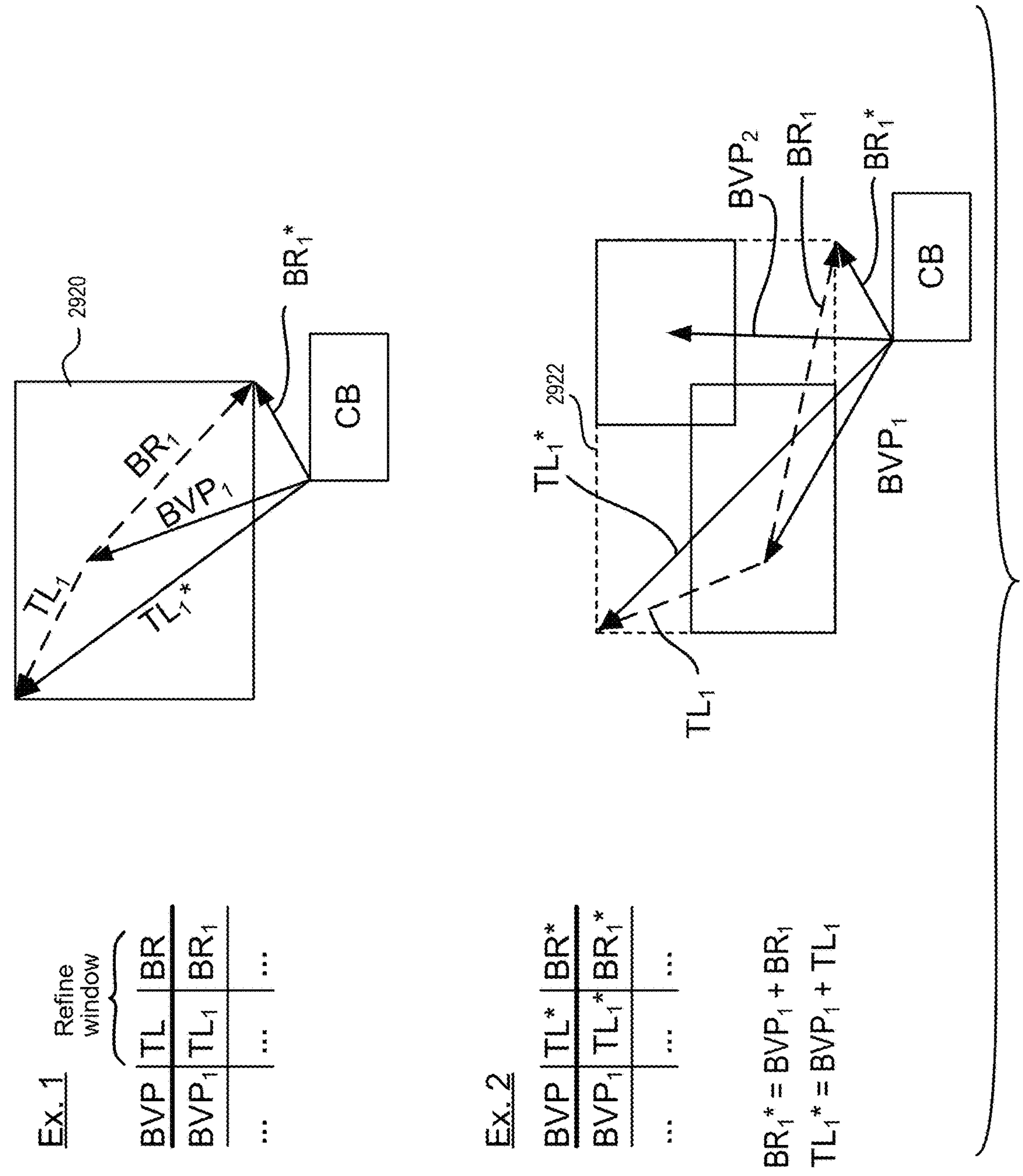
FIG. 29B shows examples of storing a refinement window.

FIG. 29B shows examples of storing an enlarged refinement window by its top-left and bottom-right position (e.g., position of sample or pixel). The top-left and bottom-right position may be defined in relation to the selected BVP candidate and an example of storing an example enlarged refinement window by its top-left and bottom-right coordinates (or corresponding vectors). An enlarged refinement window 2920 encompassing the refinement windows of $BVP_1$ and $BVP_2$ may be indicated (and represented) in the merge list 2902. The enlarged refinement window 2920 may be indicated (and represented) in the merge list 2902 as a selected corresponding BVP candidate (e.g., candidate $BVP_1$). The top-left position (e.g., $TL_1$*) and bottom-right position (e.g., $BR_1$*) of the enlarged refinement window 2920 may be specified in the refinement window list 2904 as displacement vectors (e.g., $TL_1$ and $BR_1$, respectively, as also shown in the table "Ex.1") from $BVP_1$. Alternatively, an enlarged refinement window 2922 encompassing example refinement windows of $BVP_1$ and $BVP_2$ may be indicated (and represented) in the merge list 2902. The enlarged refinement window 2922 may be indicated (and represented) in the merge list 2902 as a selected corresponding BVP candidate (e.g., candidate $BVP_1$). The top-left position (e.g., $TL_1$*) and bottom-right position (e.g., $BR_1$*) of the enlarged refinement window 2922 may be specified in the refinement window list 2904 as displacement vectors (e.g., $TL_1$* and $BR_1$*, respectively, as also shown in the table "Ex.2") from the current block. For example, vector $TL_1$* may be equal to a sum of the BVP candidate and $TL_1$, and vector $BR_1$* may be equal to a sum of the BVP candidate and $BR_1$. Vector $TL_1$* may indicate a displacement from the current block (e.g., a top-left corner or sample of the current block) to a position $TL_1$*. Similarly, vector $BR_1$* may indicate a displacement from the current block (e.g., a top-left corner or sample of the current block) to a position $BR_1$*.

A refinement window may be represented by indications of any pair of diagonally opposite positions/corners of the refine window. For example, the example of FIG. 29B may show the refinement window as being represented by indications of the top-left and bottom-right positions of the refinement window. Alternatively or additionally, the refinement window may be represented by indications of the top-right and bottom-left positions of the refinement window.

As described herein, an additional (e.g., new) BVP candidate that may be the centroid of an enlarged refinement window may be determined (e.g., calculated) and specified in a merge list. Similarly, having the width and height of the enlarged refinement window stored in a refinement window list may enable determining (e.g., calculating) the top-left and bottom-right corners of the enlarged refinement window.

Examples are not limited to a particular manner of generating the merge list 2902. For example, the merge list 2902 may be generated as an additional (e.g., new) list. The merge list 2902 may be generated as an additional list, for example, by the following: sequentially selecting each BVP candidate from a list of adjacent and non-adjacent Merge BVP candidates, determining whether the refinement window of the selected BVP candidate overlaps a refinement window of any of the BVP candidates currently in the merge list 2902, and adding the selected BVP candidate to the merge list 2902 if no overlap is determined, or replacing the overlapping BVP candidate in the merge list 2902 with the additional (e.g., new) BVP candidate determined from the enlarged refinement window that encompasses the two overlapping windows. Adding an additional (e.g., new) BVP candidate to the merge list 2902 may include recording information for the BVP candidate and its corresponding refinement window. The information of a replaced BVP candidate and its corresponding refinement window (e.g., for the list position) may be updated, for example, if/when the BVP candidate already in the merge list 2902 may be replaced with an additional (e.g., new) BVP candidate having a corresponding enlarged refinement window. The corresponding refinement window information may be maintained in the merge list 2902 or in a list (e.g., 2904) separate from the merge list 2902. If/When an additional (e.g., new) BVP candidate corresponding to an enlarged refinement window may be added to the merge list 2902, the additional (e.g., new) BVP candidate may be compared to each BVP candidate in the merge list 2902 to merge any BVP candidate in the merge list 2902 that overlaps with the additional (e.g., new) refinement window. This process may be iterated, for example, until no further overlaps between entries in the merge list 2902 occur.

Alternatively or additionally, the merge list 2902 may be formed by updating the list of adjacent and non-adjacent Merge BVP candidates in place. For example, each BVP candidate from the list of adjacent and non-adjacent Merge BVP candidates may be sequentially selected. A determination may be made as to whether the refinement window of the selected BVP candidate overlaps the refinement window of any other BVP candidate in the merge list 2902 (e.g., BVP candidates preceding the selected BVP candidate in the list of adjacent and non-adjacent Merge BVP candidates). The selected candidate may be kept at its current position, for example, if no overlap is determined. If an overlap is determined, the overlapping BVP candidate may be from the merge list 2902, and the selected BVP candidate may be replaced at its position in the merge list 2902 with the additional (e.g., new) BVP candidate determined from the enlarged refinement window that encompasses the two overlapping windows.

As shown in FIG. 29A, updated (e.g., new) clustered merge BVP candidates in the merge list 2902 may be checked at step 2906 to determine duplicated candidates based on the initial Sparse List 2404. At step 2910, a predetermined number (e.g., 10) of non-redundant merge BVP candidates (e.g., BVP candidates in the updated TMP merge list 2908) may compete (e.g., be compared) with the sparse BVP candidates in the sparse list 2404. A best predetermined number/quantity of (e.g., 30) BVP candidates, determined based on the TMP costs, among both the updated TMP merge list 2908 and the sparse list 2404, may be selected for the sparse and merge list 2912.

Because the BVP Merge candidates (e.g., those from the updated merge list 2908 that may be selected to the final sparse and merge list 2912) may be located within or close to the regular TMP reference region, refinement windows of the BVP merge candidates may overlap the refinement windows of the sparse BVP candidates (i.e., those from the Sparse list 2404 that may be selected to the sparse and merge list 2912). Examples of overlapping refinement windows of sparse BVP candidates and merge BVP candidates may be shown in FIG. 26. The clustering algorithm may be applied to (e.g., used for) avoid (or avoiding) refinement windows overlapping between merge BVP candidates and sparse BVP candidates. For example, at step 2913, the sparse and merge list 2912 may be processed to merge any overlapping refinement windows including sparse BVP candidates. At step 2916, the refinement of the processed BVP candidates from the sparse and merge list 2912 as determined at step 2913 may be performed. Merge BVP candidates may be refined using the corresponding refinement window sizes from the refinement window list 2914. Sparse BVP candidates may be refined using the predetermined sparse refinement window size (e.g., 3×3) 2415. The refinement process at step 2916 may generate a refined list 2918 of sparse BVP candidates and merge BVP candidates. For example, the refined list 2918 may include the best candidate from the respective refinement window corresponding to each of the BVP candidates in the sparse and merge list 2912 after the processing at steps 2913 and 2916.

In the example process 2900, the sparse and merge list 2912 may include BVP candidates that have overlapping refinement windows because the list includes BVP candidates from the sparse list 2404 and from the updated merge list 2908. As will be shown in examples in FIG. 30A, FIG. 30B, FIG. 31A, and FIG. 31B, there may be overlaps between the refinement windows of BVP candidates in the lists 2404 and 2908. Because any overlaps between a merge BVP candidate and a sparse BVP candidate may be subjected to a clustering process at step 2913, no duplicated TMP cost calculations may be performed during the refinement process at step 2916. As groups of two or more BVP candidates that may be located close to each other have been replaced in the refined list 2918 by newly determined BVP candidates based on enlarged refinement windows, the diversity of the refined list 2918 may be improved.

Figure 30A:
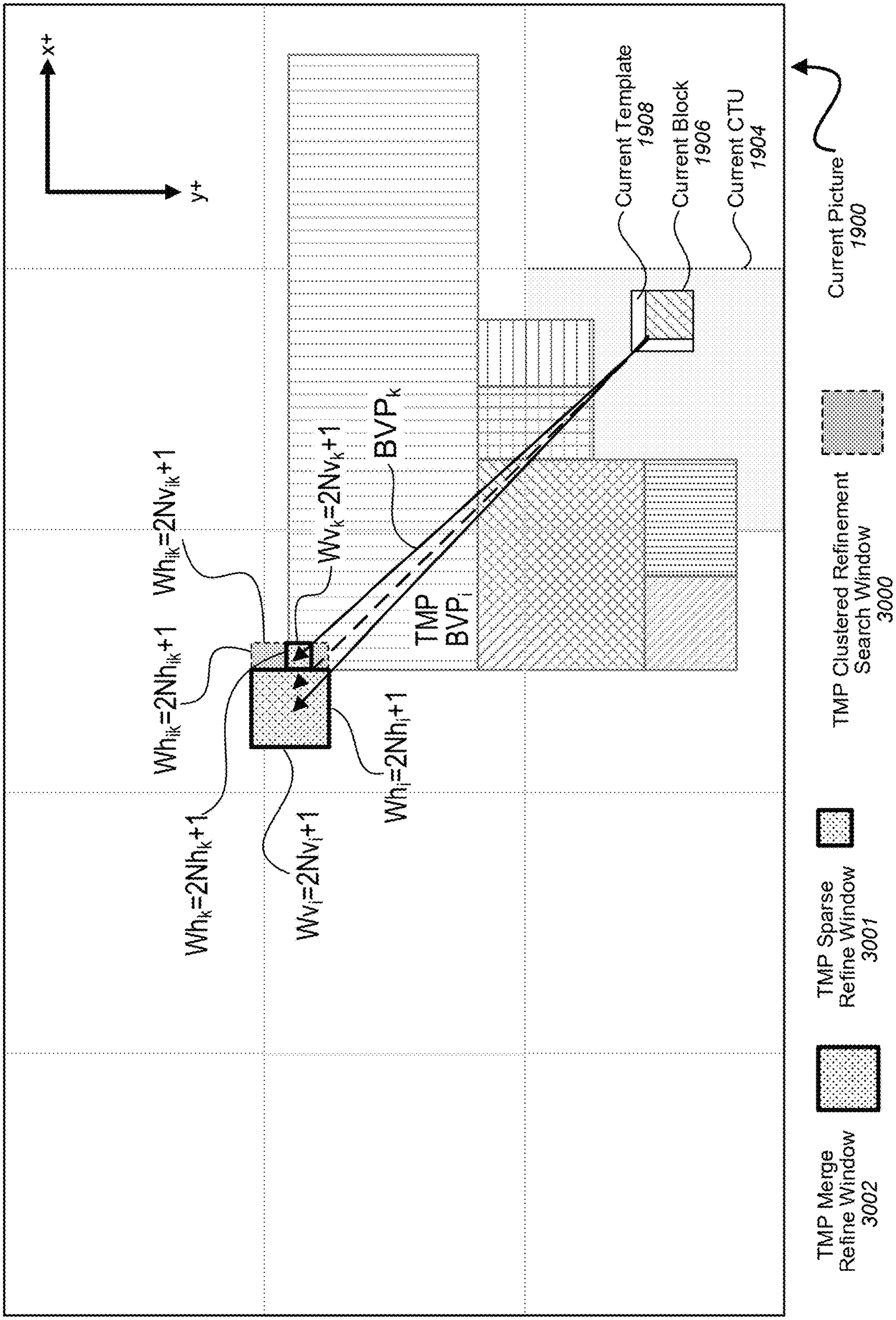
FIG. 30A and FIG. 30B show examples of overlapping refinement windows of merge and sparse block vector candidates.
Figure 30B:
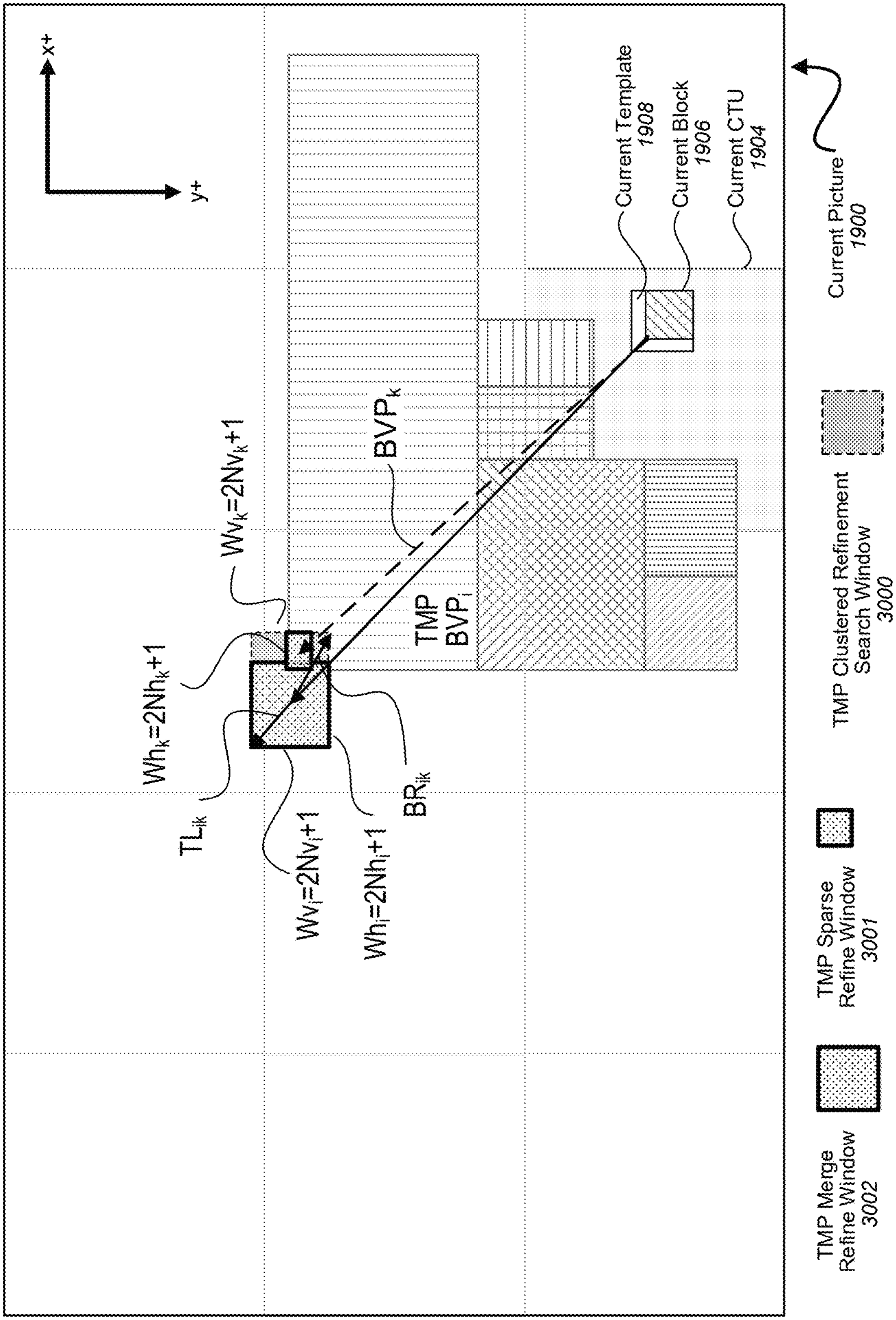
Figure 31A:
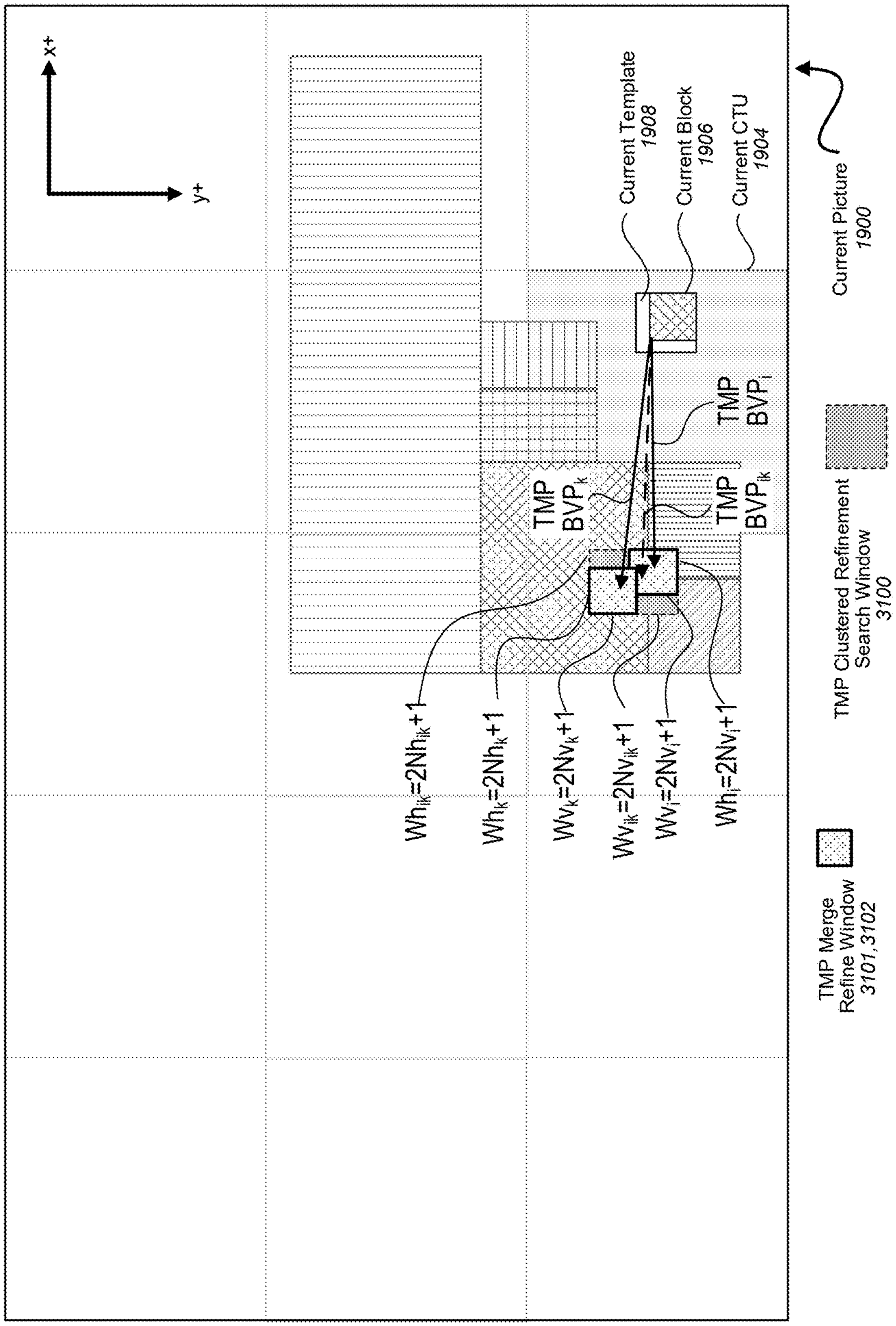
FIG. 31A and FIG. 31B show examples of overlapping refinement windows of merge and sparse block vector candidates.
Figure 31B:
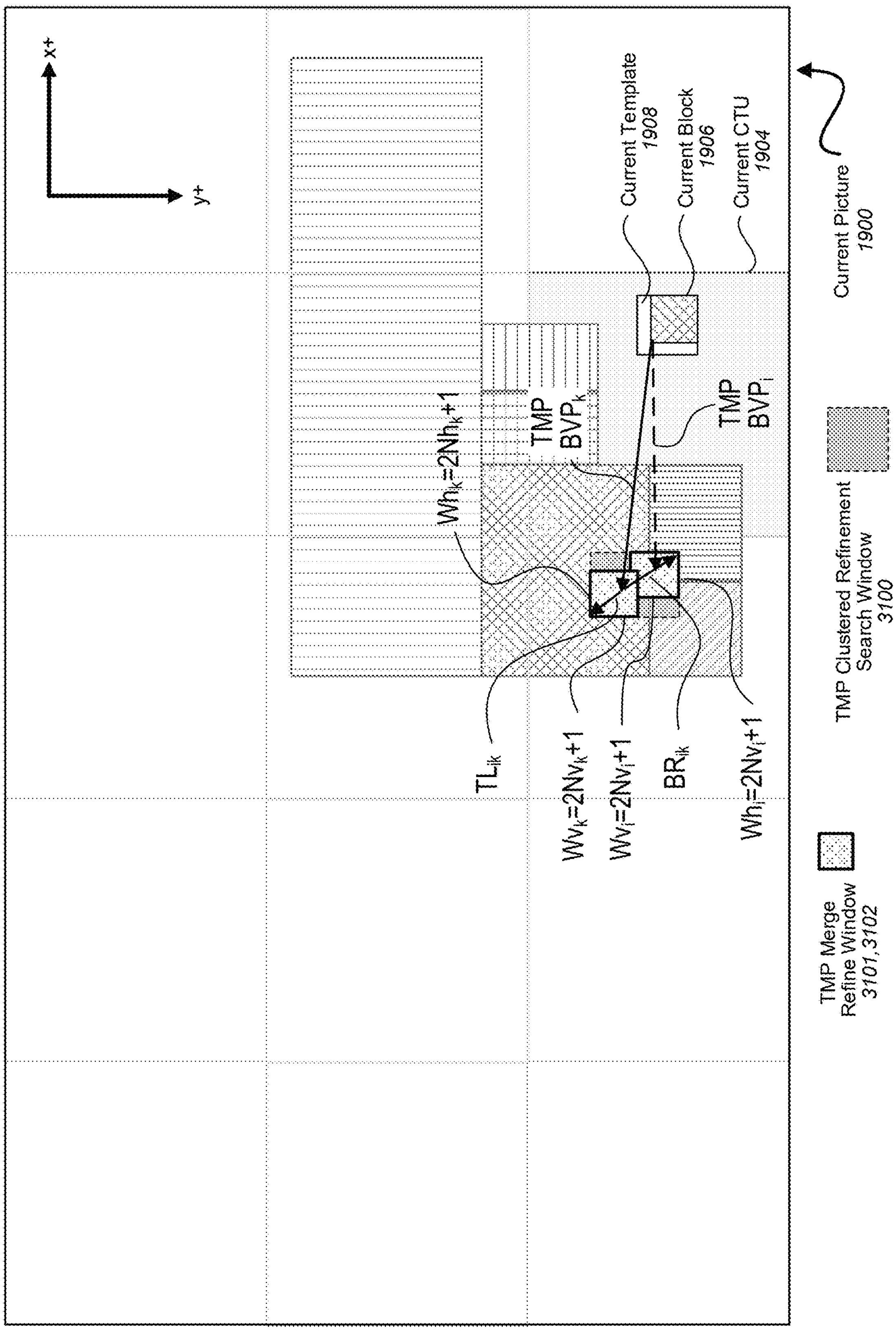

FIG. 30A and FIG. 30B show examples of overlapping refinement windows (3002 and 3001) of merge BVP candidates and sparse BVP candidates at/in the boundary of the regular TMP reference region. FIG. 31A and FIG. 31B show examples of overlapping refinement windows (3101 and 3102) of two merge BVP candidates within the regular TMP reference region (e.g., between the refinement windows of two Merge BVP candidates). The corresponding enlarged refinement windows 3000 and 3100 are shown.

Figure 32:
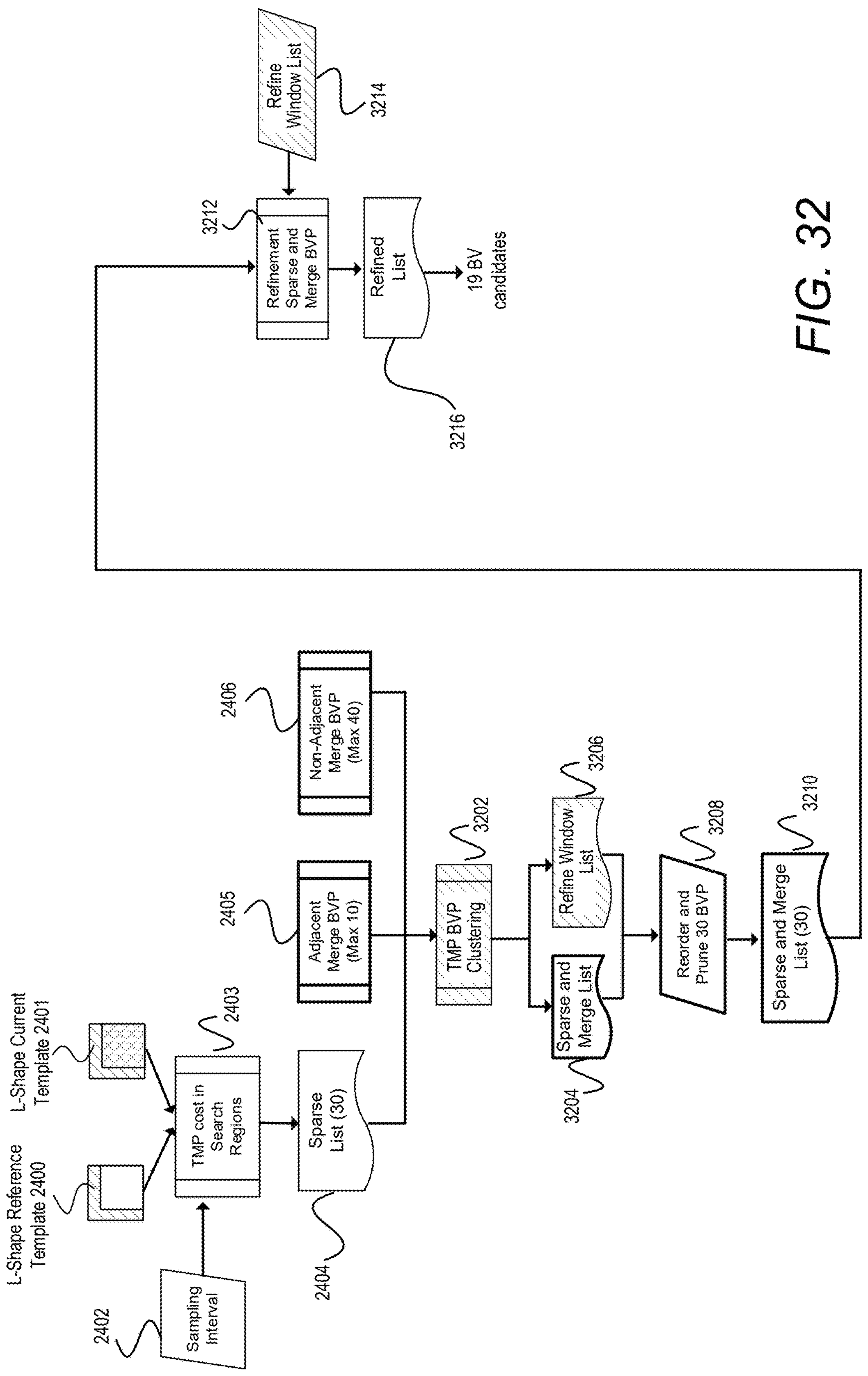
FIG. 32 shows an example clustering process.

FIG. 32 shows an example clustering process 3200. The clustering process 3200 may be applied to (e.g., used for) the sparse list 2404, the adjacent Merge BVP candidates 2405, and non-adjacent Merge BVP candidates 2406, for example, at the same TMP BVP clustering stage 3202 of the clustering process 3200. As described herein, the sparse list 2404 may be generated based on the sparse search stage in an IntraTMP process. The adjacent Merge BVP candidates 2405 and non-adjacent Merge BVP candidates 2406 may be determined (e.g., as described with respect to FIG. 23A and FIG. 23B) as in the IntraTMP with Merge Candidates process. As a result of the clustering, two lists may be generated (e.g., built): a sparse and merge list 3204 and a refinement window list 3206. The sparse and merge list 3204 may include BVP candidates from any of the lists 2404, 2405, 2406, and/or BVP candidates corresponding to enlarged refinement windows for any of the BVP candidates from the lists 2404, 2405, 2406. The refinement window list 3206 may comprise corresponding information (e.g., height and width of the refinement window or the top-left and bottom-right coordinates) of the corresponding refinement windows. For example, the refinement window information may be maintained in the same list as the corresponding BVP candidate information.

At step 3208, the BVP candidates in the list 3204 may be reordered and pruned. The BVP candidates in the list 3204 may be reordered based on TMP cost of the BVP (e.g., in an ascending order). The BVP candidates may include nonclustered BVP candidate, an additional (e.g., new) BVP candidate defined for the centroid of the clustered refinement search regions, and/or one of the BVP candidates whose refinement windows partially or fully overlap. The BVP candidates in the list 3204 may be pruned to the best/top (e.g., 30) BVP candidates forming an updated sparse and merge list 3210. The refinement process 3212 of the BVP candidates of the updated sparse and merge list 3210 may use the refinement window list 3214 to apply/use the refinement search efficiently to/for respective BVP candidates in the updated sparse and merge list 3210 and to generate a refined list 3216. During the refinement search, similar to that described herein in relation to the refinement process of IntraTMP, for the respective refinement window of each BVP candidate in the list being considered (e.g., the updated sparse and merge list 3210), the candidate reference block that has the best (e.g., lowest) TMP cost may be determined and the BVP candidate corresponding to that candidate reference block may be added to the refined list 3216.

In the example process 3200, the updated sparse and merge list 3210 does not include BVP candidates that have overlapping refinement windows because any overlaps between a merge BVP candidate and another merge BVP candidate, and/or between a merge BVP candidate and a sparse BVP candidate have been considered at step 3202. No duplicated TMP cost calculations may occur during the refinement search of the refinement process 3212. As groups of two or more BVP candidates that may be located close to each other have been replaced in the refined list by BVP candidates determined based on enlarged refinement windows, the diversity of the refined list 3216 may be improved.

Figure 33A:
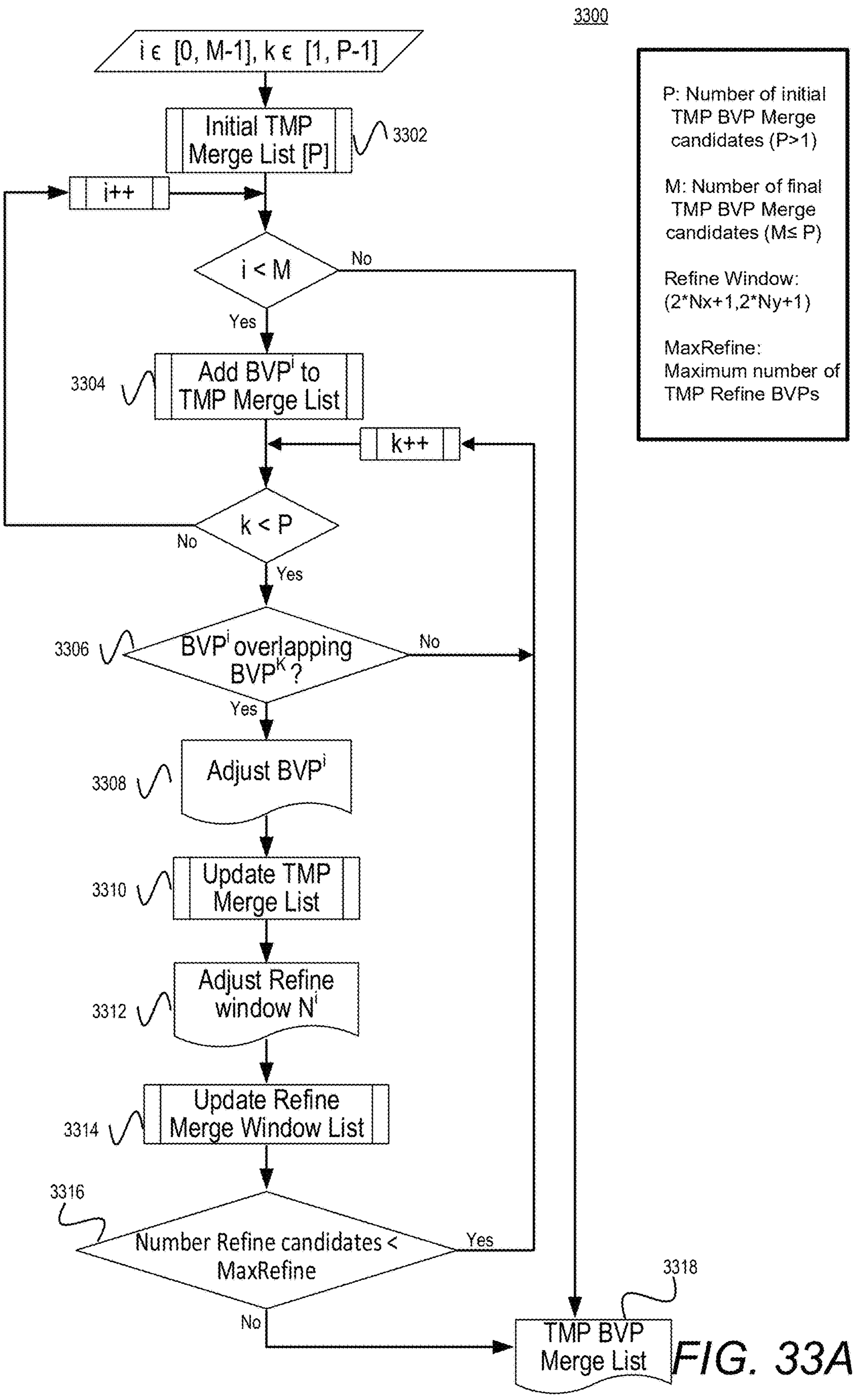
FIG. 33A, FIG. 33B, and FIG. 33C show examples of clustering processes.

FIG. 33A shows an example clustering process 3300 for TMP Merge candidates. One or more steps of the example process may be performed and/or implemented by an encoder (e.g., encoder 200 of FIG. 2) or a decoder (e.g., decoder 300 in FIG. 3), an example computer system 3700 as described herein with respect to FIG. 37, and/or an example computing device 3830 as described herein with respect to FIG. 38. In the example, both adjacent and non-adjacent candidates may be stored in an initial merge list (e.g., P=50). The final TMP merge list size (e.g., M=10) may be less than the size of the initial merge list. The BVP candidates may be ranked in an ascending order of TMP cost in the initial merge list, and the redundant BVP candidates may be previously removed.

A clustering algorithm may select a first BVP candidate from the initial merge list 3302 and may add the first BVP candidate to a TMP merge list 3304. At step 3306, the clustering algorithm may search (e.g., scrolling down) in the list 3304 for a BVP candidate whose TMP refinement window overlaps the TMP refinement window of the current BVP candidates. If such a BVP candidate is found, at step 3308, an additional (e.g., new) BVP candidate may be calculated as the centroid of an enlarged refinement window that covers both overlapping TMP refinement windows. At step 3310, the BVP candidate may be updated in the TMP merge list. At step 3312, a refinement search window may be adjusted and may be stored at step 3314 in an updated TMP Merge refinement window list. At 3316, the number/quantity of entries in the list may be checked and the process may be repeated if the number/quantity is less than a predetermined maximum number/quantity. A final TMP BVP merge list 3318 may be generated by using this process 3300.

A complexity mechanism may be used/implemented at step 3316. A complexity mechanism may be used/implemented at step 3316, for example, after a candidate clustering. A complexity mechanism may be used/implemented at step 3316 after a candidate clustering, for example, to avoid a significant complexity increase in the refinement process/stage. The maximum number/quantity of TMP cost computations may be constrained by the number/quantity of TMP Merge candidates (M, e.g., 10), using a refinement window of 11×11, and the number/quantity of TMP Sparse candidates (S, e.g., 20, which is 30 minus the number of Merge candidates), using a window of 3×3.

Total number/quantity of TMP cost computations at the refinement stage may be determined as:

$$MaxRefine = M*11*11+(S-M)*3*3$$

$$MaxRefine = 10*11*11+(30-10)*3*3 = 1390.$$

Figure 33B:
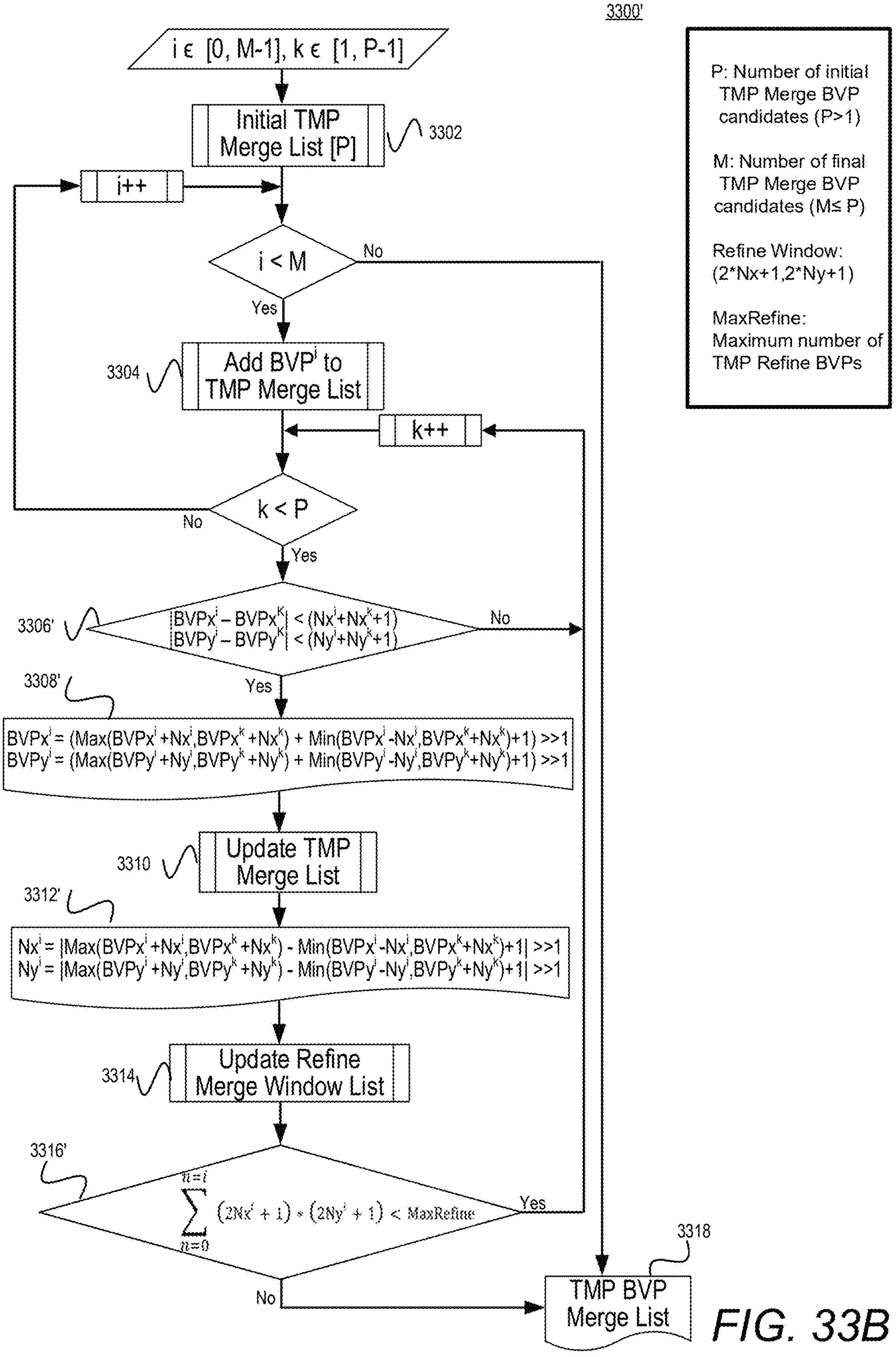

FIG. 33B shows an example clustering process 3300'. The process 3300' may be a particular implementation of process 3300, using example relationships as shown in some steps. The same reference numbers in FIG. 33B indicate the same steps (or processes, etc.) as those in FIG. 33A and as such those descriptions therefor are omitted.

At step 3306', the relationships $|BVPx_i-BVPx_k|<(Nx_i+Nx_{k+1})$ and $|BVPy_i-BVPy_k|<(Ny_i+Ny_k+1)$ may be used to determine whether $BVP_i$ overlaps BVPk. Subscripts indicate BVPs, and Nx and Ny indicate width and height of the corresponding BVPs refinement window. In the figures (e.g., FIG. 33B), superscripts may be used (instead of subscripts) for better representation in Visio. For example, in FIG. 33B, $BVPx^i$ may indicate $BVPx_i$.

At step 3308', to adjust (e.g., enlarge) the $BVP_i$ if/when its refinement window may be found to overlap another refinement window (i.e., to determine the centroid candidate as a result of the clustering process), the adjusted $BVP_i$ may be determined based on $BVPx_i=(Max(BVPx_i+Nx_i, BVPX_k+NX_k)+Min(BVPx_i-Nx_i, BVPx_k+Nx_k)+1)>>1$ and $BVPy_i=(Max(BVPy_i+Ny_i, BVPy_k+Ny_k)+Min(BVPy_i-Ny_i, BVPy_k+Ny_k)+1)>>1$.

At step 3312', to determine the refinement window dimensions as a result of the clustering process, the following may be applied/used: $Nx_i=|Max(BVPx_i+Nx_i, BVPx_k+NX_k)-Min(BVPx_i-Nx_i, BVPX_k+NX_k)+1|>>1$ and $Ny_i=|Max(BVPy_i+Ny_i, BVPy_k+Ny_k)-Min(BVPy_i-Ny_i, BVPy_k+Ny_k)+1|>>1$.

At step 3316', to determine the maximum cost of the TMP refinement process, the following relationship may be used:

$$\sum_{n=0}^{n=i}(2Nx_i+1)+(2Ny_i+1)<MaxRefine.$$

Figure 33C:
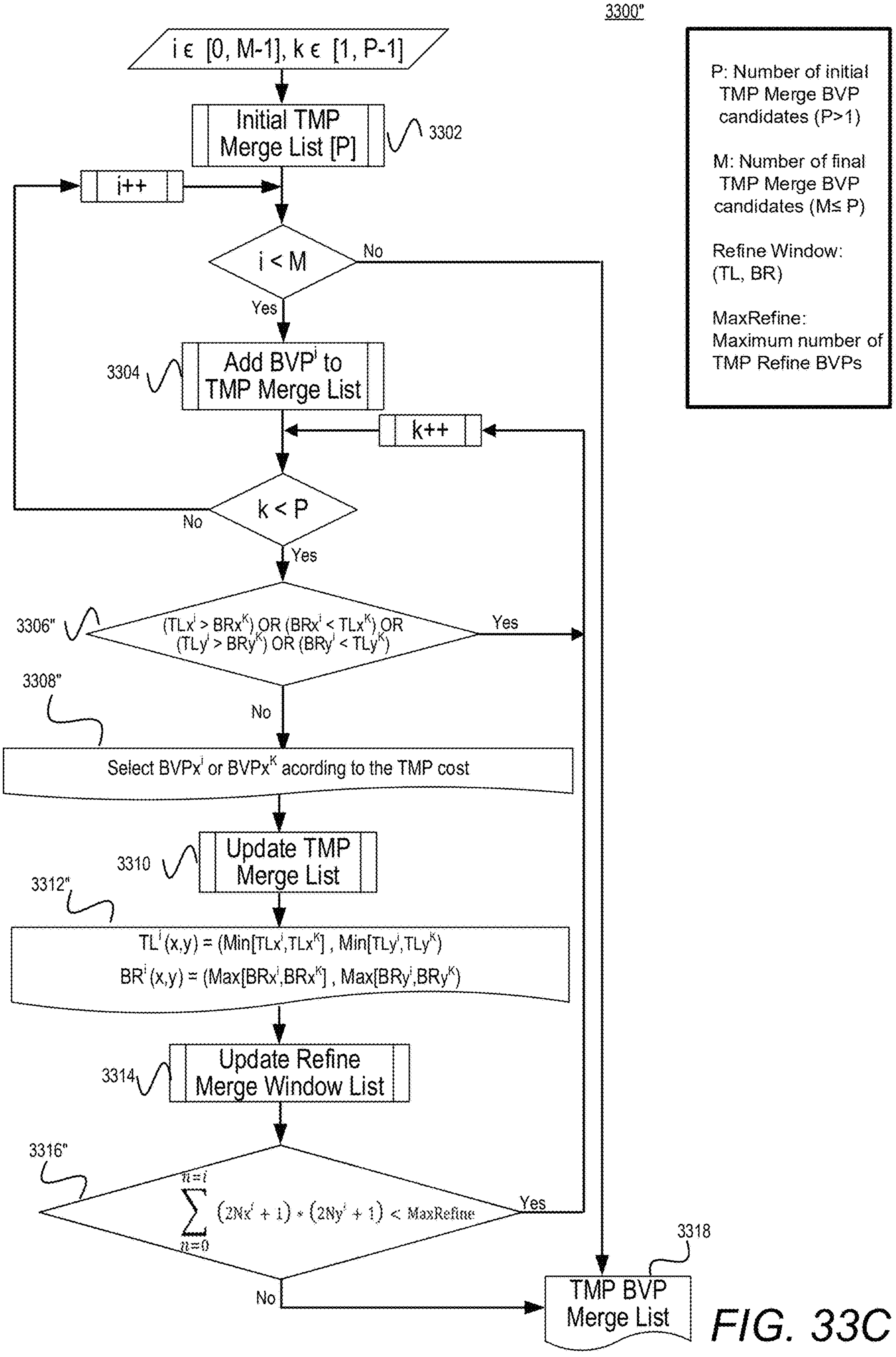

FIG. 33C shows an example clustering process 3300". One difference from the example shown in FIG. 33B may be that the algorithm 3306" used to determine/detect the refinement window overlap may be based on the top-left ($TL^i$, $TL^K$) and bottom-right ($BR^i$, $BR^K$) coordinates of the respective refinement windows. The refinement window overlap may be determined, for example, if any of the following conditions is/are met:

The refinement window of the BVPi candidate is further to the right of the BVPK window:

$$(TLx^i>BRx^K);$$

The refinement window of the BVPi candidate is further to the left of the BVPK window:

$$(BRx^i < TLx^K);$$

The refinement window of the BVPi candidate is further below the BVPK window: $(TLy^i > BRy^K)$;

The refinement window of the BVPi candidate is further above the BVPK window: $(BRy^i < TLy^K)$.

If/When the BVP refinement windows overlap, at step 3308", an additional (e.g., new) BVP representing an enlarged refinement window may be selected from one of the $BVP_i$ and BVPK based on a criterion. For example, one of the $BVP_i$ and BVPK may be selected based on lower TMP cost. At step 3312", the enlarged refinement window may be determined by top-left $TL^i$ and bottom-right $BR^i$ coordinates comprising the two overlapping refinement windows, for example, based on the following equations:

$$TL^i(x, y) = (\mathrm{Min}[TLx^i, TLx^K], \mathrm{Min}[TLy^i, TLy^K])$$

$$BR^i(x, y) = (\mathrm{Max}[BRx^i, BRx^K], \mathrm{Max}[BRy^i, BRy^K]).$$

At step 3316", to determine the maximum cost of the TMP refinement process, the following relationship may be used:

$$\sum_{n=0}^{n=i} (2Nx_i + 1) * (2Ny_i + 1) < MaxRefine$$

where MaxRefine represents the maximum number of permitted refinements that help control complexity.

Figure 34A:
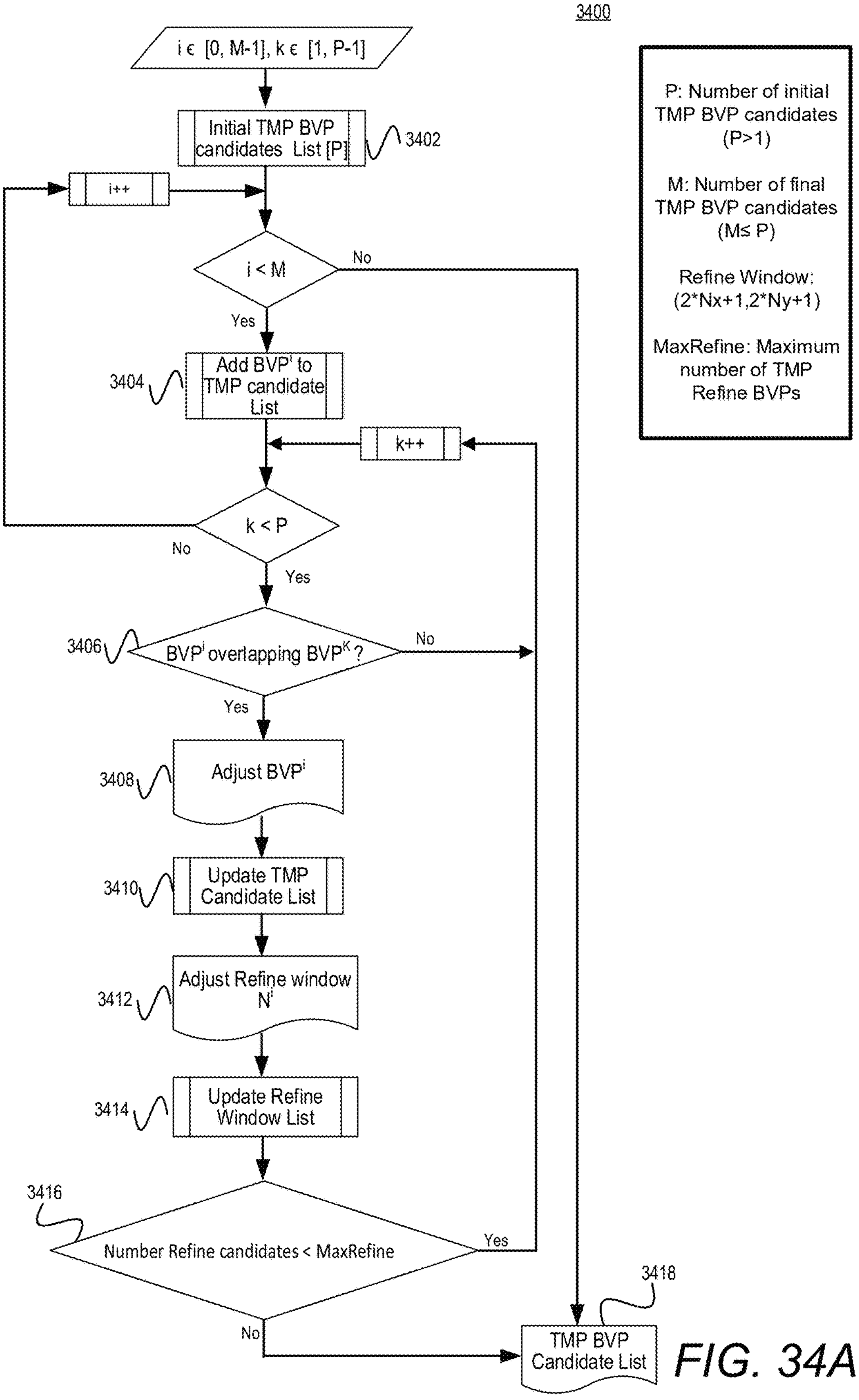
FIG. 34A and FIG. 34B show examples of clustering processes.
Figure 34B:
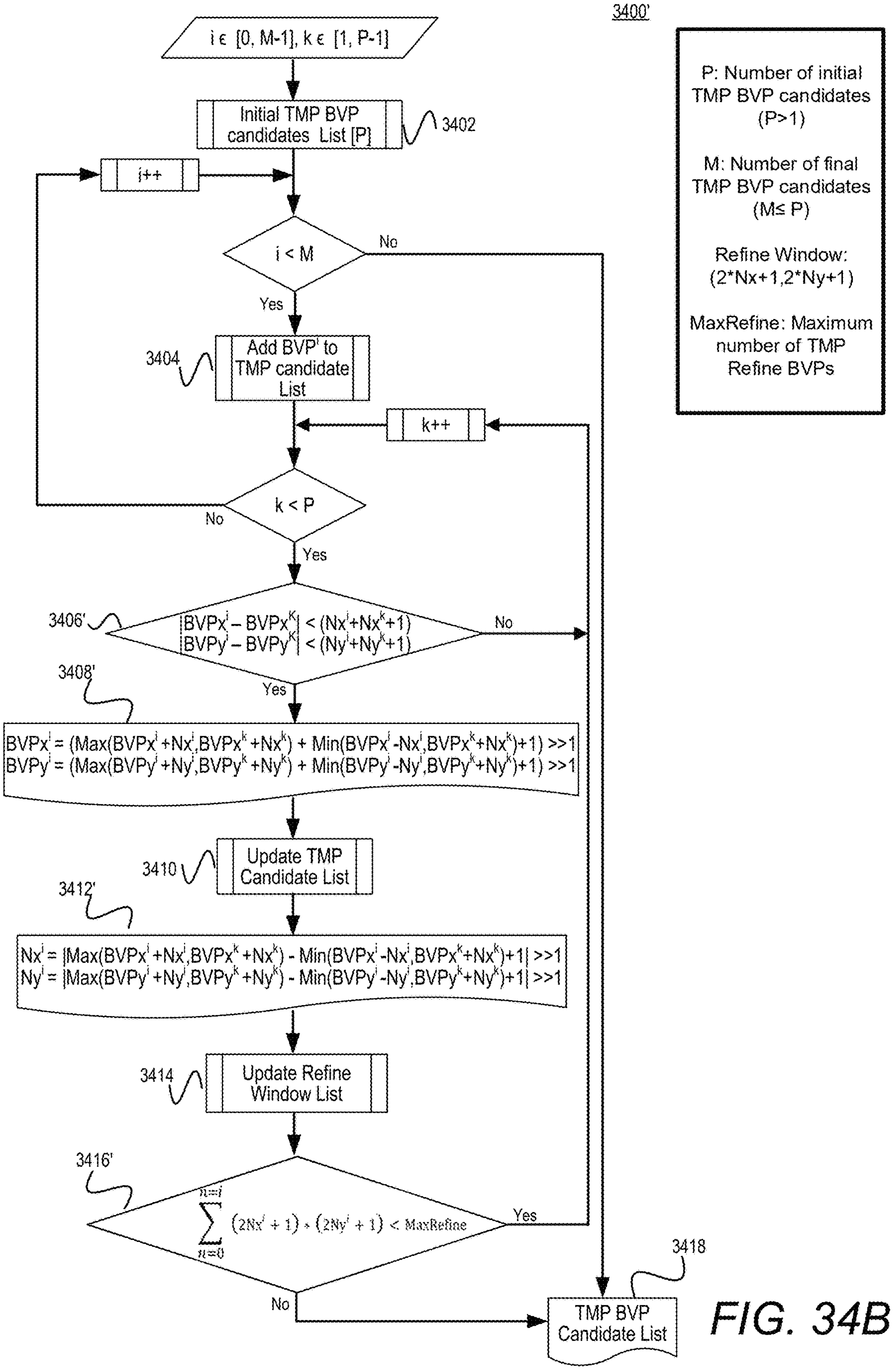

FIG. 34A and FIG. 34B show examples of clustering processes. Specifically, FIG. 34A and FIG. 34B show examples of generalized clustering processes of those shown in FIG. 33A, FIG. 33B, and FIG. 33C. The generalized clustering processes may show how the clustering algorithm may be applied to (e.g., used for) both TMP sparse and merge lists, as described herein with respect to FIG. 29A to FIG. 32.

The example process 3400 as shown in FIG. 34A may be identical to the process 3300 of FIG. 33A except that the process 3400 may be applied to (e.g., used for) an initial TMP BVP candidate list 3402 instead of an initial TMP merge list 3302 in FIG. 33A. For example, steps 3406, 3408, 3412, and 3416 in FIG. 34A may be same or similar to steps 3306, 3308, 3312, and 3316 in FIG. 33A, respectively. A combined list of TMP and Merge candidates may cause differences between process 3400 and process 3300. For example, at step 3404, BVPi may be added to a TMP candidate list, and at 3304 (in FIG. 33A), BVP; may be added to a TMP merge list. At step 3410, the TMP candidate list may be updated, and at step 3310 (in FIG. 33A), the TMP merge list may be updated. At step 3414, a refinement window list may be updated, and at 3314 (in FIG. 33A), a refinement merge window list may be updated. At step 3418, a TMP BVP candidate list may be generated, and at step 3318, a TMP BVP merge list may be generated.

FIG. 34B shows an example process 3400'. The process 3400' may be of a particular implementation of process 3400. The process 3400' may be identical to the process 3400 except for applying/using the relationships as shown in FIG. 34B for steps 3406', 3408', 3412', and 3416'. At step 3406', example relationships as shown may be used to determine the overlap of two BVP candidates. At step 3408', example relationships as shown may be used to determine the BVP for the additional (e.g., new) merged window. At step 3412', example relationships as shown may be used to adjust the merge window. At step 3416', example relationship as shown may be used to determine whether the maximum number/quantity of refinement candidates may be exceeded.

Figure 35:
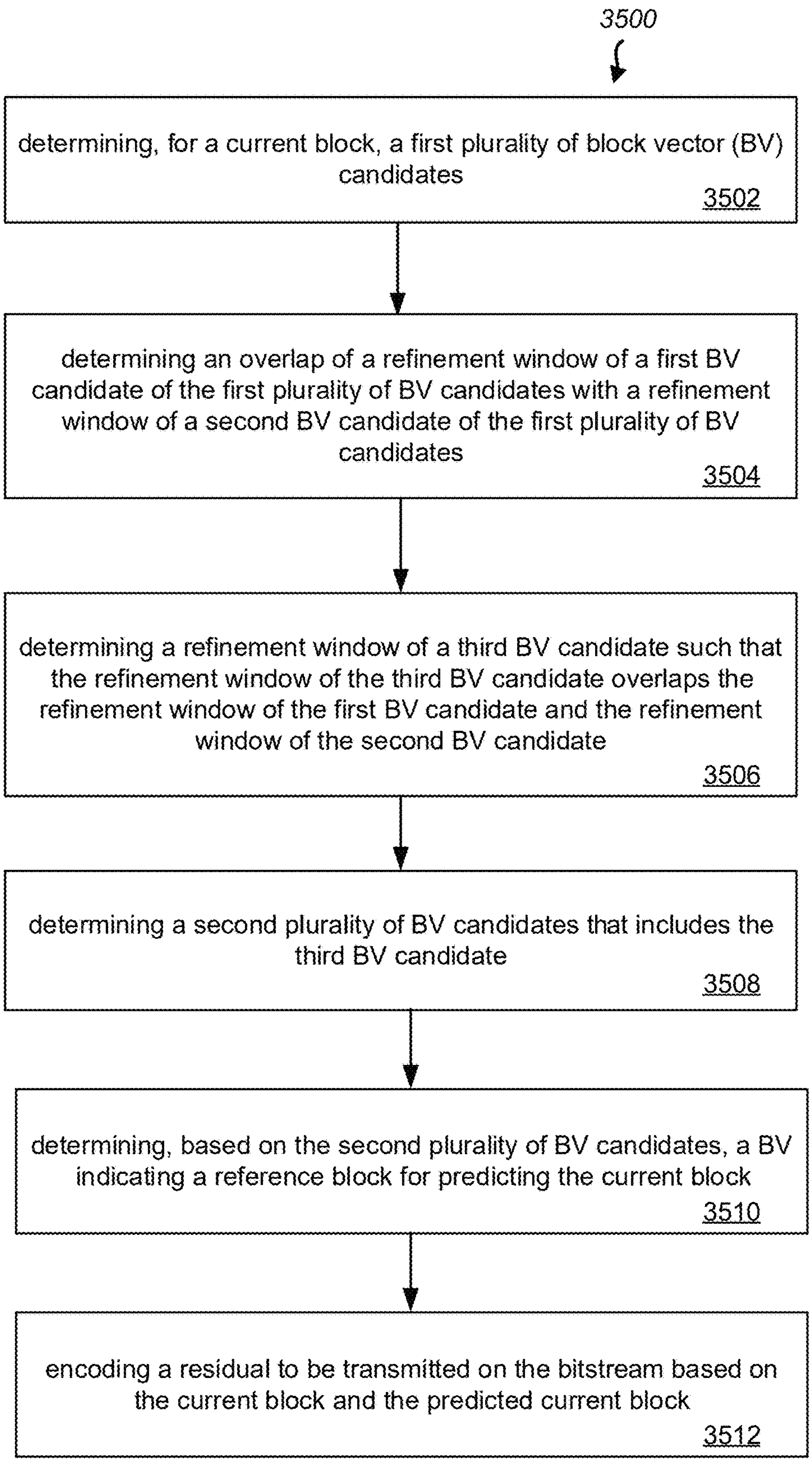
FIG. 35 shows an example method for encoding a bitstream.

FIG. 35 shows an example method for encoding a bitstream. More specifically, FIG. 35 shows a process 3500 of an example method for encoding a bitstream. One or more steps of the example method may be performed and/or implemented by an encoder (e.g., encoder 200 of FIG. 2), an example computer system 3700 as described herein with respect to FIG. 37, and/or an example computing device 3830 as described herein with respect to FIG. 38.

The example process 3500 may improve the generation of a list of block vector predictor (BVP) candidates for determining a prediction block. More specifically, the improvements may include reducing duplicate calculations of template match cost in areas of overlap between refinement windows of two or more BVP candidates. The reduction of duplicate calculations may be achieved by forming a respective enlarged refinement window to encompass each group of overlapping refinement windows, and replacing the BVP candidates that have overlapping windows with a BVP candidate corresponding to the enlarged refinement window.

The example process 3500 may begin at step 3502. At step 3502, a first plurality of BVP (or BV) candidates may be determined for a current block. The first plurality of BVP candidates may comprise an initial set of BVP candidates. The initial set of BVP candidates may be determined in a process of determining a prediction block. The prediction block may be used to determine (e.g., calculate) a residual (e.g., a difference between the current block and the prediction block) that may be encoded in the bitstream that may be output from the encoder.

The first plurality of BVP candidates may comprise a first subset of BVP candidates and a second subset of BVP candidates. The first subset of BVP candidates may be determined based on a first predetermined selection criterion. The second subset of BVP candidates may be determined based on a second predetermined selection criterion different from the first predetermined selection criterion.

The first predetermined selection criterion may correspond to Intra-Template Matching Prediction (IntraTMP). The second predetermined selection criterion may correspond to a subset of BVPs determined based on Intra Block Coding (IBC). The subset of BVPs determined based on IBC may be determined, for example, based on IntraTMP with Merge Candidates.

The second subset of BVP candidates may comprise one or more adjacent BVP candidates (e.g., FIG. 23A, 2405 in FIG. 29A) and one or more non-adjacent BVP candidates (e.g., FIG. 23B, 2406 in FIG. 29A). The adjacent and non-adjacent BVP candidates may be determined, for example, based on (e.g., in accordance with) the IntraTMP with Merge Candidates.

The first subset of BVP candidates may be selected based on a sparse search of a reference region and a template matching cost calculation. The sparse search of the reference region may be performed based on (e.g., in accordance with) IntraTMP. For example, the sparse search may be performed on every third sample (e.g., FIG. 19A, to determine candidates in a sparse list 2404 in FIG. 29A) in the reference region of the current block.

Examples are described herein in relation to IntraTMP and IntraTMP with Merge Candidates techniques. Examples are not limited to IntraTMP and IntraTMP with Merge Candidates techniques, and may apply to (e.g., used for) other encoding/decoding techniques that utilize refinement windows associated with BVP candidates.

At step 3504, an overlap of a refinement window of a first BVP candidate of the first plurality of BVP candidates with a refinement window of a second BVP candidate of the first plurality of BVP candidates may be determined. The refinement windows of BVP candidates may be determined, for example, based on IntraTMP and/or IntraTMP with Merge Candidates, as described herein. BVP candidates determined based on IntraTMP may be located within the current block's reference region, and may have refinement windows of 3×3. BVP candidates determined based on IntraTMP with Merge Candidates may be located anywhere in the current frame, and may have refinement windows of 11×11. Each BVP candidate may be the centroid of the refinement window of this BVP candidate. Examples are herein described for BVP candidates and refinement windows determined based on IntraTMP and IntraTMP with Merge Candidates techniques. Examples are not limited to BVP candidates or refinement windows determined based on IntraTMP and IntraTMP with Merge Candidates techniques.

The refinement window of the first BVP candidate and the refinement window of the second BVP candidate may have the same size. For example, if/when two refinement windows of IntraTMP with Merge Candidates are compared for overlap, these two refinement windows may be both 11×11. The refinement window of the first BVP candidate and the refinement window of the second BVP candidate may be of different sizes. For example, if/when a refinement window from IntraTMP is compared for overlap with a refinement window from IntraTMP with Merge Candidates, a 3×3 window may be compared with a 11×11 window.

Two IntraTMP refinement windows may not overlap with each other. This may be because during the sparse search stage of IntraTMP, only samples that are spaced three samples apart may be considered. The closest two BVP candidates from IntraTMP may be three samples apart from each other, and their respective 3×3 refinement windows do not overlap. Additionally, IntraTMP may crop any refinement windows at the search area boundaries (e.g., boundaries between any of R1-R6) in the reference region. The possibility of any overlap at the edges between search regions is avoided.

At step 3506, a refinement window of a third BVP candidate may be determined such that the refinement window of the third BVP candidate may overlap the refinement window of the first BVP candidate and the refinement window of the second BVP candidate. The refinement window of the third BVP candidate may include/contain the refinement window of the first BVP candidate and the refinement window of the second BVP candidate. For example, the refinement window of the third BVP candidate may encompass (e.g., fully encompass) the refinement window of the first BVP candidate and the refinement window of the second BVP candidate. The width of the refinement window of the third BVP candidate may be larger than each of a width of the refinement window of the first BVP candidate and a width of the refinement window of the second BVP candidate, and may be smaller than a sum of the width of the refinement window of the first BVP candidate and the width of the refinement window of the second BVP candidate.

At step 3508, a second plurality of BVP candidates that includes the third BVP candidate may be determined. The determining of the second plurality of BVP candidates that includes the third BVP candidate may comprise including the third BVP candidate in the second plurality of BVP candidates as a substitute for the first BVP candidate and the second BVP candidate. The second plurality of BVP candidates may exclude the first BVP candidate and the second BVP candidate. The third BVP candidate may replace the first BVP candidate and the second BVP candidate in the second plurality of BVP candidates. Alternatively, one of the first BVP candidate or the second BVP candidate may be selected as the third BVP candidate. In that situation, the second plurality of BVP candidates may include the selected one of the first or second BVP candidate and may exclude the other of the first or second BVP candidate. As described in relation to FIG. 29A and FIG. 32, the second plurality of BVP candidates may be generated as an additional (e.g., new) list that may be separate from the list comprising the first plurality of BVP candidates. Alternatively, the second plurality of BVP candidates may be generated by modifying the list comprising the first plurality of BVP candidates.

Each BVP candidate in the second plurality of BVP candidates may be associated with a respective refinement window. The respective refinement window associated with each BVP candidate may be defined/determined based on the BVP candidate, and a height and a width of the respective refinement window. For example, if/when the third BVP candidate is the centroid of the refinement window associated with the third BVP candidate, the height and width of the refinement window may be sufficient for determining the boundaries of the refinement window of the third BVP. If one of the first or second BVP candidates is selected as the third BVP candidate, the refinement window of the third BVP candidate may be specified by indicating the top-left and bottom-right corners of the refinement window (the enlarged refinement window) based on the third BVP candidate or the current block (e.g., FIG. 29B). The refinement windows may be of different sizes.

A first subset of BVP candidates may be determined based on IntraTMP, and a second subset of BVP candidates may be determined based on IntraTMP with Merge Candidates. In this instance, a third plurality of BVP candidates and a template matching cost of each BVP candidate in the first subset of BVP candidates and the third plurality of BVP candidates may be determined. The third plurality of BVP candidates and the template matching cost of each BVP candidate in the first subset of BVP candidates and the third plurality of BVP candidates may be determined, for example, before determining a second plurality of BVP candidates. The third plurality of BVP candidates may include a third BVP candidate and one or more BVP candidates from the second subset of BVP candidates. A predetermined number/quantity of BVP candidates from the first subset of BVP candidates and the third plurality of BVP candidates may be selected for the second plurality of BVP candidates. A predetermined number/quantity of BVP candidates from the first subset of BVP candidates and the third plurality of BVP candidates may be selected for the second plurality of BVP candidates, for example, based on the determined template matching costs.

A first subset of BVP candidates and a second subset of BVP candidates may comprise adjacent BVP candidates and non-adjacent BVP candidates determined based on IntraTMP with Merge Candidates. In that instance, at least one pair of BVP candidates may be determined to overlap and a fourth BVP candidate may be determined. At least one pair of BVP candidates may be determined to overlap and a fourth BVP candidate may be determined, for example, before the refinement processing (e.g., at step 3510). The at least one pair of BVP candidates determined to overlap may comprise a BVP candidate determined based on IntraTMP and a BVP candidate determined based on IntraTMP with Merge Candidates or a BVP candidate corresponding to an enlarged refinement window. The fourth BVP candidate may be determined such that a refinement window of the fourth BVP candidate may encompass the overlapping refinement windows of the BVP candidates. The BVP candidates that have the overlapping refinement windows may be replaced in a second plurality of BVP candidates by the fourth BVP candidate. For example, FIG. 29A shows an example process 2900 in which a clustering of BVP candidates determined based on IntraTMP with Merge Candidates occurs at step 2901. The clustering of BVP candidates determined based on (e.g., using) IntraTMP with Merge Candidates may occur before a clustering of BVP candidates determined based on IntraTMP. The BVP candidates determined based on IntraTMP may be clustered with BVP candidates determined based on IntraTMP with Merge candidates at step 2913.

A first BVP candidate and a second BVP candidate may each be from a first subset of BVP candidates or a second subset of BVP candidates. For example, the first BVP candidate and the second BVP candidate may each be a candidate determined based on IntraTMP, adjacent IntraTMP with Merge Candidates, or non-adjacent IntraTMP with Merge Candidates. In the example process 3200 described herein with respect to FIG. 32, BVP candidates from IntraTMP, adjacent IntraTMP with Merge Candidates, or non-adjacent IntraTMP with Merge Candidates may be determined (e.g., tested) for overlap at the same stage of processing (e.g., at step 3202). Template matching cost of each BVP candidate in the first subset of BVP candidates and the second subset of BVP candidates may be determined. A predetermined number/quantity of BVP candidates may be added to a third plurality of BVP candidates. A predetermined number/quantity of BVP candidates may be added to a third plurality of BVP candidates, for example, based on respective template matching costs. A subset of BVP candidates may be selected from the third plurality of BVP candidates to form a second plurality of BVP candidates.

At step 3510, a block vector (BV) indicating a reference block for predicting the current block may be determined. A BV indicating a reference block for predicting the current block may be determined, for example, based on the second plurality of BVP candidates. Determining the BV may comprise: determining, corresponding to each BVP candidate in the second plurality of BVP candidates, a refined BVP candidate based on a refinement window of that BVP candidate; and determining the BV based on a plurality of refined BVP candidates.

Example refinement processing of a list (e.g., 2912, 3210) that includes BVP candidates based on sparse BVP candidate lists (e.g., 2404) and merge BVP candidate lists (e.g., 2902) may have been described herein in relation to step 2916 in FIG. 29A and step 3212 in FIG. 32. As described herein with respect to FIG. 29A and FIG. 32, the refinement processing for respective BVP candidates in the lists 2912 or 3210 may have refinement windows of different sizes. The output of the refinement processing may be a refined list of BVP candidates (e.g., 2918, 3216).

Filtering the second plurality of BVP candidates may be performed. Filtering the second plurality of BVP candidates may be performed, for example, based on template matching costs of the BVP candidates of the plurality of BVP candidates. Filtering the second plurality of BVP candidates may be performed, for example, before selecting the BV for the prediction block based on the second plurality of BVP candidates. For example, the refined list determined from the refinement processing may be processed to select a predetermined number/quantity (e.g., 19) of BVP candidates that have the lowest TMP costs. The BV may be selected by determining (e.g., calculating) a rate distortion optimization or the like for respective BVP candidates in the filtered refined list.

At step 3512, a residual based on the current block and the prediction block may be encoded to be transmitted in the bitstream. For example, the candidate reference block corresponding to the BV determined at step 3510 may be subtracted from the current block to determine the residual.

Figure 36:
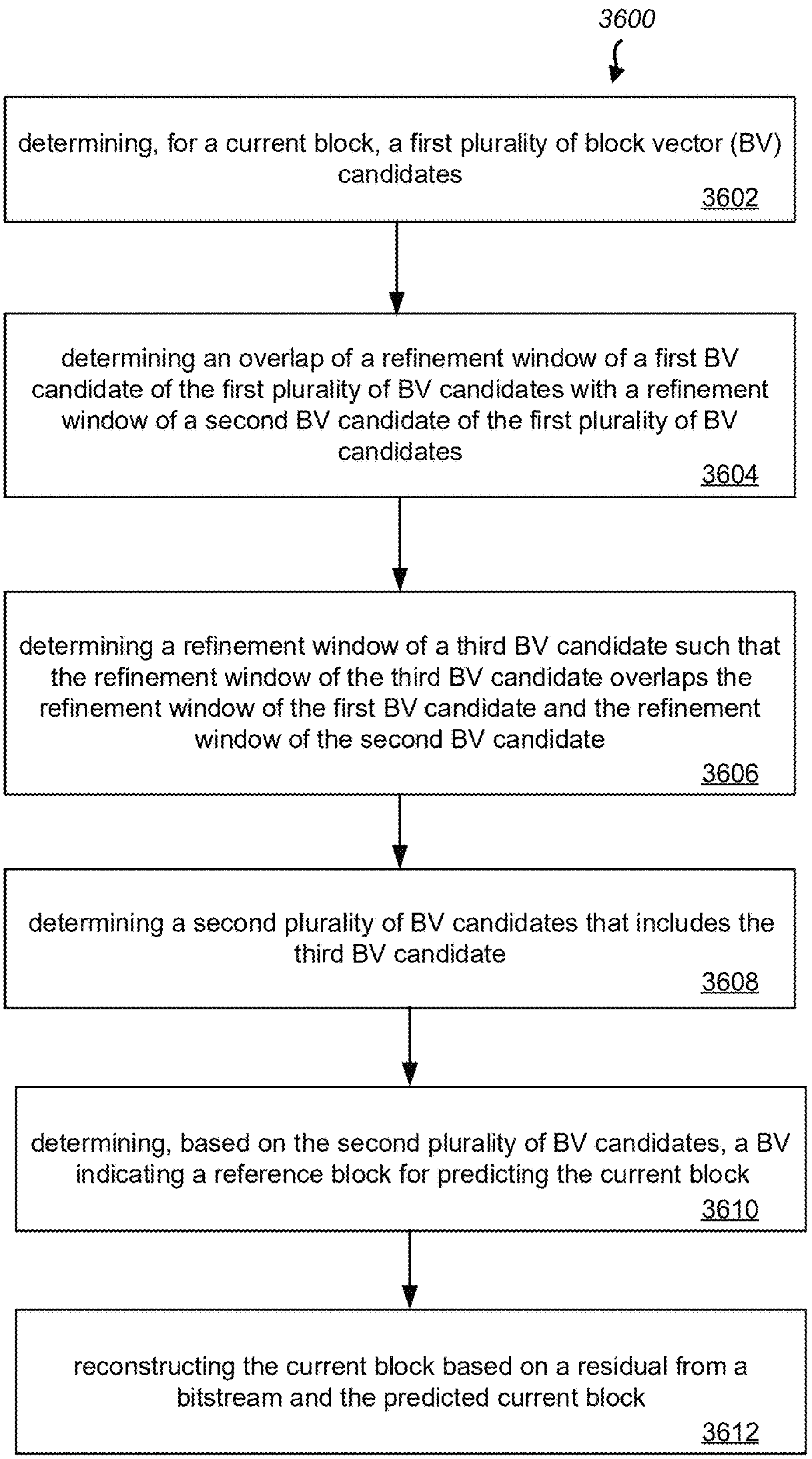
FIG. 36 shows an example method for decoding a bitstream.

FIG. 36 shows an example method for decoding a bitstream. More specifically, FIG. 36 shows a process 3600 of an example method for decoding a bitstream. One or more steps of the example method may be performed and/or implemented by a decoder (e.g., decoder 300 in FIG. 3), an example computer system 3700 as described herein with respect to FIG. 37, and/or an example computing device 3830 as described herein with respect to FIG. 38.

The example process 3600 may improve the generation of a list of BVP candidates for predicting a current block. More specifically, the improvements may include reducing duplicate calculations in areas of overlap between refinement windows of two or more BVP candidates. The reduction of duplicate calculations may be achieved by forming an enlarged refinement window that encompasses the overlapping refinement windows, and replacing the BVP candidates that have overlapping windows with a BVP candidate corresponding to the enlarged refinement window.

The example process 3600 may begin at step 3602. At step 3602, a first plurality of BVP candidates may be determined for a current block. The processing at step 3602 may be identical or similar to the processing described herein in relation to step 3502 in FIG. 35 (e.g., at an encoder).

At step 3604, an overlap of a refinement window of a first BVP candidate of the first plurality of BVP candidates with a refinement window of a second BVP candidate of the first plurality of BVP candidates may be determined. The processing at step 3604 may be identical or similar to the processing described herein in relation to step 3504 in FIG. 35 (e.g., at an encoder).

At step 3606, a refinement window of a third BVP candidate may be determined such that the refinement window of the third BVP candidate may overlap the refinement window of the first BVP candidate and the refinement window of the second BVP candidate. The processing at step 3606 may be identical or similar to the processing described herein in relation to step 3506 in FIG. 35 (e.g., at an encoder).

At step 3608, a second plurality of BVP candidates that includes the third BVP candidate may be determined. The processing at step 3608 may be identical or similar to the processing described herein in relation to 3508 in FIG. 35 (e.g., at an encoder).

At step 3610, a block vector (BV) indicating a reference block for predicting the current block may be determined. A BV indicating a reference block for predicting the current block may be determined, for example, based on the second plurality of BVP candidates. The processing at step 3610 may be identical or similar to the processing described herein in relation to 3510 in FIG. 35 (e.g., at an encoder).

At step 3612, the current block may be reconstructed. The current block may be reconstructed, for example, based on a residual from a bitstream and the predicted current block (or reference block). For example, the current block may be determined by adding the residual to the reference block identified by the BV.

Figure 37:
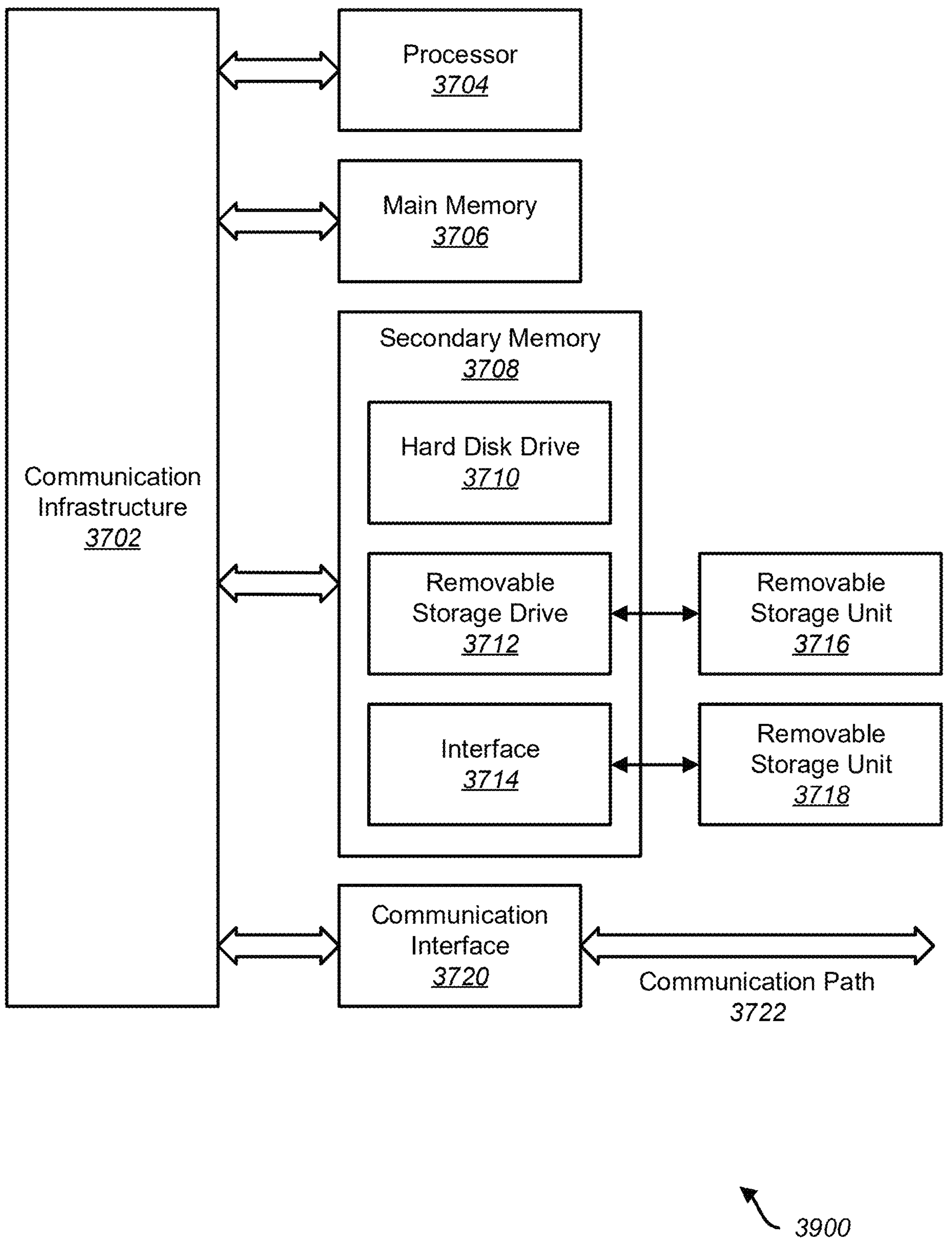
FIG. 37 shows an example computer system in which examples of the present disclosure may be implemented.

Examples of the present disclosure may be implemented in hardware using analog and/or digital circuits, in software, through the execution of instructions by one or more general purpose or special-purpose processors, or as a combination of hardware and software. Consequently, examples of the disclosure may be implemented in the environment of a computer system or other processing system. An example of such a computer system 3700 is shown in FIG. 37. FIG. 37 shows an example computer system in which examples of the present disclosure may be implemented. For example, various devices and/or systems described herein (e.g., in FIGS. 1, 2, and 3) may be implemented in the form of one or more computer systems 3700. Furthermore, each of the steps of the flowcharts depicted in this disclosure may be implemented on one or more computer systems 3700.

Computer system 3700 includes one or more processors, such as processor 3704. Processor 3704 may be, for example, a special purpose processor, a general purpose processor, a microprocessor, and/or a digital signal processor. Processor 3704 may be connected to a communication infrastructure 3702 (e.g., a bus or network). Computer system 3700 may also include a main memory 3706 (e.g., a random access memory (RAM)) and/or a secondary memory 3708.

Secondary memory 3708 may include a hard disk drive 3710 and/or a removable storage drive 3712 (e.g., a magnetic tape drive, an optical disk drive, and/or the like). Removable storage drive 3712 may read from and/or write to a removable storage unit 3716. Removable storage unit 3716 may comprise a magnetic tape, optical disk, and/or the like. The removable storage unit 3716 may be read by and/or may be written to by removable storage drive 3712. The removable storage unit 3716 may comprise a computer usable storage medium having stored therein computer software and/or data.

The secondary memory 3708 may include other similar means for allowing computer programs or other instructions to be loaded into computer system 3700. Such means may include a removable storage unit 3718 and/or an interface 3714. Examples of such means may include a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 3718 and interfaces 3714 which may allow software and/or data to be transferred from removable storage unit 3718 to computer system 3700.

Computer system 3700 may also include a communications interface 3720. Communications interface 3720 may allow software and data to be transferred between computer system 3700 and external devices. Examples of communications interface 3720 may include a modem, a network interface (e.g., an Ethernet card), a communications port, etc. Software and/or data transferred via communications interface 3720 may be in the form of signals which may be electronic, electromagnetic, optical, and/or other signals capable of being received by communications interface 3720. The signals may be provided to communications interface 3720 via a communications path 3722. Communications path 3722 may carry signals and may be implemented using wire or cable, fiber optics, a phone line, a cellular phone link, an RF link, and/or any other communications channel(s).

The computer system 3700 may also comprise one or more sensor(s) 3724. The sensor(s) 3724 may measure or detect one or more physical quantities and convert the measured or detected physical quantities into an electrical signal in digital and/or analog form. For example, the sensor(s) 3724 may include an eye tracking sensor to track the eye movement of a user. A display of a point cloud may be updated, for example, based on the eye movement of a user. The sensor(s) 3724 may include a head tracking sensor to track the head movement of a user. A display of a point cloud may be updated, for example, based on the head movement of a user. The sensor(s) 3724 may include a camera sensor for taking photographs and/or a 3D scanning device (e.g., a laser scanning device, a structured light scanning device, and/or a modulated light scanning device). The 3D scanning devices may determine geometry information by moving one or more laser heads, structured light, and/or modulated light cameras relative to the object or scene being scanned. The geometry information may be used to construct a point cloud.

A computer program medium and/or a computer readable medium may be used to refer to tangible storage media, such as removable storage units 3716 and 3718 or a hard disk installed in hard disk drive 3710. The computer program products may be means for providing software to computer system 3700. Computer programs (which may also be called computer control logic) may be stored in main memory 3706 and/or secondary memory 3708. Computer programs may be received via communications interface 3720.

Such computer programs, when executed, may enable the computer system 3700 to implement the present disclosure as discussed herein. In particular, the computer programs, when executed, may enable processor 3704 to implement the processes of the present disclosure, such as any of the methods described herein. Accordingly, such computer programs may represent controllers of the computer system 3700.

Features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

Figure 38:
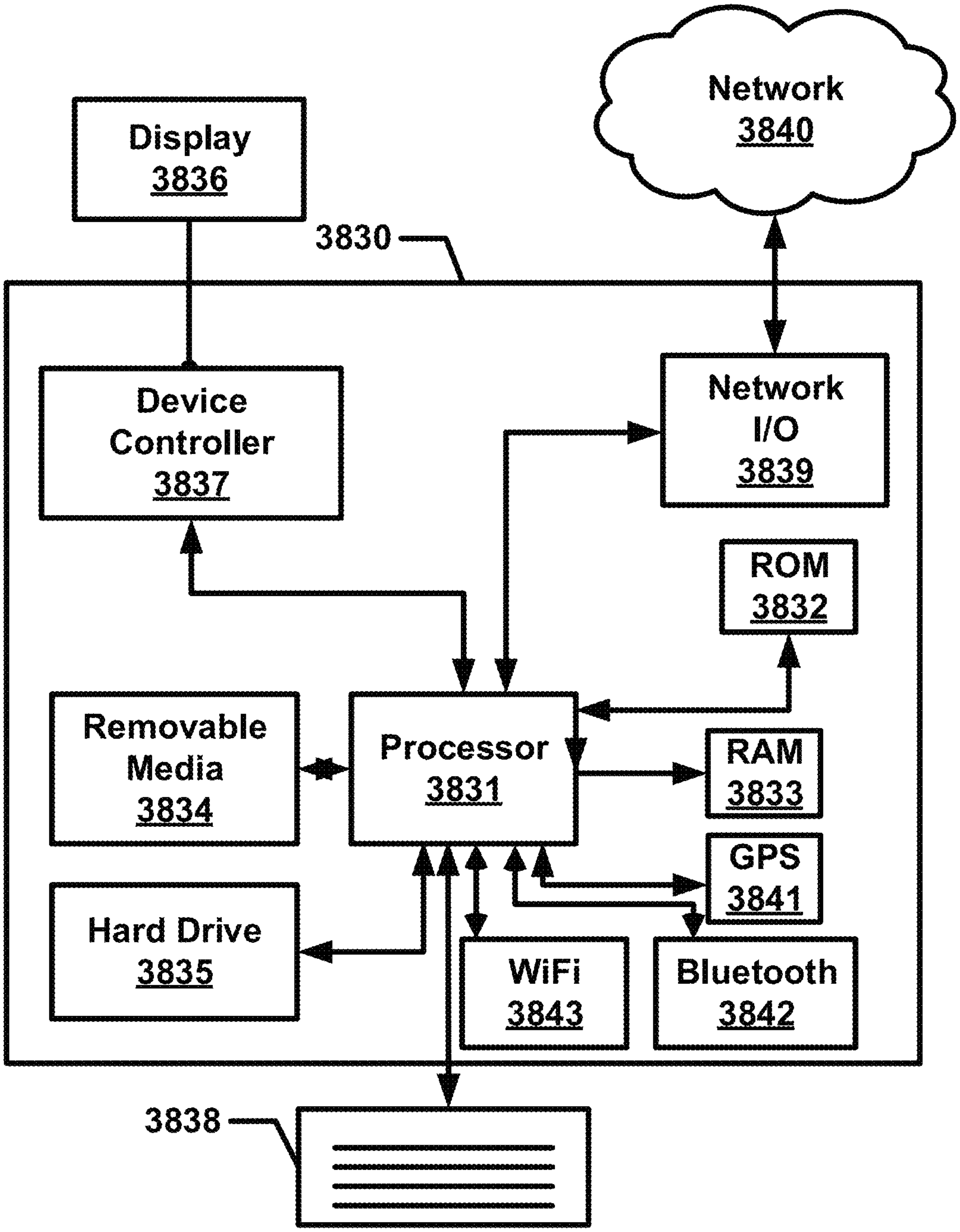
FIG. 38 shows example elements of a computing device that may be used to implement any of the various devices described herein.

FIG. 38 shows example elements of a computing device that may be used to implement any of the various devices described herein, including, for example, a source device (e.g., 102), an encoder (e.g., 114), a destination device (e.g., 106), a decoder (e.g., 120), and/or any computing device described herein. The computing device 3830 may include one or more processors 3831, which may execute instructions stored in the random-access memory (RAM) 3833, the removable media 3834 (such as a Universal Serial Bus (USB) drive, compact disk (CD) or digital versatile disk (DVD), or floppy disk drive), or any other desired storage medium. Instructions may also be stored in an attached (or internal) hard drive 3835. The computing device 3830 may also include a security processor (not shown), which may execute instructions of one or more computer programs to monitor the processes executing on the processor 3831 and any process that requests access to any hardware and/or software components of the computing device 3830 (e.g., ROM 3832, RAM 3833, the removable media 3834, the hard drive 3835, the device controller 3837, a network interface 3839, a GPS 3841, a Bluetooth interface 3842, a WiFi interface 3843, etc.). The computing device 3830 may include one or more output devices, such as the display 3836 (e.g., a screen, a display device, a monitor, a television, etc.), and may include one or more output device controllers 3837, such as a video processor. There may also be one or more user input devices 3838, such as a remote control, keyboard, mouse, touch screen, microphone, etc. The computing device 3830 may also include one or more network interfaces, such as a network interface 3839, which may be a wired interface, a wireless interface, or a combination of the two. The network interface 3839 may provide an interface for the computing device 3830 to communicate with a network 3840 (e.g., a RAN, or any other network). The network interface 3839 may include a modem (e.g., a cable modem), and the external network 3840 may include communication links, an external network, an in-home network, a provider's wireless, coaxial, fiber, or hybrid fiber/coaxial distribution system (e.g., a DOCSIS network), or any other desired network. Additionally, the computing device 3830 may include a location-detecting device, such as a global positioning system (GPS) microprocessor 3841, which may be configured to receive and process global positioning signals and determine, with possible assistance from an external server and antenna, a geographic position of the computing device 3830.

The example in FIG. 38 may be a hardware configuration, although the components shown may be implemented as software as well. Modifications may be made to add, remove, combine, divide, etc. components of the computing device 3830 as desired. Additionally, the components may be implemented using basic computing devices and components, and the same components (e.g., processor 3831, ROM storage 3832, display 3836, etc.) may be used to implement any of the other computing devices and components described herein. For example, the various components described herein may be implemented using computing devices having components such as a processor executing computer-executable instructions stored on a computer-readable medium, as shown in FIG. 38. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may be a decoder. The computing device may determine, for a current block, a first plurality of block vector prediction (BVP) candidates. The computing device may determine an overlap of a refinement window of a first BVP candidate of the first plurality of BVP candidates with a refinement window of a second BVP candidate of the first plurality of BVP candidates. The computing device may determine a refinement window of a third BVP candidate. The refinement window of the third BVP candidate may overlap the refinement window of the first BVP candidate and the refinement window of the second BVP candidate. The computing device may determine, based on a second plurality of BVP candidates that includes the third BVP candidate, a block vector (BV) indicating a reference block for predicting the current block. The computing device may decode the current block based on a residual from a bitstream and the reference block. The computing device may determine the second plurality of BVP candidates that includes the third BVP candidate. The computing device may select one of the first BVP candidate or the second BVP candidate as the third BVP candidate. The computing device may include the selected first BVP candidate or the second BVP candidate in the second plurality of BVP candidates. The computing device may determine the second plurality of BVP candidates that includes the third BVP candidate. The computing device may include the third BVP candidate in the second plurality of BVP candidates as a substitute for the first BVP candidate and the second BVP candidate. A width of the refinement window of the third BVP candidate may be larger than each of a width of the refinement window of the first BVP candidate and a width of the refinement window of the second BVP candidate. The width of the refinement window of the third BVP candidate may be smaller than a sum of a width of the refinement window of the first BVP candidate and a width of the refinement window of the second BVP candidate. The refinement window of the third BVP candidate may comprise the refinement window of the first BVP candidate and the refinement window of the second BVP candidate. The first plurality of BVP candidates may comprise: a first subset of BVP candidates determined based on template matching costs and a sparse search of a reference region of the current block; and a second subset of BVP candidates determined based on a predetermined set of spatial neighbors of the current block. The first plurality of BVP candidates may comprise: a first subset of BVP candidates determined based on Intra-Template Matching Prediction (IntraTMP); and a second subset of BVP candidates determined based on IntraTMP with Merge Candidates. A refinement window of a first BVP candidate of the second plurality of BVP candidates may be of a different size than a refinement window of a second BVP candidate of the second plurality of BVP candidates. The refinement window of the first BVP candidate and the refinement window of the second BVP candidate may be of different sizes. Each BVP candidate in the second plurality of BVP candidates may be associated with a respective refinement window. The second plurality of BVP candidates may be filtered based on template matching costs of BVP candidates of the second plurality of BVP candidates, before determining the BV. The first BVP candidate and the second BVP candidate may be each an adjacent BVP candidate or a non-adjacent BVP candidate. The computing device may comprise one or more processors and memory, storing instructions that, when executed by the one or more processors, perform the method described herein. A system may comprise the computing device configured to perform the described method, additional operations, and/or include additional elements; and a second computing device configured to encode the current block. A computer-readable medium may store instructions that, when executed, cause performance of the described method, additional operations, and/or include additional elements.

A computing device may perform a method comprising multiple operations. The computing device may be a decoder. The computing device may determine, for a current block, a first plurality of block vector prediction (BVP) candidates. The computing device may determine an overlap of a refinement window of a first BVP candidate of the first plurality of BVP candidates with a refinement window of a second BVP candidate of the first plurality of BVP candidates. The computing device may select one of the first BVP candidate or the second BVP candidate as a third BVP candidate. The computing device may determine a second plurality of BVP candidates that includes the third BVP candidate. The computing device may determine, based on the second plurality of BVP candidates, a block vector (BV) indicating a reference block for predicting the current block. The computing device may decode the current block based on a residual from a bitstream and the reference block. The computing device may determine a refinement window of the third BVP candidate such that the refinement window of the third BVP candidate may overlap the refinement window of the first BVP candidate and the refinement window of the second BVP candidate. The computing device may include the determined third BVP candidate in the second plurality of BVP candidates. The second plurality of BVP candidates may exclude one of the first BVP candidate or the second BVP candidate. The selected one of the first BVP candidate or the second BVP candidate may have a lower template matching cost. The first plurality of BVP candidates may comprise: a first subset of BVP candidates determined based on template matching costs and a sparse search of a reference region of the current block; and a second subset of BVP candidates determined based on a predetermined set of spatial neighbors of the current block. The first plurality of BVP candidates may comprise: a first subset of BVP candidates determined based on Intra-Template Matching Prediction (IntraTMP); and a second subset of BVP candidates determined based on IntraTMP with Merge Candidates. A refinement window of a first BVP candidate of the second plurality of BVP candidates may be of a different size than a refinement window of a second BVP candidate of the second plurality of BVP candidates. The refinement window of the first BVP candidate and the refinement window of the second BVP candidate may be of different sizes. Each BVP candidate in the second plurality of BVP candidates may be associated with a respective refinement window. The second plurality of BVP candidates may be filtered based on template matching costs of BVP candidates of the second plurality of BVP candidates, before determining the BV. The first BVP candidate and the second BVP candidate may be each an adjacent BVP candidate or a non-adjacent BVP candidate. The computing device may comprise one or more processors and memory, storing instructions that, when executed by the one or more processors, perform the method described herein. A system may comprise the computing device configured to perform the described method, additional operations, and/or include additional elements; and a second computing device configured to encode the current block. A computer-readable medium may store instructions that, when executed, cause performance of the described method, additional operations, and/or include additional elements.

A computing device may perform a method comprising multiple operations. The computing device may be an encoder. The computing device may determine, for a current block, a first plurality of block vector prediction (BVP) candidates. The computing device may determine an overlap of a refinement window of a first BVP candidate of the first plurality of BVP candidates with a refinement window of a second BVP candidate of the first plurality of BVP candidates. The computing device may determine a refinement window of a third BVP candidate. The refinement window of the third BVP candidate may overlap the refinement window of the first BVP candidate and the refinement window of the second BVP candidate. The computing device may determine, based on a second plurality of BVP candidates that includes the third BVP candidate, a block vector (BV) indicating a reference block for predicting the current block. The computing device may encode the current block based on a residual to be transmitted on a bitstream. The residual may be based on the current block and the reference block. The computing device may determine the second plurality of BVP candidates that includes the third BVP candidate. The computing device may select one of the first BVP candidate or the second BVP candidate as the third BVP candidate. The computing device may include the selected first BVP candidate or the second BVP candidate in the second plurality of BVP candidates. The computing device may determine the second plurality of BVP candidates that includes the third BVP candidate. The computing device may include the third BVP candidate in the second plurality of BVP candidates as a substitute for the first BVP candidate and the second BVP candidate. A width of the refinement window of the third BVP candidate may be larger than each of a width of the refinement window of the first BVP candidate and a width of the refinement window of the second BVP candidate. The width of the refinement window of the third BVP candidate may be smaller than a sum of a width of the refinement window of the first BVP candidate and a width of the refinement window of the second BVP candidate. The refinement window of the third BVP candidate may comprise the refinement window of the first BVP candidate and the refinement window of the second BVP candidate. The first plurality of BVP candidates may comprise: a first subset of BVP candidates determined based on template matching costs and a sparse search of a reference region of the current block; and a second subset of BVP candidates determined based on a predetermined set of spatial neighbors of the current block. The first plurality of BVP candidates may comprise: a first subset of BVP candidates determined based on Intra-Template Matching Prediction (IntraTMP); and a second subset of BVP candidates determined based on IntraTMP with Merge Candidates. A refinement window of a first BVP candidate of the second plurality of BVP candidates may be of a different size than a refinement window of a second BVP candidate of the second plurality of BVP candidates. The refinement window of the first BVP candidate and the refinement window of the second BVP candidate may be of different sizes. Each BVP candidate in the second plurality of BVP candidates may be associated with a respective refinement window. The second plurality of BVP candidates may be filtered based on template matching costs of BVP candidates of the second plurality of BVP candidates, before determining the BV. The first BVP candidate and the second BVP candidate may be each an adjacent BVP candidate or a non-adjacent BVP candidate. The computing device may comprise one or more processors and memory, storing instructions that, when executed by the one or more processors, perform the method described herein. A system may comprise the computing device configured to perform the described method, additional operations, and/or include additional elements; and a second computing device configured to decode the current block. A computer-readable medium may store instructions that, when executed, cause performance of the described method, additional operations, and/or include additional elements.

A computing device may perform a method comprising multiple operations. The computing device may be an encoder. The computing device may determine, for a current block, a first plurality of block vector prediction (BVP) candidates. The computing device may determine an overlap of a refinement window of a first BVP candidate of the first plurality of BVP candidates with a refinement window of a second BVP candidate of the first plurality of BVP candidates. The computing device may select one of the first BVP candidate or the second BVP candidate as a third BVP candidate. The computing device may determine a second plurality of BVP candidates that includes the third BVP candidate. The computing device may determine, based on the second plurality of BVP candidates, a block vector (BV) indicating a reference block for predicting the current block. The computing device may encode the current block based on a residual to be transmitted on a bitstream. The residual may be based on the current block and the reference block. The computing device may determine a refinement window of the third BVP candidate such that the refinement window of the third BVP candidate may overlap the refinement window of the first BVP candidate and the refinement window of the second BVP candidate. The computing device may include the determined third BVP candidate in the second plurality of BVP candidates. The second plurality of BVP candidates may exclude one of the first BVP candidate or the second BVP candidate. The selected one of the first BVP candidate or the second BVP candidate may have a lower template matching cost. The first plurality of BVP candidates may comprise: a first subset of BVP candidates determined based on template matching costs and a sparse search of a reference region of the current block; and a second subset of BVP candidates determined based on a predetermined set of spatial neighbors of the current block. The first plurality of BVP candidates may comprise: a first subset of BVP candidates determined based on Intra-Template Matching Prediction (IntraTMP); and a second subset of BVP candidates determined based on IntraTMP with Merge Candidates. A refinement window of a first BVP candidate of the second plurality of BVP candidates may be of a different size than a refinement window of a second BVP candidate of the second plurality of BVP candidates. The refinement window of the first BVP candidate and the refinement window of the second BVP candidate may be of different sizes. Each BVP candidate in the second plurality of BVP candidates may be associated with a respective refinement window. The second plurality of BVP candidates may be filtered based on template matching costs of BVP candidates of the second plurality of BVP candidates, before determining the BV. The first BVP candidate and the second BVP candidate may be each an adjacent BVP candidate or a non-adjacent BVP candidate. The computing device may comprise one or more processors and memory, storing instructions that, when executed by the one or more processors, perform the method described herein. A system may comprise the computing device configured to perform the described method, additional operations, and/or include additional elements; and a second computing device configured to decode the current block. A computer-readable medium may store instructions that, when executed, cause performance of the described method, additional operations, and/or include additional elements.

A computing device may perform a method comprising multiple operations. The computing device may be a decoder. The computing device may determine, for a current block, a first plurality of block vector prediction (BVP) candidates. The computing device may determine an overlap of a refinement window of a first BVP candidate of the first plurality of BVP candidates with a refinement window of a second BVP candidate of the first plurality of BVP candidates. The computing device may determine a refinement window of a third BVP candidate such that the refinement window of the third BVP candidate may overlap the refinement window of the first BVP candidate and the refinement window of the second BVP candidate. The computing device may determine a second plurality of BVP candidates that includes the third BVP candidate. The computing device may determine, based on the second plurality of BVP candidates, a block vector (BV) indicating a reference block for predicting the current block. The computing device may reconstruct the current block based on a residual from a bitstream and the predicted current block. The computing device may determine, corresponding to each BVP candidate in the second plurality of BVP candidates, a refined BVP candidate from a refinement window of the each BVP candidate. The computing device may determine the BV from the plurality of the refined BVPs. The second plurality of BVP candidates may be filtered based on template matching costs of the BVP candidates of the second plurality of BVP candidates, before determining the BV for the predicted current block based on the second plurality of BVP candidates. A refinement window of a first BVP candidate of the second plurality of BVP candidates may be of a different size than a refinement window of a second BVP candidate of the second plurality of BVP candidates. The computing device may include the third BVP candidate in the second plurality of BVP candidates as a substitute for the first BVP candidate and the second BVP candidate. The second plurality of BVP candidates may exclude the first BVP candidate and the second BVP candidate. Each BVP candidate in the second plurality of BVP candidates may be associated with a respective refinement window. The respective refinement window associated with the each BVP candidate may be defined based on the each BVP candidate, a height of the respective refinement window, and a width of the respective refinement window. The computing device may select one of the first BVP candidate or the second BVP candidate as the third BVP candidate. The computing device may include the selected first BVP candidate or the second BVP candidate in the second plurality of BVP candidates. The second plurality of BVP candidates may exclude one of the first BVP candidate or the second BVP candidate. Each BVP candidate in the second plurality of BVP candidates may be associated with a respective refinement window. The respective refinement window associated with the each BVP candidate may be defined based on the each BVP candidate, a top-left corner of the respective refinement window, and a bottom-right corner of the respective refinement window. The top-left corner and the bottom-right corner may be specified in relation to the each BVP candidate, and the top-left corner and the bottom-right corner may be specified in relation to the current block. The selected one of the first BVP candidate or the second BVP candidate may have a lower template matching cost. The refinement window of the third BVP candidate may include the refinement window of the first BVP candidate and the refinement window of the second BVP candidate. The refinement window of the third BVP candidate may fully encompass the refinement window of the first BVP candidate and the refinement window of the second BVP candidate. A width of the refinement window of the third BVP candidate may be larger than each of a width of the refinement window of the first BVP candidate and a width of the refinement window of the second BVP candidate, and smaller than a sum of the width of the refinement window of the first BVP candidate and the width of the refinement window of the second BVP candidate. The refinement window of the first BVP candidate and the refinement window of the second BVP candidate may be a same size. The refinement window of the first BVP candidate and the refinement window of the second BVP candidate may be of different sizes. The first plurality of BVP candidates may comprise a first subset of BVP candidates determined according to a first predetermined selection criteria and a second subset of BVP candidates determined according to a second predetermined selection criteria different from the first predetermined selection criteria. The first predetermined selection criteria may correspond to Intra-Template Matching Prediction (IntraTMP) and the second predetermined selection criteria may be based on Intra Block Coding (IBC). The second subset of BVP candidates may comprise one or more adjacent BVP candidates and one or more non-adjacent BV candidates. The second predetermined criteria may correspond to IntraTMP with Merge Candidates. The first predetermined selection criteria may include selecting BVP candidates based on template matching costs and a sparse search of a reference region of the current block. The second predetermined selection criteria may include selecting BVP candidates from a predetermined set of spatial neighbors of the current block. The first BVP candidate and the second BVP candidate may be each an adjacent BVP candidate or a non-adjacent BVP candidate. The first subset of BVP candidates may be selected based on a sparse search of a reference region and a template matching. The computing device may determine a third plurality of BVP candidates that includes the third BVP candidate and one or more BVP candidates from the second subset of BVP candidates. The computing device may determine a template matching cost of each BVP candidate in the first subset of BVP candidates and the third plurality of BVP candidates. The computing device may select, based on the determined template matching costs, a predetermined number/quantity of BVP candidates from the first subset of BVP candidates and the third plurality of BVP candidates to the second plurality of BVP candidates. The first subset of BVP candidates may be selected based on a sparse search of a reference region and a template matching. The first BVP candidate may be from the first subset of BVP candidates. The second BVP candidate may be from the second subset of BVP candidates. The computing device may perform the following actions, before determining the overlap of the refinement window of the first BVP candidate of the first plurality of BVP candidates with the refinement window of the second BVP candidate of the first plurality of BVP candidates. The computing device may detect an overlap of refinement windows of two BVP candidates from the second subset of BVP candidates. The computing device may determine a refinement window of a fourth BVP candidate such that the refinement window of the fourth BVP candidate includes the refinement windows of the two BVP candidates of the second subset of BVP candidates. The computing device may determine a third plurality of BVP candidates that includes the fourth BVP candidate and one or more BVP candidates from the second subset of BVP candidates. The computing device may determine a template matching cost of each BVP candidate in the first subset of BVP candidates and the third plurality of BVP candidates. The computing device may select, based on the determined template matching costs, a predetermined number/quantity of BVP candidates from the first subset of BVP candidates and the third plurality of BVP candidates to the second plurality of BVP candidates. The first subset of BVP candidates may be selected based on a sparse search of a reference region and a template matching. The first BVP candidate may be from the first subset of BVP candidates or the second subset of BVP candidates. The second BVP candidate may be from the first subset of BVP candidates or the second subset of BVP candidates. The computing device may determine a template matching cost of each BVP candidate in the first subset of BVP candidates and the second subset of BVP candidates. The computing device may add a predetermined number of BVP candidates, based on respective template matching costs, to a third plurality of BVP candidates. The computing device may select a subset of BVP candidates from the third plurality of BVP candidates to form the second plurality of BVP candidates. The computing device may comprise one or more processors and memory, storing instructions that, when executed by the one or more processors, perform the method described herein. A system may comprise the computing device configured to perform the described method, additional operations, and/or include additional elements; and a second computing device configured to encode the current block. A computer-readable medium may store instructions that, when executed, cause performance of the described method, additional operations, and/or include additional elements.

A computing device may perform a method comprising multiple operations. The computing device may be an encoder. The computing device may determine, for a current block, a first plurality of block vector prediction (BVP) candidates. The computing device may determine an overlap of a refinement window of a first BVP candidate of the first plurality of BVP candidates with a refinement window of a second BVP candidate of the first plurality of BVP candidates. The computing device may determine a refinement window of a third BVP candidate such that the refinement window of the third BVP candidate may overlap the refinement window of the first BVP candidate and the refinement window of the second BVP candidate. The computing device may determine a second plurality of BVP candidates that includes the third BVP candidate. The computing device may determine, based on the second plurality of BVP candidates, a block vector (BV) indicating a reference block for predicting the current block. The computing device may encode a residual to be transmitted on a bitstream based on the current block and the predicted current block. The computing device may determine, corresponding to each BVP candidate in the second plurality of BVP candidates, a refined BVP candidate from a refinement window of the each BVP candidate. The computing device may determine the BV from the plurality of the refined BVPs. The second plurality of BVP candidates may be filtered based on template matching costs of the BVP candidates of the second plurality of BVP candidates, before determining the BV for the predicted current block based on the second plurality of BVP candidates. A refinement window of a first BVP candidate of the second plurality of BVP candidates may be of a different size than a refinement window of a second BVP candidate of the second plurality of BVP candidates. The computing device may include the third BVP candidate in the second plurality of BVP candidates as a substitute for the first BVP candidate and the second BVP candidate. The second plurality of BVP candidates may exclude the first BVP candidate and the second BVP candidate. Each BVP candidate in the second plurality of BVP candidates may be associated with a respective refinement window. The respective refinement window associated with the each BVP candidate may be defined based on the each BVP candidate, a height of the respective refinement window, and a width of the respective refinement window. The computing device may select one of the first BVP candidate or the second BVP candidate as the third BVP candidate. The computing device may include the selected first BVP candidate or the second BVP candidate in the second plurality of BVP candidates. The second plurality of BVP candidates may exclude one of the first BVP candidate or the second BVP candidate. Each BVP candidate in the second plurality of BVP candidates may be associated with a respective refinement window. The respective refinement window associated with the each BVP candidate may be defined based on the each BVP candidate, a top-left corner of the respective refinement window, and a bottom-right corner of the respective refinement window. The top-left corner and the bottom-right corner may be specified in relation to the each BVP candidate. The top-left corner and the bottom-right corner may be specified in relation to the current block. The refinement window of the third BVP candidate may include the refinement window of the first BVP candidate and the refinement window of the second BVP candidate. The refinement window of the third BVP candidate may fully encompass the refinement window of the first BVP candidate and the refinement window of the second BVP candidate. A width of the refinement window of the third BVP candidate may be larger than each of a width of the refinement window of the first BVP candidate and a width of the refinement window of the second BVP candidate, and smaller than a sum of the width of the refinement window of the first BVP candidate and the width of the refinement window of the second BVP candidate. The refinement window of the first BVP candidate and the refinement window of the second BVP candidate may be a same size. The refinement window of the first BVP candidate and the refinement window of the second BVP candidate may be of different sizes. The first plurality of BVP candidates may comprise a first subset of BVP candidates determined according to a first predetermined selection criteria and a second subset of BVP candidates determined according to a second predetermined selection criteria different from the first predetermined selection criteria. The first predetermined selection criteria may correspond to Intra-Template Matching Prediction (IntraTMP) and the second predetermined selection criteria may be based on Intra Block Coding (IBC). The second subset of BVP candidates may comprise one or more adjacent BVP candidates and one or more non-adjacent BV candidates. The second predetermined criteria may correspond to IntraTMP with Merge Candidates. The first predetermined selection criteria may include selecting BVP candidates based on template matching costs and a sparse search of a reference region of the current block, and the second predetermined selection criteria may include selecting BVP candidates from a predetermined set of spatial neighbors of the current block. The first BVP candidate and the second BVP candidate may be each an adjacent BVP candidate or a non-adjacent BVP candidate. The first subset of BVP candidates may be selected based on a sparse search of a reference region and a template matching. The computing device may determine a third plurality of BVP candidates that includes the third BVP candidate and one or more BVP candidates from the second subset of BVP candidates. The computing device may determine a template matching cost of each BVP candidate in the first subset of BVP candidates and the third plurality of BVP candidates. The computing device may select, based on the determined template matching costs, a predetermined number of BVP candidates from the first subset of BVP candidates and the third plurality of BVP candidates to the second plurality of BVP candidates. The first subset of BVP candidates may be selected based on a sparse search of a reference region and a template matching. The first BVP candidate may be from the first subset of BVP candidates and the second BVP candidate may be from the second subset of BVP candidates. The computing device may perform the following actions, before determining the overlap of the refinement window of the first BVP candidate of the first plurality of BVP candidates with the refinement window of the second BVP candidate of the first plurality of BVP candidates. The computing device may detect an overlap of refinement windows of two BVP candidates from the second subset of BVP candidates. The computing device may determine a refinement window of a fourth BVP candidate such that the refinement window of the fourth BVP candidate includes the refinement windows of the two BVP candidates of the second subset of BVP candidates. The computing device may determine a third plurality of BVP candidates that includes the fourth BVP candidate and one or more BVP candidates from the second subset of BVP candidates. The computing device may determine a template matching cost of each BVP candidate in the first subset of BVP candidates and the third plurality of BVP candidates. The computing device may select, based on the determined template matching costs, a predetermined number/quantity of BVP candidates from the first subset of BVP candidates and the third plurality of BVP candidates to the second plurality of BVP candidates. The first subset of BVP candidates may be selected based on a sparse search of a reference region and a template matching. The first BVP candidate may be from the first subset of BVP candidates or the second subset of BVP candidates. The second BVP candidate may be from the first subset of BVP candidates or the second subset of BVP candidates. The computing device may determine a template matching cost of each BVP candidate in the first subset of BVP candidates and the second subset of BVP candidates. The computing device may add a predetermined number of BVP candidates, based on respective template matching costs, to a third plurality of BVP candidates. The computing device may select a subset of BVP candidates from the third plurality of BVP candidates to form the second plurality of BVP candidates. The computing device may comprise one or more processors and memory, storing instructions that, when executed by the one or more processors, perform the method described herein. A system may comprise the computing device configured to perform the described method, additional operations, and/or include additional elements; and a second computing device configured to decode the current block. A computer-readable medium may store instructions that, when executed, cause performance of the described method, additional operations, and/or include additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays.

Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:

determining, by a computing device and for a current block of content, a first plurality of block vector prediction (BVP) candidates;

determining an overlap of a refinement window encompassing a first BVP candidate of the first plurality of BVP candidates with a refinement window encompassing a second BVP candidate of the first plurality of BVP candidates;

determining a refinement window encompassing a third BVP candidate, wherein the refinement window encompassing the third BVP candidate overlaps the refinement window encompassing the first BVP candidate and the refinement window encompassing the second BVP candidate;

determining, based on a second plurality of BVP candidates that includes the third BVP candidate, a block vector (BV) indicating a reference block for predicting the current block; and decoding the current block based on a residual from a bitstream and the reference block.

2. The method of claim 1, further comprising:

determining the second plurality of BVP candidates that includes the third BVP candidate, wherein the determining the second plurality of BVP candidates comprises:

selecting one of the first BVP candidate or the second BVP candidate as the third BVP candidate; and including the selected first BVP candidate or the second BVP candidate in the second plurality of BVP candidates.

3. The method of claim 1, further comprising:

determining the second plurality of BVP candidates that includes the third BVP candidate, wherein the determining the second plurality of BVP candidates comprises:

including the third BVP candidate in the second plurality of BVP candidates as a substitute for the first BVP candidate and the second BVP candidate.

4. The method of claim 1, wherein the refinement window encompassing the third BVP candidate comprises the refinement window encompassing the first BVP candidate and the refinement window encompassing the second BVP candidate.

5. The method of claim 1, wherein the first plurality of BVP candidates comprises:

a first subset of BVP candidates determined based on template matching costs and a sparse search of a reference region of the current block; and a second subset of BVP candidates determined based on a predetermined set of spatial neighbors of the current block.

6. The method of claim 1, wherein a width of the refinement window encompassing the third BVP candidate is larger than each of a width of the refinement window encompassing the first BVP candidate and a width of the refinement window encompassing the second BVP candidate, and wherein the width of the refinement window encompassing the third BVP candidate is smaller than a sum of a width of the refinement window encompassing the first BVP candidate and a width of the refinement window encompassing the second BVP candidate.

7. The method of claim 1, wherein a refinement window encompassing a first BVP candidate of the second plurality of BVP candidates is of a different size than a refinement window encompassing a second BVP candidate of the second plurality of BVP candidates.

8. The method of claim 1, further comprising:

before the determining the BV, filtering the second plurality of BVP candidates based on template matching costs of BVP candidates of the second plurality of BVP candidates.

9. A method comprising:

determining, by a computing device and for a current block of content, a first plurality of block vector prediction (BVP) candidates;

determining an overlap of a refinement window encompassing a first BVP candidate of the first plurality of BVP candidates with a refinement window encompassing a second BVP candidate of the first plurality of BVP candidates;

selecting one of the first BVP candidate or the second BVP candidate as a third BVP candidate;

determining a second plurality of BVP candidates that includes the third BVP candidate;

determining, based on the second plurality of BVP candidates, a block vector (BV) indicating a reference block for predicting the current block; and decoding the current block based on a residual from a bitstream and the reference block.

10. The method of claim 9, wherein the determining the second plurality of BVP candidates that includes the third BVP candidate comprises:

determining a refinement window encompassing the third BVP candidate such that the refinement window encompassing the third BVP candidate overlaps the refinement window encompassing the first BVP candidate and the refinement window encompassing the second BVP candidate; and including the determined third BVP candidate in the second plurality of BVP candidates.

11. The method of claim 9, wherein the second plurality of BVP candidates excludes one of the first BVP candidate or the second BVP candidate.

12. The method of claim 9, wherein the selected one of the first BVP candidate or the second BVP candidate has a lower template matching cost.

13. The method of claim 9, wherein the refinement window encompassing the first BVP candidate and the refinement window encompassing the second BVP candidate are of different sizes.

14. The method of claim 9, wherein the first plurality of BVP candidates comprises:

a first subset of BVP candidates determined based on Intra-Template Matching Prediction (IntraTMP); and a second subset of BVP candidates determined based on IntraTMP with Merge Candidates.

15. The method of claim 9, wherein each BVP candidate in the second plurality of BVP candidates is associated with a respective refinement window.

16. A method comprising:

determining, by a computing device and for a current block of content, a first plurality of block vector prediction (BVP) candidates;

determining an overlap of a refinement window encompassing a first BVP candidate of the first plurality of BVP candidates with a refinement window encompassing a second BVP candidate of the first plurality of BVP candidates;

determining a refinement window encompassing a third BVP candidate, wherein the refinement window encompassing the third BVP candidate overlaps the refinement window encompassing the first BVP candidate and the refinement window encompassing the second BVP candidate;

determining, based on a second plurality of BVP candidates that includes the third BVP candidate, a block vector (BV) indicating a reference block for predicting the current block; and encoding the current block based on a residual to be transmitted on a bitstream, wherein the residual is based on the current block and the reference block.

17. The method of claim 16, further comprising:

determining the second plurality of BVP candidates that includes the third BVP candidate, wherein the determining the second plurality of BVP candidates comprises:

selecting one of the first BVP candidate or the second BVP candidate as the third BVP candidate; and including the selected first BVP candidate or the second BVP candidate in the second plurality of BVP candidates.

18. The method of claim 16, further comprising:

determining the second plurality of BVP candidates that includes the third BVP candidate, wherein the determining the second plurality of BVP candidates comprises:

including the third BVP candidate in the second plurality of BVP candidates as a substitute for the first BVP candidate and the second BVP candidate.

19. The method of claim 16, wherein the refinement window encompassing the third BVP candidate comprises the refinement window encompassing the first BVP candidate and the refinement window encompassing the second BVP candidate.

20. The method of claim 16, wherein the first plurality of BVP candidates comprises:

a first subset of BVP candidates determined based on template matching costs and a sparse search of a reference region of the current block; and a second subset of BVP candidates determined based on a predetermined set of spatial neighbors of the current block.

* * * * *